United States Patent
Tsai et al.

(10) Patent No.: US 10,524,244 B2
(45) Date of Patent: Dec. 31, 2019

(54) RADIO PDCCH TO FACILITATE NUMEROLOGY OPERATIONS

(71) Applicant: Convida Wireless, LLC, Wilmington, DE (US)

(72) Inventors: Allan Y. Tsai, Boonton, NJ (US); Lakshmi R. Iyer, King of Prussia, PA (US); Guodong Zhang, Syosset, NY (US); Qian Zhang, Basking Ridge, NJ (US); Pascal M. Adjakple, Great Neck, NY (US); Qing Li, Princeton Junction, NJ (US); Joseph M. Murray, Schwenksville, PA (US); Tianyi Xu, San Diego, CA (US); Wei Chen, San Diego, CA (US); Ahmed ElSamadouny, Conshohocken, PA (US); Salman Khan, West Babylon, NY (US); Yifan Li, Conshohocken, PA (US)

(73) Assignee: Convida Wireless, LLC, Wilmington, DE (US)

( * ) Notice: Subject to any disclaimer, the term of this patent is extended or adjusted under 35 U.S.C. 154(b) by 181 days.

(21) Appl. No.: 15/592,997

(22) Filed: May 11, 2017

(65) Prior Publication Data
US 2017/0332359 A1 Nov. 16, 2017

Related U.S. Application Data

(60) Provisional application No. 62/334,935, filed on May 11, 2016, provisional application No. 62/401,055, (Continued)

(51) Int. Cl.
*H04W 72/04* (2009.01)
*H04B 7/06* (2006.01)
(Continued)

(52) U.S. Cl.
CPC ........ *H04W 72/042* (2013.01); *H04B 7/0617* (2013.01); *H04B 7/0639* (2013.01);
(Continued)

(58) Field of Classification Search
CPC ........... H04W 72/042; H04W 72/0446; H04W 68/02; H04W 88/02; H04B 7/0639; H04B 7/0689; H04L 5/0048; H04L 5/0053
See application file for complete search history.

(56) References Cited

U.S. PATENT DOCUMENTS 8,902,773 B2  12/2014  Anderson et al.
9,198,181 B2  11/2015  Blankenship et al.
(Continued)

FOREIGN PATENT DOCUMENTS

EP  2464076 A2  6/2012
EP  2882110 A1  6/2015
(Continued)

OTHER PUBLICATIONS

Qualcomm, 3GPP R1-1612062, TSG-RAN WG1 #87, Control Channel for slot format indicator, Nov. 14-18, 2016 (Year: 2016).*
(Continued)

*Primary Examiner* — Kent K Krueger
(74) *Attorney, Agent, or Firm* — BakerHostetler

(57) ABSTRACT

New radio download numerology allocation information may be obtained through master information block data, system information block data, radio resource control signals, or signals or a physical downlink numerology indication channel, and used along with a reference signal detected in a search space to obtain resource element positions in an antenna port reference signal in a resource block that belongs to a particular band slice according to a reference signal allocation scheme for a band slice numerology. A physical download control may then be decoded based upon
(Continued)

one or more resource elements of the reference signal, allowing the connection of, e.g., an enhanced mobile broadband, massive machine type communication, or ultra-reliable/low-latency application to a communications network thereby. Alternatively, multiple physical downlink control channels may be blindly demodulated at each of a number calculated reference signal locations, and one channel selected based on passing a cyclic redundancy check.

18 Claims, 71 Drawing Sheets

Related U.S. Application Data filed on Sep. 28, 2016, provisional application No. 62/399,921, filed on Sep. 26, 2016, provisional application No. 62/416,902, filed on Nov. 3, 2016.

(51) Int. Cl.
  *H04L 5/00* (2006.01)
  *H04W 68/02* (2009.01)
  *H04W 88/02* (2009.01)

(52) U.S. Cl.
  CPC .......... *H04L 5/0048* (2013.01); *H04L 5/0053* (2013.01); *H04W 68/02* (2013.01); *H04W 72/046* (2013.01); *H04W 72/0446* (2013.01); *H04B 7/0689* (2013.01); *H04W 88/02* (2013.01)

(56) References Cited

U.S. PATENT DOCUMENTS

| | | | |
|---|---|---|---|
| 9,413,451 | B2 | 8/2016 | Park et al. |
| 2009/0323607 | A1 | 12/2009 | Park et al. |
| 2010/0027466 | A1 | 2/2010 | Mustapha |
| 2010/0061361 | A1 | 3/2010 | Wu |
| 2011/0222428 | A1 | 9/2011 | Charbit et al. |
| 2011/0242997 | A1 | 10/2011 | Yin |
| 2012/0009963 | A1 | 1/2012 | Kim et al. |
| 2013/0155847 | A1 | 6/2013 | Li et al. |
| 2013/0225184 | A1 | 8/2013 | Liu et al. |
| 2014/0036806 | A1 | 2/2014 | Chen et al. |
| 2014/0204854 | A1 | 7/2014 | Freda et al. |
| 2014/0254544 | A1 | 9/2014 | Kar et al. |
| 2014/0315593 | A1 | 10/2014 | Vrzic et al. |
| 2014/0321375 | A1 | 10/2014 | Agiwal et al. |
| 2014/0369201 | A1 | 12/2014 | Gupta et al. |
| 2015/0103725 | A1 | 4/2015 | Sun et al. |
| 2016/0020877 | A1 | 1/2016 | Koutsimanis et al. |
| 2016/0073302 | A1 | 3/2016 | Yang et al. |
| 2016/0113039 | A1 | 4/2016 | Hole et al. |
| 2016/0135153 | A1 | 5/2016 | Suzuki et al. |
| 2016/0234759 | A1 | 8/2016 | Kubota et al. |
| 2016/0353343 | A1 | 12/2016 | Rahman et al. |
| 2017/0201980 | A1 | 7/2017 | Hakola et al. |
| 2017/0230985 | A1 | 8/2017 | Yamada et al. |
| 2017/0289791 | A1 | 10/2017 | Yoo et al. |
| 2017/0290052 | A1 | 10/2017 | Zhang et al. |
| 2017/0331670 | A1 | 11/2017 | Parkvall et al. |
| 2017/0331785 | A1 | 11/2017 | Xu et al. |
| 2017/0359731 | A1 | 12/2017 | Soldati et al. |
| 2018/0123763 | A1 | 5/2018 | Yu |
| 2018/0124598 | A1 | 5/2018 | Zeng |
| 2018/0139656 | A1 | 5/2018 | Xu et al. |
| 2018/0167938 | A1 | 6/2018 | Stephenne et al. |
| 2018/0198504 | A1 | 7/2018 | Li et al. |
| 2018/0199361 | A1 | 7/2018 | Zhang et al. |
| 2018/0242304 | A1 | 8/2018 | Rong et al. |

FOREIGN PATENT DOCUMENTS

| | | | |
|---|---|---|---|
| EP | 3051906 | A1 | 8/2016 |
| EP | 3082362 | A1 | 10/2016 |
| EP | 3101971 | A1 | 12/2016 |
| WO | 2014/090200 | A1 | 6/2014 |
| WO | 2014/090208 | | 6/2014 |
| WO | 2015/045658 | A1 | 4/2015 |
| WO | 2015/080646 | A1 | 6/2015 |
| WO | 2015/100533 | A1 | 7/2015 |
| WO | 2015/113205 | A1 | 8/2015 |
| WO | 2015/141982 | A1 | 9/2015 |

OTHER PUBLICATIONS

3rd Generation Partnership Project (3GPP) TR 22.864 V14.1.0, Technical Specification Group Services and System Aspects, Feasibility Study on New Services and Markets Technology Enablers—Network Operation, Stage 1 (Release 14), Sep. 2016, 35 pages.

3rd Generation Partnership Project (3GPP) TR 22.863 V14.1.0, Technical Specification Group Services and System Aspects, Feasibility Study on New Services and Markets Technology Enablers—Enhanced Mobile Broadband, Stage 1 (Release 14), Sep. 2016, 21 pages.

3rd Generation Partnership Project (3GPP) TR 22.863 V0.3.1, Technical Specification Group Services and System Aspects, Feasibility Study on New Services and Markets Technology Enablers—Enhanced Mobile Broadband; Stage 1 (Release 14), Feb. 2016, 13 pages.

3rd Generation Partnership Project (3GPP) TR 22.862 V14.1.0, Technical Specification Group Services and System Aspects, Feasibility Study on New Services and Markets Technology Enablers for Critical Communications, Stage 1 (Release 14), Sep. 2016, 31 pages.

3rd Generation Partnership Project (3GPP) TR 22.861 V14.1.0, Technical Specification Group Services and Systems Aspects, Feasibility Study on New Services and Markets Technology Enablers for Massive Internet of Things, Stage 1 (Release 14), Sep. 2016, 28 pages.

3rd Generation Partnership Project (3GPP) SA WG2 Meeting #115 S2-162511 "Common CP functions and dedicate CP function for simultaneous multiple Network Slice (update of solution 1.3)" May 23-27, 2016, 4 pages.

3rd Generation Partnership Project (3GPP) S2-162982 was S2-162717-MDD and Slice Selection in core and RAN V1, 3rd vol. SA WG2 Nokia et al., No. Nanjing, PR. China; May 27, 2016, 13 pages.

3rd Generation Partnership Project (3GPP) S2-161324 SA WG2 Meeting #113, Solution to Key Issue on Mobility Framework, Sophia Antipolis, FR, Feb. 23-26, 2016, 3 pages.

3rd Generation Partnership Project (3GPP) S2-161198 SA WG2 Meeting #113AH, Solution for optimized UE sleep state and state transitions, Sophia Antipolis, France, Feb. 23-26, 2016, 3 pages.

3rd Generation Partnership Project (3GPP) S1-161323 TSG-SA WG1 Meeting #74, Editorial cleanup and alignment of eMBB TR22.863, Venice, Italy, May 9-13, 2016, 4 pages.

3rd Generation Partnership Project (3GPP) S1-152395 Revision of S1-152074, ZTE Corporation et al., "Update the network slicing use case in Smarter", ZTE Smarter Update the Network Slicing Use case REV3, vol. SA WG1, No. Belgrade Serbia, Aug. 24, 2015, 3 pages.

3rd Generation Partnership Project (3GPP) RP-161214 TSG RAN Meeting #72, Revision of SI: Study on New Radio Access Technology, NTT DOCOMO, Busan, Korea, Jun. 13-16, 2016, 8 pages.

3rd Generation Partnership Project (3GPP) RP-160540 TSG RAN Meeting #71, New WI proposal: Signalling reduction to enable light connection for LTE, Gothenburg, Sweden, Mar. 7-10, 2016, 7 pages.

3rd Generation Partnership Project (3GPP) RP-160425 TSG RAN Meeting #71, Further enhancements on signaling reduction to enable light connection for LTE, Intel Corporation, Gothenburg, Sweden, Mar. 7-10, 2016, 7 pages.

3rd Generation Partnership Project (3GPP) RP-160301 TSG RAN Meeting #71, Motivation for new WI on Light Connection in LTE, Huawei, HiSilicon, Goteborg, Sweden, Mar. 7-11, 2016, 14 pages.

(56) References Cited

OTHER PUBLICATIONS

3rd Generation Partnership Project (3GPP) R2-162571 TSGRAN WG2 Meeting #93bis, Introduction of Virtual Cell, CATT, Dubrovnik, Croatia, Apr. 11-15, 2016, 3 pages.
Sesia et al., "LTE—The UMTS Long Term Evolution", Chapter 9.3.3., LTE—The UMTS Long Term Evolution : from theory to Practice; Jul. 20, 2011, pp. 198-200.
Samsung: "Signaling of Slot Structure", 3GPP Draft; R1-1609127, 3rd Generation Partnership Project (3GPP), Mobile Competence Centre; 650, Route Des Lucioles; F-06921 Sophia Anti Polis Ceo Ex ; France, RAN WG1, No. Lisbon, Portugal; 2016101 O-Oct. 14, 2016 Sep. 30, 2016.
Qualcomm Incorporated: "Frame structure requirements", 3GPP Draft; vol. RAN WG1, No. Nanjing, China; May 14, 2016.
NGMN 5G Initiative White Paper v1.0, Feb. 17, 2015, 125 pages.
International Telecommunication Union (ITU-R), "IMT Vision—Framework and overall objectives of the future development of IMT for 2020 and beyond", Recommendation ITU-R M.2083-0, Sep. 2015, 21 pages.
IEEE P802.11, Wireless LANs, Proposed TGax draft specification, Comment Resolutions on UL MU Operation, Jul. 25, 2016, 27 pages.
Chu, David, "Polyphase Codes With Good Periodic Correlation Properties", IEEE Transactions on Information Theory, Jul. 1972, 531-532.
Budisin S. "Decimation Generator of Zadoff-Chu Sequences", In: Carlet C., Pott A. (eds) Sequences and Their Applications—SETA 2010. SETA 2010. Lecture Notes in Computer Science, vol. 6338. Springer, Berlin, Heidelberg, 2010, 40 pages.
3rd Generation Partnership Project; (3GPP) TSG-RAN WG1 #86bis, R1-1610177, "DL Control Channels Overview", Qualcomm Incorporated, Oct. 10-14, 2016, Lisbon, Portugal, Discussion, Oct. 1, 2016, 6 pages.
3rd Generation Partnership Project; (3GPP) TS 36.331 V13.0.0, Technical Specification Group Radio Access Network; Evolved Universal Terrestrial Radio Access (E-UTRA); Radio Resource Control (RRC); Protocol specification (Release 13), Dec. 2015, 507 pages.
3rd Generation Partnership Project; (3GPP) TS 36.304 V13.0.0, 3rd Generation Partnership Project; Technical Specification Group Radio Access Network; Evolved Universal Terrestrial Radio Access (E-UTRA); User Equipment (UE) Procedures in idle Mode (Release 13), Dec. 2015, 42 pages.
3rd Generation Partnership Project; (3GPP) TS 36.211 V13.1.0, 3rd Generation Partnership Project; Technical Specification Group Radio Access Network; Evolved Universal Terrestrial Radio Access (E-UTRA); Physical Channels and Modulation (Release 13), Mar. 2016, 155 pages.
3rd Generation Partnership Project; (3GPP) TR 38.913 V0.2.0, 3rd Generation Partnership Project; Technical Specification Group Radio Access Network; Study on Scenarios and Requirements for Next Generation Access Technologies; (Release 14), Feb. 2016, 19 pages.
3rd Generation Partnership Project; (3GPP) TR 23/99, "Technical Specification Group Services and System Aspects; Study on Architecture for Next Generation System (Release 14)", vol. SA WG2, No. V0.5.0, Jun. 8, 2016, pp. 1-179.
3rd Generation Partnership Project; (3GPP) TR 22.891 V1.1.0, 3rd Generation Partnership Project; Technical Specification Group Services and System Aspects; Feasibility Study on New Services and Markets Technology Enablers; Stage 1 (Release 14), Nov. 2015, 95 pages.
3rd Generation Partnership Project (3GPP), TSG RAN WG1 Meeting #86, "RAN1 Chairman's Notes", Gothenburg, Sweden, Aug. 22-26, 2016, 105 pages.
3rd Generation Partnership Project (3GPP), TS 36.212 V10.8.0, RAN WG1, Technical Specification Group Radio Access Network; Evolved Universal Terrestrial Radio Access (E-UTRA); Multiplexing and Channel Coding (Release 10), Jun. 17, 2013, pp. 1-79.
3rd Generation Partnership Project (3GPP), RI-165027, vol. RAN WG1, Nokia et al: "Basic frame structure 1 principles for 5G", 3GPP Draft; No. Nanjing, P.R. China; May 23, 2016-May 27, 2016 May 13, 2016.
3rd Generation Partnership Project (3GPP) TSG-RAN WG2 Meeting #94, R2-163718 "Control Plane functions in NR", Nanjing, China; May 23-27, 2016, 4 pages.
3rd Generation Partnership Project (3GPP) TSG-RAN WG2 Meeting #94 R2-163371, "System Information Signalling Design in NR", May 23-27, 2016, 7 pages.
3rd Generation Partnership Project (3GPP) TSG-RAN WG1#85, R1-165363, Nokia, Alcatel-Lucent Shanghai Bell, Scalability of MIMO Operation Across NR Carrier Frequencies, Nanjing, P.R. China, May 23-27, 2016, 5 pages.
3rd Generation Partnership Project (3GPP) TSG-RAN WG1#85 R1-165027 "Basic Frame Structure Principles for 5G" May 23-27, 2016, 6 pages.
3rd Generation Partnership Project (3GPP) TSG-RAN WG1 #85, R1-164628, Frame Structure for NR, Ericsson, Nanjing, China, May 23-27, 2016, 3 pages.
3rd Generation Partnership Project (3GPP) TSG RAN WG1 Meeting #86bis R1-1610524, WF on NR RS Definition, Huawei, HiSilicon, Lisbon, Portugal, Oct. 10-14, 2016, Agenda Item: 81 4.4, 4 pages.
3rd Generation Partnership Project (3GPP) TSG RAN WG1 Meeting #85, R1-165174, Uplink Multiple Access Schemes for NR, May 23-27, 2016, 4 pages.
3rd Generation Partnership Project (3GPP) TSG RAN WG1 Meeting #85 R1-164871 "Frame structure for new radio interface", May 23-27, 2016, 3 pages.
3rd Generation Partnership Project (3GPP) TSG RAN WG1 Meeting #84bis, R1-162379, Overview of New Radio Access Technology Requirements and Designs, Apr. 11-15, 2016, 4 pages.
3rd Generation Partnership Project (3GPP) TSG RAN WG1 Meeting #84bis R1-162797, "Harq Enhancement for Improved Data Channel Efficiency", Busan, Korea, Apr. 11-15, 2016, 3 pages.
3rd Generation Partnership Project (3GPP) TSG RAN WG1 Meeting #83 R1-157351, Initial Views on Technical Design for NB-IoT, Nov. 15-22, 2015, 3 pages.
3rd Generation Partnership Project (3GPP) TSG RAN WG1 #85, R1-165669, Way Forward on Frame Structure, Qualcomm and etc., Nanjing, China, May 23-27, 2016, Agenda Item 7.1.4, 2 pages.
3rd Generation Partnership Project (3GPP) TSG RAN WG1 #85, R1-164014, Discussion on RS for Beamformed Access, Samsung, Nanjing, China, May 23-27, 2016, 3 pages.
3rd Generation Partnership Project (3GPP) TSG RAN WG1 #85, R1-164013, Framework for Beamformed Access, Samsung, Nanjing, China, May 23-27, 2016, 4 pages.
3rd Generation Partnership Project (3GPP) TSG RAN WG1 #84bis Meeting, R1-163757, Way Forward on Channel Coding Evaluation for 5G New Radio, Busan, Korea, Apr. 11-15, 2016, Agenda Item 8.1.6.1, 5 pages.
3rd Generation Partnership Project (3GPP) TS 36.321 V13.0.0, Technical Specification Group Radio Access Network, Evolved Universal Ten-estrial Radio Access (E-UTRA), Medium Access Control (MAC) protocol specification (Release 13), Dec. 2015, 82 pages.
3rd Generation Partnership Project (3GPP) TS 36.300 V13.3.0, Technical Specification Group Radio Access Network, Evolved Universal Ten-estrial Radio Access (E-UTRA) and Evolved Universal Terrestrial Radio Access Network (E-UTRAN), Overall description; Stage 2 (Release 13), Mar. 2016, 295 pages.
3rd Generation Partnership Project (3GPP) TS 36.213 V13.0.0, Technical Specification Group Radio Access Network, Evolved Universal Terrestrial Radio Access (E-UTRA), Physical layer procedures (Release 13), Dec. 2015, 326 pages.
3rd Generation Partnership Project (3GPP) TS 36.133 V14/.0, Technical Specification Group Radio Access Network, Evolved Universal Terrestrial Radio Access (E-UTRA), Requirements for support of radio resource management (Release 14), Mar. 2018, 2997 pages.
3rd Generation Partnership Project (3GPP) TS 24.302 V135.0, Technical Specification Group Core Network and Terminals, Access

(56) References Cited

OTHER PUBLICATIONS to the 3GPP Evolved Packet Core (EPC) via non-3GPP access networks; Stage 3 (Release 13), Mar. 2016, 126 pages.
3rd Generation Partnership Project (3GPP) TS 23A01 V13.6.1, Technical Specification Group Services and System Aspects, General Packet Radio Service (GPRS) enhancements for Evolved Universal Terrestrial Radio Access Network (E-UTRAN) access (Release 13), Mar. 2016, 365 pages.
3rd Generation Partnership Project (3GPP) TS 23.060 V13.6.0, Technical Specification Group Services and System Aspects, General Packet Radio Service (GPRS), Service description, Stage 2 (Release 13), Mar. 2016, 362 pages.
3rd Generation Partnership Project (3GPP) TR 45.820 V13.1.0, Technical Specification Group GSM/EDGE Radio Access Network, Cellular system support for ultra-low complexity and low throughput Internet of Things (CIoT) (Release 13), Nov. 2015, 495 pages.
3rd Generation Partnership Project (3GPP) TR 38.913 V14.3.0, Technical Specification Group Radio Access Network, Study on Scenarios and Requirements for Next Generation Access Technologies, (Release 14), Jun. 2017, 39 pages.
3rd Generation Partnership Project (3GPP) TR 38.801 V0.2.0, Technical Specification Group Radio Access Network, Study on New Radio Access Technology: Radio Access Architecture and Interface (Release 14), Jun. 2016, 20 pages.
3rd Generation Partnership Project (3GPP) TR 36.912 V13.0.0, Technical Specification Group Radio Access Network, Feasibility study for Further Advancements for E-UTRA (LTE-Advanced) (Release 13), Dec. 2015, 273 pages.
3rd Generation Partnership Project (3GPP) TR 36.897 V13.0.0, Technical Specification Group Radio Access Network, Study on Elevation Beamforming/Full-Dimension (FD) Multiple Input Multiple Output (MIMO) for LTE; (Release 13), Jun. 2015, 58 pages.
3rd Generation Partnership Project (3GPP) TR 36.881 V14.0.0, Technical Specification Group Radio Access Network, Evolved Universal Terrestrial Radio Access (E-UTRA), Study on Latency Reduction Techniques for LTE (Release 14), Jun. 2016, 249 pages.
3rd Generation Partnership Project (3GPP) TR 23.720 V13.0.0, Technical Specification Group Services and System Aspects, Study on architecture enhancements for Cellular Internet of Things, (Release 13), Mar. 2016, 94 pages.
3rd Generation Partnership Project (3GPP) TR 22.891 V14.2.0, Technical Specification Group Services and System Aspects, Feasibility Study on New Services and Markets Technology Enablers, Stage 1 (Release 14), Sep. 2016, 95 pages.

\* cited by examiner

| Oct 1 | R | $TM_1$ | $TM_2$ | $TM_3$ | $TM_4$ | $TM_5$ | $TM_6$ | $TM_7$ |
|---|---|---|---|---|---|---|---|---|
| Oct 2 | $TM_8$ | $TM_9$ | $TM_{10}$ | $TM_{11}$ | $TM_{12}$ | $TM_{13}$ | $TM_{14}$ | $TM_{15}$ |
| Oct 3 | $TM_{16}$ | $TM_{17}$ | $TM_{18}$ | $TM_{19}$ | $TM_{20}$ | $TM_{21}$ | $TM_{22}$ | $TM_{23}$ |
| Oct 4 | $TM_{24}$ | $TM_{25}$ | $TM_{26}$ | $TM_{27}$ | $TM_{28}$ | $TM_{29}$ | $TM_{30}$ | $TM_{31}$ |

FIG. 29

RADIO PDCCH TO FACILITATE NUMEROLOGY OPERATIONS

CROSS REFERENCE TO RELATED APPLICATIONS

This application claims the benefit of priority to U.S. Provisional Patent Application No. 62/334,935, filed May 11, 2016, U.S. Provisional Patent Application No. 62/401,055, filed Sep. 28, 2016, U.S. Provisional Patent Application No. 62/399,921, filed Sep. 26, 2016, and U.S. Provisional Patent Application No. 62/416,902, filed Nov. 3, 2016, the disclosures of which are incorporated by reference in their entireties.

BACKGROUND

Existing and proposed telecommunications networks and subnetwork, may operate in accordance with various standards, such as LTE, 4G, 5G, and 3GPP, to support diverse applications, such as live communication, entertainment media transmission, computer data transfer, and Internet-of-things (IoT), Web-of-things, and machine-to-machine (M2M) operations. Various standards include numerologies for the allocation of communications resources by subcarrier and timeslot. Various standards also include mechanisms for Physical Downlink Control Channel (PDCCH) operations.

SUMMARY

A New Radio Physical Downlink Control Channel (NR-PDCCH) may incorporate a number of features to facilitate multiple numerology operations to support such diverse uses as enhanced Mobile Broadband (eMBB), massive Machine Type Communication (mMTC), and ultra-reliable/low-latency applications (UR/LL). A user equipment (UE) device may, for example, blindly decode its own NR-PDCCH regardless of use cases or numerology. Alternatively, numerology allocation may be signaled on the MIB or SIB for the scenarios whereby numerology allocation is semi-statically updated. As another alternative, numerology allocation may be signaled on a Physical Downlink Numerology Indication Channel (PDNICH) for the scenarios whereby numerology allocation is dynamically updated.

The NR-PDCCH may be decoded on the fly using a new radio reference signal (NR-RS) for demodulating NR-PDCCH. For example, The NR-RS and NR-PDCCH are using the same pre-coding/beamforming. The NR-RS may be masked with a UE-specific sequence The NR-PDCCH may support flexible frame structure and FDD/TDD hybrid multiplexing. For example, the UE search space may be predefined by higher layer signaling, such as Radio Resource Control (RRC.)

Some DCI may be split into multicast-NR-PDCCH and pre-coded-NR-PDCCH portions. For example, the multicast-NR-PDCCH may provide the DL grant location and NR-RS resource information for the pre-coded-NR-PDCCH of that grant. Once the terminal decodes this multicast-NR-PDCCH, the terminal may determine the location of a pre-coded NR-PDCCH and decode it to determine the transmission mode, NR-RS information for the layers, antenna configuration, etc.

In NR, it is desired that dynamic transmission mode switching be supported which takes advantage of the fast fading channel, and may provide more flexibility and improve a user's experience.

In order to address the problems associated with the large latency of transmission mode switching in the current 3GPP system, the following example mechanisms to enable dynamic transmission mode switching, while not increasing the number of blind decoding attempts, are herein proposed.

A new downlink control signaling, Physical Slot Format Indicator Channel (PSFICH), to inform the UE about necessary information of the current slot, such as the length of the slot, the symbols for downlink transmission region, and the symbols for uplink transmission region. The PSFICH may be transmitted at the first symbol of each slot. The PSFICH may also be encoded in low coding rate and transmitted in transmit diversity mode to improve reliability;

A two-tier NR PDCCH may be used to support dynamic transmission mode switching and reduce the blind decoding attempts. The first tier NR PDCCH may be transmitted in the downlink control region, and its search space could be common and/or UE-specific. The first tier NR PDCCH may have a unified NR DCI format, which does not depend on the transmission mode. The first tier NR PDCCH may also contain the necessary information for the second tier NR PDCCH blind decoding, such as the index of the NR DCI format used for the second tier NR PDCCH and the search space indicator used to configure the second tier NR PDCCH search space. The second tier NR PDCCH may contain all of the required information for the scheduled downlink transmission. The second tier NR PDCCH may be transmitted in the control region or the data region. The second tier NR PDCCH search space may be UE-specific and may be determined by the search space indicator in the first tier NR PDCCH, the current slot structure, and/or the UE ID. For different transmission modes, the second tier NR PDCCH may have different DCI formats, which are signaled in the first tier NR PDCCH. The transmit diversity scheme or beam based diversity scheme may be applied to signals in the control region, and the NR PDCCH located in the data region may be configured with the same transmission mode as the data channel.

Another option to signal the index of the second tier NR DCI format, which may be through the MAC CE. In this case, the first tier NR PDCCH may not be necessary; NR transmission modes, the number of which is much less the number of transmission modes in the current LTE; and NR DCI formats for different NR transmission modes to support the two-tier NR PDCCH.

In order to address the need for enhanced initial access signal design that supports beamforming for NR networks, the following solutions are proposed:

A DL initial access signal which contains a DL synchronization channel (signals), a beam reference signal and a PBCH channel; a DL initial access signal which is carried by a DL beam sweeping block, each beam sweeping block containing either a single OFDM or multiple OFDM symbols; a DL beam sweeping subframe which may contain multiple beam sweeping blocks; DL synchronization channels PSS and SSS which can be placed at different OFDM symbols; a beam sweeping block which contains only one DL synchronization channel; a beam reference signal and a PBCH which may co-exist in the same OFDM symbol or in different OFDM symbols; and a PBCH which might have a different transmission period than the DL synchronization channel and beam reference signals.

If the DL synchronization channel carries both the cell and beam ID, then the UE can detect the cell and beam ID from the DL synchronization channel. Therefore, the UE can know which DL beam sweeping block is detected and is able to calculate the timing offset between the detected beam sweeping block to the DL sweeping subframe.

If the DL synchronization channel only carries the cell ID, then the UE can detect the beam ID from the beam reference signal. Therefore, the UE can know which DL beam sweeping block is detected and is able to calculate the timing offset between the detected beam sweeping block to the DL sweeping subframe.

Mechanisms for Control Channel Designs can include techniques to assign resources for NR-DCI and waveform for UL signaling. Mechanisms to aid control channel estimation and allocation of UL and DL resources within sub-bands can limit the computational burden on the UE.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

FIG. 29 shows an example transmission mode activation/deactivation MAC control element of four octets.

FIG. 56A is a diagram that illustrates NR-DCI for a UE is repeated in all beams. FIG. 56B is a diagram that illustrates NR-DCI for a UE is transmitted only on 2 out of 4 beams.

DETAILED DESCRIPTION

Figure 1:
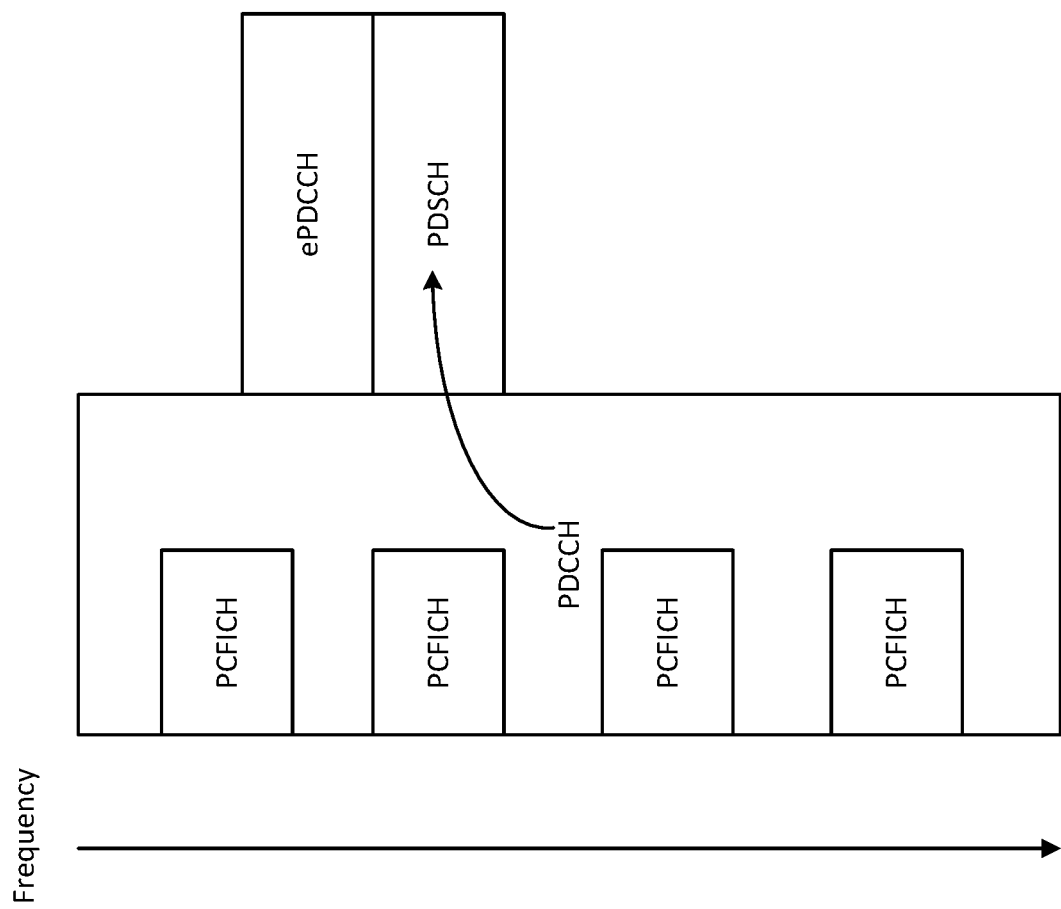
FIG. 1 illustrates LTE PDCCH for indicating DL PDSCH resource allocation.

New radio download numerology allocation information may be obtained through master information block data, system information block data, radio resource control signals, or a physical downlink numerology indication channel, and used along with a reference signal detected in a search space to obtain resource element positions in an antenna port reference signal in a resource block that belongs to a particular band slice according to a reference signal allocation scheme for a band slice numerology. A physical download control may then be decoded based upon one or more resource elements of the reference signal, allowing the connection of, e.g., an enhanced mobile broadband, massive machine type communication, or ultra-reliable/low-latency application to a communications network thereby.

Alternatively, multiple physical downlink control channels may be speculatively demodulated at each of a number calculated reference signal locations within one or more search spaces. A physical downlink control channel may be selected based on passing a cyclic redundancy check. The cyclic redundancy check may be masked with an identifier of the apparatus.

Reference signal detection may be achieved by correlating a received signal of the resource element with a specific reference signal of the apparatus. The search space may be provided by a radio resource control signal. The physical download control channel may include a reference signal using the same pre-coding or beamforming.

For ultra-reliable/low-latency applications, for example, the reference signal data may be frequency division multiplexed only, and not time division multiplexed, to meet latency requirements. For enhanced mobile broadband applications, for example, the reference signal and data may be multiplexed in both frequency and time division.

The physical downlink control channel may be multicast, and may comprise a downlink grant location and reference signal resource information, allowing the location of a pre-coded physical downlink control channel to be determined, and a transmission mode or antenna configuration to be determined thereby.

In the current LTE, switching between different transmission modes is configured by RRC signaling, and within each configured transmission mode, a UE is allowed to fall back from the configured transmission mode to a default transmit diversity scheme. As the exact subframe number when this configuration takes effect in the UE is not specified, there is a period when the network and the UE may have different understandings of which transmission mode is configured. Therefore, the UE may suffer from the latency of semi-static RRC signaling.

An objective of the Study Item on New Radio (NR) Access Technology is to identify and develop technology components needed for systems operating at frequencies up to 100 GHz. For example, see 3GPP TR 38.913, Study on Scenarios and Requirements for Next Generation Access Technologies; (Release 14), V0.3.0, as well as RP-161214, Revision of SI: Study on New Radio Access Technology, NTT DOCOMO. To compensate for the increased path loss in these High Frequency NR (HF-NR) systems, beamforming is expected to be widely used. However, the existing initial access signal design such as DL synchronization, reference signal and PBCH design, which is based on omnidirectional or sector-based transmission, does not support the functions required for beamforming based access (e.g., beam sweeping, beam pairing, beam training, etc.)

Downlink Control Information (DCI) is a predefined format in which the DCI is formed and transmitted in Physical Downlink Control Channel (PDCCH). The DCI format tells the UE how to get its data which is transmitted on Physical Downlink Shared Channel (PDSCH) in the same subframe. It carries the details for the UE such as number of resource blocks, resource allocation type, modulation scheme, redundancy version, coding rate, etc., which help UE find and decode PDSCH from the resource grid. There are various DCI formats used in LTE in PDCCH.

Currently 3GPP standardization efforts are underway to define the NR frame structure. Consensus is to build the so called 'self-contained' time intervals for NR. A self-contained time interval is understood to contain the control information for a grant, the data and its acknowledgement (i.e., ACK/NACK) all within a time interval and is expected to have configurable UL/DL/side link allocations and reference signals within its resources. See, e.g., 3GPP R1-164694 Frame Structure Requirements, Qualcomm, May 2016.

Table 1 is a list of acronyms relating to service level technologies that may appear in the description below. Unless otherwise specified, the acronyms used herein refer to the corresponding term listed below.

TABLE 1

| | Acronyms |
|---|---|
| 2D | Two-Dimensional |
| 3D | Three-Dimensional |
| A/N | ACK/NACK, Acknowledgement/Non-acknowledgement |
| AAS | Active Antenna System |
| AoA | Angle or Arrival |
| AoD | Angle of Departure |
| API | Application Program Interface |
| AS | Access Stratum |
| BCCH | Broadcast Control Channel |
| BCH | Broadcast Channel |
| BL | Bandwidth reduced Low complexity |
| CE | Control Element |
| CMAS | Commercial Mobile Alert System |
| CN | Core Network |
| CoMP | Coordinated Multi Point |
| CP | Cyclic Prefix |
| CQI | Channel Quality Indication |
| C-RNTI | Cell Radio-Network Temporary Identifier |
| CRS | Cell-specific Reference Signals |
| CSG | Closed Subscriber Group |
| CSI | Channel State Information |
| CSI-RS | Channel State Information Reference Signals |
| DCI | Downlink Control Information |
| DL | Downlink |
| DL-SCH | Downlink Shared Channel |
| DM-RS | Demodulation Reference Signals |
| DRX | Discontinuous Reception |
| E2E | End to End |
| EAB | Extended Access Barring |
| eCell | Extended Cell |
| eDRX | Extended Discontinuous Reception |
| eMBB | enhanced Mobile Broadband |
| ENB | Evolved Node B |
| ePDCCH | Enhanced Physical Downlink Control Channel |
| ETWS | Earthquake and Tsunami Warning System |
| E-UTRA | Evolved Universal Terrestrial Radio Access |
| E-UTRAN | Evolved Universal Terrestrial Radio Access Network |
| FD | Full-Dimension |
| FDD | Frequency Division Duplex |
| FFS | For Further Study |
| GUI | Graphical User Interface |
| HARQ | Hybrid Automatic Repeat Request |
| HD | High Definition |
| ID | Identification |
| IE | Information element |
| IMT | International Mobile Telecommunications |
| IOT | Internet of Things |
| KP | Kronecker Product |
| KPI | Key Performance Indicators |
| LC-MTC | Low Cost or Low Complexity Machine-Type Communications |
| LTE | Long term Evolution |
| MAC | Medium Access Control |
| MBB | Mobile Broadband |
| MBSFN | Multicast-Broadcast Single-Frequency Network |
| MCL | Maximum Coupling Loss |
| MCS | Modulation and Coding Scheme |
| MIB | Master Information Block |
| MIMO | Multiple-Input and Multiple-Output |
| MME | Mobility Management Entity |
| mMTC | massive Machine Type Communication |
| MTC | Machine-Type Communications |
| MVNO | Mobile Virtual Network Operator |
| NAS | Non-access Stratum |
| NB | Narrow Beam |
| NB-IOT | Narrow band IoT |

TABLE 1-continued

| | Acronyms |
|---|---|
| NDI | New Data Indicator |
| NEO | Network Operation |
| NGMN | Next Generation Mobile Networks |
| NR | New Radio, i.e., 5G |
| NR-PDCCH | New Radio Physical Downlink Control Channel |
| OCC | Orthogonal Cover Codes |
| OFDM | Orthogonal frequency division multiplexing |
| PBCH | Physical Broadcast Channel |
| PCFICH | Physical Control Format Indicator Channel |
| PDCCH | Physical Downlink Control Channel |
| PDNICH | Physical Downlink Numerology Indication Channel |
| PDSCH | Physical Downlink Shared Data Channel |
| PHICH | Physical Hybrid ARQ Indicator Channel |
| PLMN | Public Land Mobile Network |
| PMCH | Physical Multicast Channel |
| PMI | Precoder Matrix Indication |
| PRACH | Physical Random Access Channel |
| PRB | Physical Resource Block |
| PRS | Positioning Reference Signals |
| PUCCH | Physical Uplink Control Channel |
| PUSCH | Physical Uplink Shared Channel |
| RAN | Radio Access Network |
| RAT | Radio Access Technology |
| RB | Resource block |
| RE | Resource Element |
| RI | Rank Indication |
| RNTI | Radio Network Temporary Identifier |
| R-PDCCH | Relay-Physical Downlink Control Channel |
| RRC | Radio Resource Control |
| RS | Reference Signal |
| RSRP | Reference Signal Received Power |
| RSRQ | Reference Signal Received Quality |
| RSSI | Received Signal Strength Indicator |
| RV | Redundancy Version |
| SC-FDMA | Single carrier frequency division multiple access |
| SFN | System Frame Number |
| SI | System Information |
| SIB | System Information Block |
| SIBe | SIB Essential |
| SIPF | SI Provisioning Function |
| SI-RNTI | System Information RNTI |
| SISO | Single-Input and Single-Output |
| SMARTER | Feasibility Study on New Services and Markets Technology |
| SPS-RNTI | Semi persistent scheduling RNTI |
| SR | Scheduling Request |
| SRS | Sounding Reference Signal |
| sTTI | Short TTI |
| TAU | Tracking Area Update |
| TBS | Transport Block Size |
| TDD | Time Division Duplex |
| TPC | Transmit Power Control |
| TRP | Transmission and Reception Point |
| TRP | Transmission and Reception Point |
| TTI | Transmission Time Interval |
| UE | User Equipment |
| UHD | Ultra-high definition |
| UL | Uplink |
| UR/LL | Ultra-Reliable - Low Latency |
| URLLC | Ultra-Reliable and Low Latency Communications |
| vTTI | Variable TTI |
| WB | Wide Beam |
| WLAN | Wireless Local Area Network |
| WRC | Wireless Planning Coordination |

In LTE, PDCCH is used to indicate UL and DL grants/transmission. FIG. 1 illustrates LTE PDCCH for indicating DL PDSCH resource allocation. PDCCH carries the control information about the data being transmitted on the current subframe and the information about the resources which UEs need to use for the uplink data. PDCCH carries a message called downlink control information (DCI) which includes resource assignments for a UE or group of UE's.

The are several DCI formats in LTE. Format 0 is used for transmission of Uplink Shared Channel (UL-SCH) allocation. Format 1 is used for transmission of DL-SCH allocation for Single Input Multiple Output (SIMO) operation.

Format 1A is used for compact transmission of DL-SCH allocation for SIMO operation or allocating a dedicated preamble signature to a UE for random access. Format 1B is used for transmission control information of Multiple Input Multiple Output (MIMO) rank 1 based compact resource assignment. Format 1C is used for very compact transmission of PDSCH assignment. Format 1D same as format 1B with additional information of power offset. Format 2 and Format 2A for transmission of DL-SCH allocation for closed and open loop MIMO operation, respectively. Format 2B is used for the scheduling of dual layer transmission (antenna ports 7 & 8). Format 2C is used for the scheduling of up to 8 layer transmission (antenna ports 7 to 14) using TM9. Format 2D is used for the scheduling of up to 8 layer transmission (antenna ports 7 to 14) using TM10. Format 3 and Format 3A are used for transmission of TPC command for an uplink channel. Format 4 is used for the scheduling of PUSCH with multi-antenna port transmission mode.

Allocation of PDCCH resources happens in terms of CCE (Control Channel Elements). One CCE=nine continuous REGs (Resource element Groups)=36 REs, i.e., 1 REG=4 RE. PDCCH uses the resources present in first n OFDM symbols where n—Value present in PCFICH, e.g., the number of OFDM symbols. The number of CCEs present to transmit the control information will be variable depending on the: PCFICH value; bandwidth of the system from 1.4 MHz to 20 MHz; and the number of antenna ports present which in turn will affect the reference signals present.

The total number of REs available is determined from the first n OFDM symbols, where n is from the value of PCFICH. Total REs allocated for PDCCH may be equal to n×x×y, where n is a PCFICH value, x is the number of subcarriers in 1 RB, and y is the total number of RBs in a system BW. For an example, suppose n=3 and system BW=10 MHz. The total number of available REs=3×12× 50=1800 REs in n=3 OFDM symbols. The available allocable REs for PDCCH may be expressed as total REs: the number of REs used for RS, the number of REs used in PHICH, together with the number of REs used in PCFICH. Therefore, the number of available PDCCH CCE's=REs for PDCCH/36.

There are two PDCCH search spaces: the common search space and the UE-specific search space. A UE is required to monitor both common and UE-specific search space. There might be overlap between common & UE-specific search spaces for a UE.

For the common search space, eNodeB uses only aggregation level 4 and 8 for the allocation in common search space. The maximum number of CCE's present in common search space is fixed as 16. If the total number of CCE's available in the system are less than 16 for any bandwidth then all the CCE's will be present in common search space. The position of Common search space CCE's is always fixed starting from the first CCE index.

The UE-specific search space may carry DCIs for UE-specific allocations using the UE's assigned C-RNTI, semi-persistent scheduling (SPS C-RNTI), or initial allocation (temporary C-RNTI). The UE monitors the UE-specific search space at all aggregation levels (1, 2, 4, and 8).

Figure 2:
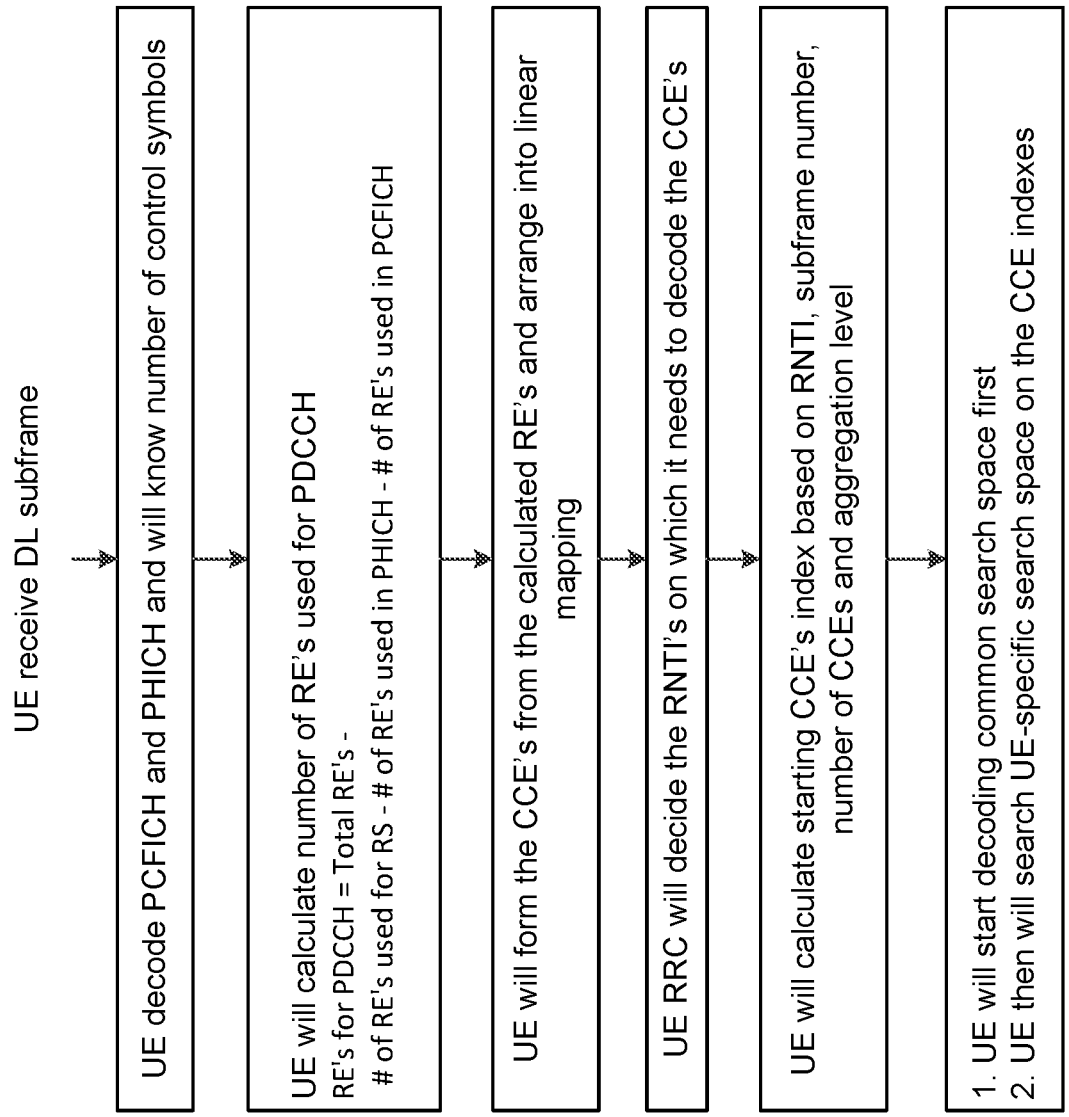
FIG. 2 is a flow diagram of an example UE blind PDCCH decoding method for an LTE UE.

FIG. 2 is a flow diagram of an example UE blind PDCCH decoding method for an LTE UE. The UE may do blind decoding either because the UE has no information about the CCE's used by PDCCH, the UE does not know the aggregation level used by eNodeB, or the UE does not have information about the DCI format used by eNodeB The UE is only informed of the number of OFDM symbols within the control region of a subframe and is not provided with the location of its corresponding PDCCH. The UE finds its PDCCH by monitoring a set of PDCCH candidates in every subframe. This is referred to as blind decoding.

The eNodeB may calculate CCE indexes for a UE, e.g., with an Aggregation Level with a value of 1, 2, 4 or 8. PDCCH candidates may include a number of CCE indexes searched by a UE in a subframe for a particular search space. The PDCCH Format may be a DCI format such as 0, 1, 2, 3, or 4.

Figure 3:
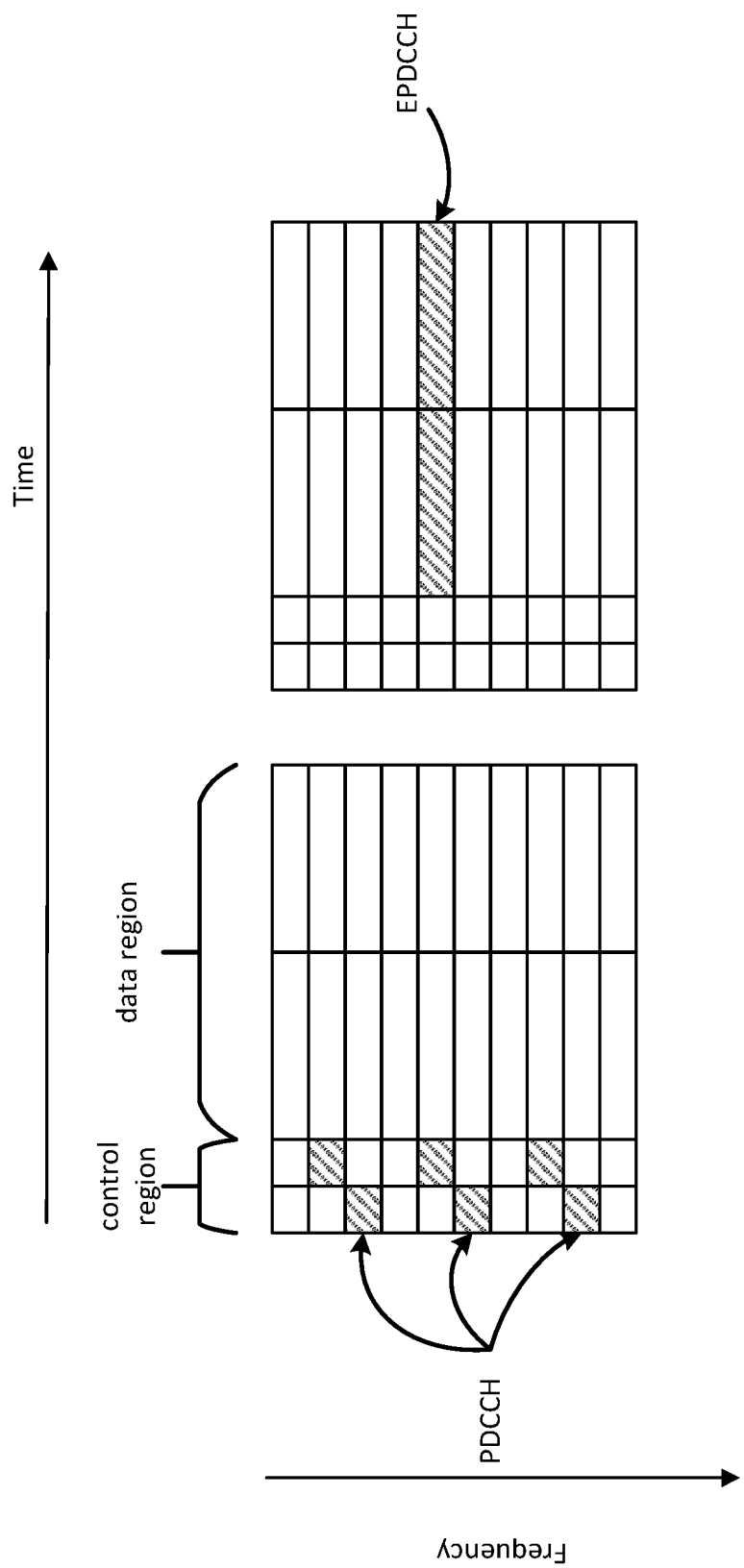
FIG. 3 shows an example of resource allocations for legacy LTE PDCCH and EPDCCH.

In addition to the conventional PDCCH of R8, the EPDCCH is available in R11. FIG. 3 shows an example of resource allocations for legacy LTE PDCCH and EPDCCH. The EPDCCH uses the PDSCH resources to transmit DL control information to increase the control channel capacity. The ePDCCH is especially useful when cross-carrier scheduling is used for carrier aggregation.

For R11, the EPDCCH is configured to be used for dedicated search space only, i.e., there is no E-PDCCH being included in common search space.

The fundamental resource units used in a legacy PDCCH are the resource element groups (REGs). Comparable to the PDCCH, the basic resources of an EPDCCH are the enhanced resource element groups (EREGs) which are used to build the enhanced control channel element (ECCE). An EPDCCH is transmitted using one or more enhanced CCEs or ECCEs. An ECCE is made up of four or eight EREGs. There are 16 possible EREGs (0, 1, 2, . . . 15) in a PRB pair. A CCE has 36 REs. The number of available REs in an ECCE varies, depending on: the size of Legacy control region; sub-frame type; PSS/SSS/PBCH in the PRB; number of CRS ports; and the number of CSI-RS ports.

There are a number of possibilities for EREG and ECCE mappings. The fundamental motivations for different mappings methods are: to achieve simplicity and common design for any configuration, e.g., localized and distributed transmission; to achieve frequency diversity gain; and support ECCE level or PRB level ICIC.

EPDCCH transmissions categorized as either distributed or localized. In localized transmission, ECCE resources are mapped to a single or adjacent PRB pair. An EPDCCH may make use of ECCEs within one PRB pair at lower aggregation level or use adjacent PRB pairs if more ECCEs are needed in case of higher aggregation level. Localized transmission is more beneficial in situations where there is effective PDCCH for LTE-A Systems channel state information (CSI) feedback. This also leverages frequency-selective scheduling and beamforming. For each serving cell, the subframes in which the UE monitors EPDCCH UE-specific search spaces are configured by higher layers. The UE monitors a set of EPDCCH candidates on one or more activated serving cells as configured by higher layer signaling for control information, where monitoring implies attempting to decode each of the EPDCCHs in the set according to the monitored DCI formats. For EPDCCH_type='Localized', the EPDCCH is transmitted on a single antenna port chosen from ports 107, . . . 110 as a function of a number of parameters including the RNTI. For EPDCCH type='Distributed', the EPDCCH is transmitted on two antenna ports, either {107,109} for normal cyclic prefix or {107,108} for extended cyclic prefix. The EPDCCH and its DMRS must be beam-formed and mapped to physical antennas for transmission. The beamforming vectors here are chosen in accordance with TS36.101 Annex B.4.4 for distributed transmission and TS36.101 Annex B.4.5 for localized transmission. The EPDCCH and its DMRS must undergo the same beam-forming, therefore they may be processed together when applying the beam-forming.

It is expected that ultra-reliable, low-latency applications, such as drone control and remote surgery, and some mMTC applications, such as robotic control and industry automation, will significantly benefit from reduced control and user plane latencies. So there is considerable interest in having the UL and DL numerologies for 5G accommodate such use cases without requiring backward compatibility with LTE.

3GPP TR 38.913, Study on Scenarios and Requirements for Next Generation Access Technologies, Release 14, V0.2.0, defines scenarios and requirements for next generation access technologies. The following are excerpts of the Key Performance Indicators (KPI) section of 3GPP TR 38.913 that are relevant to low latency design.

"7.5 User Plane Latency [ . . . ] For URLLC the target for user plane latency should be 0.5 ms for UL, and 0.5 ms for DL. Furthermore, if possible, the latency should also be low enough to support the use of the next generation access technologies as a wireless transport technology that can be used within the next generation access architecture. [ . . . ] NOTE1: The reliability KPI also provides a latency value with an associated reliability requirement. The value above should be considered an average value and does not have an associated high reliability requirement. [ . . . ] For eMBB, the target for user plane latency should be 4 ms for UL, and 4 ms for DL. [ . . . ] NOTE2: For eMBB value, the evaluation needs to consider all typical delays associated with the transfer of the data packets in an efficient way (e.g. applicable procedural delay when resources are not preallocated, averaged HARQ retransmission delay, impacts of network architecture)."

A network may be "sliced," where each slice is composed of a collection of logical network functions that supports the communication service requirements of a particular use case or set of use cases. For example, a 3GPP operator's network may be divided into a critical MTC slice, a massive MTC, and MBB slice, whereby it is possible to direct UEs to selected slices in a way that fulfill operator or user needs, e.g., based on subscription or UE type. Network slicing primarily targets a partition of the core network. However, the Radio Access Network (RAN) may need specific functionality to support multiple slices, or even partitioning of resources for different network slices. See, e.g., 3GPP TR 22.891, Feasibility Study on New Services and Markets Technology Enablers (SMARTER), Stage 1, Release 14, V-1.1.0.

Potential network slicing service requirements are defined in 3GPP TR 22.891, whereby the 3GPP system shall allow the operator to compose network slices, independent sets of network functions, e.g., such as parameter configurations for hosting multiple enterprises or Mobile virtual network operators (MVNOs), network functions from different vendors, etc. Under 3GPP TR 22.891, the operator shall be able to dynamically create network slices to form a complete, autonomous, and fully operational network customized to cater for different diverse market scenarios. The 3GPP system shall be able to identify certain UEs and subscribers to be associated with a particular network slice. The 3GPP system shall be able to enable a UE to obtain service from a specific network slice e.g., based on subscription or UE type.

In Long Term Evolution (LTE), multi-antenna techniques are used to achieve improved system performance, including improved system capacity (more users per cell) and improved coverage (possibility for larger cells), as well as improved service provisioning (e.g., higher per-user data rates). The availability of multiple antennas at the transmitter and/or the receiver can be utilized in different ways to achieve different aims. For example, see E. Dahlman, S. Parkvall, J. Skold, "4G LTE/LTE-Advanced for Mobile Broadband," second edition, 2014. These aims include antenna diversity, beamforming, and spatial multiplexing.

In antenna diversity, multiple antennas at the transmitter and/or the receiver can be used to provide additional diversity against fading on the radio channel.

In antenna beamforming, multiple antennas at the transmitter and/or the receiver can be used to "shape" the overall antenna beam in a certain way—for example, to maximize the overall antenna gain in the direction of the target receiver or to suppress specific dominant interfering signals.

In antenna spatial multiplexing, the simultaneous availability of multiple antennas at the transmitter and receiver can be used to create multiple parallel communication "channels" over the radio interface. This provides high data rates within a limited bandwidth, which is referred to as Multiple-Input and Multiple-Output (MIMO) antenna processing.

In LTE, there are currently ten different transmission modes, which are summarized in Table 2. The transmission mode is configured to the UE through RRC signaling in LTE.

TABLE 2

Transmission Modes in LTE

| LTE Rel | Transmission Mode | Description |
|---|---|---|
| 8 | 1 | Single-antenna transmission |
| 8 | 2 | Transmit diversity |
| 8 | 3 | Open-loop codebook-based pre-coding in the case of more than one layer, transmit diversity in the case of rank-one transmission |
| 8 | 4 | Closed-loop codebook-based pre-coding |
| 8 | 5 | Multi-user-MIMO version of transmission mode 4 |
| 8 | 6 | Special case of closed loop codebook-based pre-coding limited to single-layer transmission |
| 8 | 7 | Non-codebook-based pre-coding supporting single-layer PDSCH transmission |
| 9 | 8 | Non-codebook-based pre-coding supporting up to two layers |
| 10 | 9 | Non-codebook-based pre-coding supporting 8 layers |
| 11 | 10 | Extension of transmission mode 9 for enhanced support of different means of DL multi-point coordination and transmission, also referred to as CoMP |

The Downlink Control Information (DCI) is a predefined format in which the DCI is formed and transmitted in a Physical Downlink Control Channel (PDCCH). The DCI format tells the UE how to get its data which is transmitted on Physical Downlink Shared Channel (PDSCH) in the same subframe. It carries the details for the UE such as number of resource blocks, resource allocation type, modulation scheme, redundancy version, coding rate, etc., which help UE find and decode PDSCH from the resource grid. There are various DCI formats used in LTE in PDCCH. The different DCI formats are included in Table 3.

TABLE 3

DCI Formats

| DCI Format | Usage | Major Contents |
|---|---|---|
| Format 0 | UL Grant. Resource Allocation for UL Data | RB Assignment, Transmit Power Control (TPC), PUSCH Hopping Flag |
| Format 1 | DL Assignment for Single-Input and Single-Output (SISO) | RB Assignment, TPC, Hybrid Automatic Repeat Request (HARQ) |
| Format 1A | DL Assignment for SISO (compact) | RB Assignment, TPC, HARQ |
| Format 1B | DL Assignment for MIMO with Rank 1 | RB Assignment, TPC, HARQ, PMI |
| Format 1C | DL Assignment for SISO (minimum size) | RB Assignment |
| Format 1D | DL Assignment for Multi User MIMO | RB Assignment, TPC, HARQ, DL Power Offset |
| Format 2 | DL Assignment for Closed Loop MIMO | RB Assignment, TPC, HARQ, pre-coding Information |
| Format 2A | DL Assignment for Open Loop MIMO | RB Assignment, TPC, HARQ, pre-coding Information |
| Format 2B | DL Assignment for Transmission Mode 8 (Dual layer beamforming) | RB Assignment, TPC, HARQ, pre-coding Information |
| Format 2C | DL Assignment for Transmission Mode 9 | RB Assignment, TPC, HARQ, pre-coding Information |
| Format 3 | TPC Commands for PUCCH and PUSCH with 2 bit power adjustment | Power Control Only |
| Format 3A | TPC Commands for PUCCH and PUSCH with 1 bit power adjustment | Power Control Only |
| Format 4 | UL Assignment for UL MIMO (up to 4 layers) | RB Assignment, TPC, HARQ, pre-coding Information |

Each PDCCH supports multiple DCI formats and the format used is a priori unknown to the UE. Therefore, the UE needs to blindly detect the format of the PDCCHs. To reduce the number of blind decoding attempts, LTE defines search spaces as a set of candidate control channels formed by control-channel elements (CCEs) at a given aggregation level, which the UE is supposed to attempt to decode. Each UE has UE-specific search spaces, which are determined by the UE ID and the subframe number. In addition, common search spaces are defined for the PDCCH, and all UEs monitor the candidates in the common search spaces for PDCCH.

The DCI formats to be monitored in the UE-specific search spaces depend on the transmission modes configured to the UE.

System Information (SI) is the information broadcast by the Evolved Universal Terrestrial Radio Access Network (E-UTRAN) that needs to be acquired by the UE to be able to access and operate within the network. SI is divided into the MasterInformationBlock (MIB) and a number of SystemInformationBlocks (SIGs). A high level description of the MIB and SIBs is provided in 3GPP TS 36.300, Overall description; Stage 2 (Release 13), V13.3.0, and is summarized in Table 4. Detailed descriptions are available in 3GPP TS 36.331, Radio Resource Control (RRC); Protocol specification (Release 13), V13.0.0.

TABLE 4

System Information

| Information Block | Description |
|---|---|
| MIB | Defines the most essential physical layer information of the cell required to receive further system information |
| SIB1 | Contains information relevant when evaluating if a UE is allowed to access a cell and defines the scheduling of other system information |
| SIB2 | Radio resource configuration information that is common for all UEs |
| SIB3 | Cell re-selection information common for intra-frequency, inter-frequency and/or inter-RAT cell re-selection (i.e., applicable for more than one type of cell re-selection but not necessarily all) as well as intra-frequency cell re-selection information other than neighboring cell related |
| SIB4 | Neighboring cell related information relevant only for intra-frequency cell re-selection |
| SIB5 | Information relevant only for inter-frequency cell re-selection (i.e., information about other E UTRA frequencies and inter-frequency neighboring cells relevant for cell re-selection) |
| SIB6 | Information relevant only for inter-RAT cell re-selection (i.e., information about UTRA frequencies and UTRA neighboring cells relevant for cell re-selection) |
| SIB7 | Information relevant only for inter-RAT cell re-selection (i.e., information about GERAN frequencies relevant for cell re-selection) |
| SIB8 | Information relevant only for inter-RAT cell re-selection (i.e., information about CDMA2000 frequencies and CDMA2000 neighboring cells relevant for cell re-selection) |

TABLE 4-continued

System Information

| Information Block | Description |
|---|---|
| SIB9 | Home eNB name (HNB Name) |
| SIB10 | Earthquake and Tsunami Warning System (ETWS) primary notification |
| SIB11 | ETWS secondary notification |
| SIB12 | Commercial Mobile Alert System (CMAS) notification |
| SIB13 | Information required to acquire the MBMS control information associated with one or more MBSFN areas |
| SIB14 | Extended Access Barring (EAB) parameters |
| SIB15 | MBMS Service Area Identities (SAI) of the current and/or neighboring carrier frequencies |
| SIB16 | Information related to GPS time and Coordinated Universal Time (UTC) |
| SIB17 | Information relevant for traffic steering between E-UTRAN and WLAN |
| SIB18 | Indicates E-UTRAN supports the Sidelink UE information procedure and may contain sidelink communication related resource configuration information |
| SIB19 | Indicates E-UTRAN supports the sidelink UE information procedure and may contain sidelink discovery related resource configuration information |
| SIB20 | Contains the information required to acquire the control information associated transmission of MBMS using Single Cell-Point to Multi-point (SC-PTM) |

Currently, 3GPP standardization efforts are underway to design the framework for beamformed access. The characteristics of the wireless channel at higher frequencies are significantly different from the sub-6 GHz channel that LTE is currently deployed on. The key challenge of designing the new Radio Access Technology (RAT) for higher frequencies will be in overcoming the larger path-loss at higher frequency bands. In addition to this larger path-loss, the higher frequencies are subject to an unfavorable scattering environment due to blockage caused by poor diffraction. Therefore, MIMO/beamforming is essential in guaranteeing sufficient signal level at the receiver end. For example, see R1-164013, Framework for beamformed access, Samsung Relying solely on MIMO digital pre-coding used by digital BF to compensate for the additional path-loss in higher frequencies seems not enough to provide similar coverage as that below 6 GHz. Thus, the use of analog beamforming for achieving additional gain can be an alternative in conjunction with digital beamforming. A sufficiently narrow beam should be formed with multiple antenna elements, which is likely to be quite different from the one assumed for the LTE evaluations. For large beamforming gain, the beam-width correspondingly tends to be reduced, and hence the beam with the large directional antenna gain cannot cover the whole horizontal sector area specifically in a 3-sector configuration. The limiting factors of the number of concurrent high gain beams include the cost and complexity of the transceiver architecture.

From these observations above, multiple transmissions in time domain with narrow coverage beams steered to cover different serving areas are necessary. Inherently, the analog beam of a subarray can be steered toward a single direction at the time resolution of an OFDM symbol or any appropriate time interval unit defined for the purpose of beam steering across different serving areas within the cell. Hence the number of subarrays determines the number of beam directions and the corresponding coverage on each OFDM symbol or time interval unit defined for the purpose of beams steering. In some literature, the provision of multiple narrow coverage beams for this purpose has been called "beam sweeping." For analog and hybrid beamforming, the beam sweeping seems to be essential to provide the basic coverage in NR. For analog and hybrid beamforming with massive MIMO, multiple transmissions in time domain with narrow coverage beams steered to cover different serving areas is essential to cover the whole coverage area within a serving cell in NR.

One concept closely related to beam sweeping is the concept of beam pairing which is used to select the best beam pair between a UE and its serving cell. This can be used for control signaling or data transmission. For the downlink transmission, a beam pair will consist of a UE RX beam and a NR-Node TX beam while for uplink transmission, a beam pair will consist of a UE TX beam and a NR-Node RX beam.

Another related concept is the concept of beam training which is used for beam refinement. For example, a coarser sector beamforming may be applied during the beam sweeping and sector beam pairing procedure. Beam training may then follow where, for example, the antenna weights vector is refined, followed by the pairing of high gain narrow beams between the UE and NR-Node.

R2-162571, Introduction of Virtual Cell, CATT, defines a virtual cell as multiple TRPs (Transmission Reception Points) with the same cell ID under the control of a central unit. Common information or cell-level information is transmitted in a large cell area and dedicated data is transmitted from adjacent TRPs near the UE with realization of CP/UP split.

3GPP TR 38.913, Study on Scenarios and Requirements for Next Generation Access Technologies; (Release 14), V0.3.0, defines scenarios and requirements for next generation access technologies. The Key Performance Indicators (KPIs) for eMBB, URLLC and mMTC devices are summarized in Table 5.

TABLE 5

KPIs for eMBB, URLLC and mMTC Devices

| Device | KPI | Description | Requirement |
|---|---|---|---|
| eMBB | Peak data rate | Peak data rate is the highest theoretical data rate which is the received data bits assuming error-free conditions | 20 Gbps for downlink and |

TABLE 5-continued

KPIs for eMBB, URLLC and mMTC Devices

| Device | KPI | Description | Requirement |
|---|---|---|---|
| | | assignable to a single mobile station, when all assignable radio resources for the corresponding link direction are utilized (e.g., excluding radio resources that are used for physical layer synchronization, reference signals or pilots, guard bands and guard times). | 10 Gbps for uplink |
| | Mobility interruption time | Mobility interruption time means the shortest time duration supported by the system during which a user terminal cannot exchange user plane packets with any base station during transitions. | 0 ms for intra-system mobility |
| | Data Plane Latency | For the eMBB value, the evaluation needs to consider all typical delays associated with the transfer of the data packets in an efficient way (e.g., applicable procedural delay when resources are not pre-allocated, averaged HARQ retransmission delay, impacts of network architecture). | 4 ms for UL, and 4 ms for DL |
| URLLC | Control Plane Latency | Control plane latency refers to the time to move from a battery efficient state (e.g., IDLE) to start of continuous data transfer (e.g., ACTIVE). | 10 ms |
| | Data Plane Latency | For URLLC, the target for user plane latency for UL and DL. Furthermore, if possible, the latency should also be low enough to support the use of the next generation access technologies as a wireless transport technology that can be used within the next generation access architecture. | 0.5 ms |
| | Reliability | Reliability can be evaluated by the success probability of transmitting X bytes (1) within 1 ms, which is the time it takes to deliver a small data packet from the radio protocol layer 2/3 SDU ingress point to the radio protocol layer 2/3 SDU point of the radio interface, at a certain channel quality (e.g., coverage-edge). NOTE1: Specific value for X is FFS. | 1-10-5 within 1 mS. |
| mMTC | Coverage | "Maximum coupling loss" (MCL) in uplink and downlink between device and Base Station site (antenna connector(s)) for a data rate of [X bps], where the data rate is observed at the egress/ingress point of the radio protocol stack in uplink and downlink. | 164 dB |
| | UE Battery Life | User Equipment (UE) battery life can be evaluated by the battery life of the UE without recharge. For mMTC, UE battery life in extreme coverage shall be based on the activity of mobile originated data transfer consisting of [200 bytes] Uplink (UL) per day followed by [20 bytes] Downlink (DL) from Maximum Coupling Loss (MCL) of [tbd] dB, assuming a stored energy capacity of [5Wh]. | 15 years |
| | Connection Density | Connection density refers to total number of devices fulfilling specific Quality of Service (QoS) per unit area (per km2). QoS definition should take into account the amount of data or access request generated within a time t_gen that can be sent or received within a given time, t_sendrx, with x % probability. | 106 devices/km2 |

A network slice is composed of a collection of logical network functions that support the communication service requirements of particular use case(s). It shall be possible to direct terminals to selected slices in a way that fulfil operator or user needs, for example, based on subscription or terminal type. The network slicing primarily targets a partition of the core network, but it is not excluded that Radio Access Network (RAN) may need specific functionality to support multiple slices or even partitioning of resources for different network slices For example, see 3GPP TR 22.891, Feasibility Study on New Services and Markets Technology Enablers (SMARTER); Stage 1 (Release 14), V1.3.2.

3GPP TR 38.913 Study on Scenarios and Requirements for Next Generation Access Technologies; (Release 14), V0.2.0, defines scenarios and requirements for next generation access technologies. The following are excerpts of the Key Performance Indicators (KPI) section of 3GPP TR 38.913 that impose new requirements that are relevant to the 5G MIMO procedure:

7.1 Peak data rate: the target for peak data rate may be 20 Gbps for downlink and 10 Gbps for uplink, for example;

7.2 Peak Spectral efficiency: the target for peak spectral efficiency may be 30 bps/Hz for downlink and 15 bps/Hz for uplink;

7.10 Coverage: the target for coverage may be 164 dB, for example;

7.12 UE energy efficiency: UE energy efficiency means the capability of a UE to sustain much better mobile broadband data rate while minimizing the UE modem energy consumption; and 7.19 Network energy efficiency: the capability is to minimize the RAN energy consumption while providing a much better area traffic capacity.

The 3GPP TR 22.863 Feasibility Study on New Services and Markets Technology Enablers—Enhanced Mobile Broadband; Stage 1 (Release 14), V0.3.1, identifies the use cases and consolidates requirements for the following families for the eMBB scenario: Higher Data Rates, Higher Density, Deployment and Coverage, and Higher User Mobility.

Control channels for UL and DL NR will have a beam centric architecture. The DL control signaling on multiple beams in currently undefined in NR. NR-DCI may be pre-coded; so solutions are required to support channel estimation for DL control signals. On the UL, multiple waveforms may be supported—CP-OFDM and DFTS-OFDM are the supported alternatives. NR must support mechanisms to assign a waveform to the UE.

It is projected that 5G will support various use cases, eMBB, mMTC and UR/LL. The solutions in standard LTE may be inadequate to address the scenarios that 5G multiple numerologies approaches seek to address. Also lacking are solutions to seamlessly multiplex applications using different numerologies simultaneously.

One challenge presented is the design of the DL control channel to support multiple numerologies. 5G is expected to support multiple numerologies of TTIs, e.g., variations in CP length, subcarrier spacing or symbol duration, and the number of symbols in the TTI. Multiple numerologies may be multiplexed on to the same time-frequency resource grid.

Figure 4:
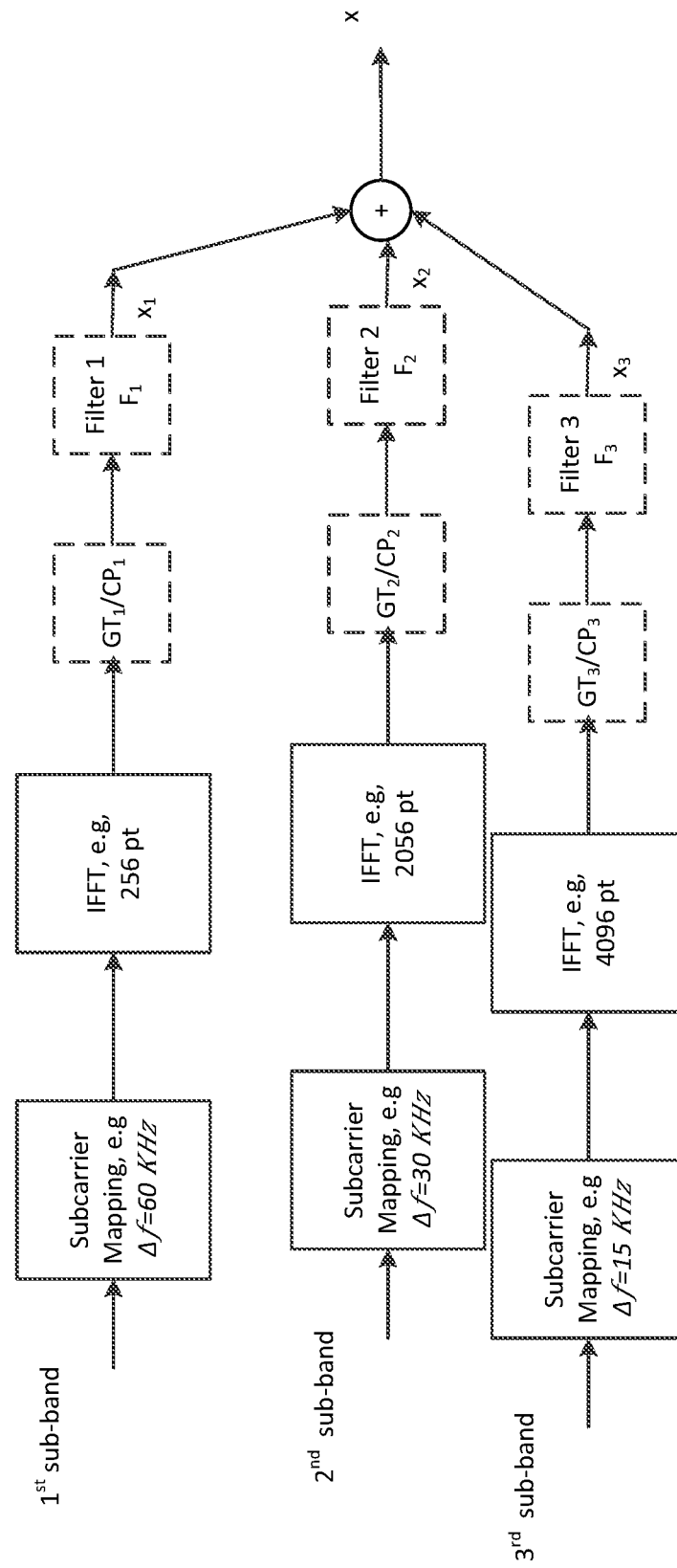
FIG. 4 is a block diagram of an example configuration of a 5G transmitter for multiplexing different numerologies.

FIG. 4 shows an example configuration of a 5G transmitter multiplexing different numerologies. The numerologies are described in Table 6. The data channel and control channel in 4G LTE use one fixed common numerology in a cell. The design of PDCCH in 4G LTE considers only one fixed numerology in the cell. In a 5G system, use cases/services with different numerologies and latency requirements may be supported simultaneously. This also implies their corresponding downlink control channels will have different TTI lengths and subcarrier spacing/symbol lengths. UEs of each use case need to know where to find their DL control channels. The design of DL control channel in 5G should support multiplexing of use cases such as eMBB, mMTC, and UR/LL.

Figure 5:
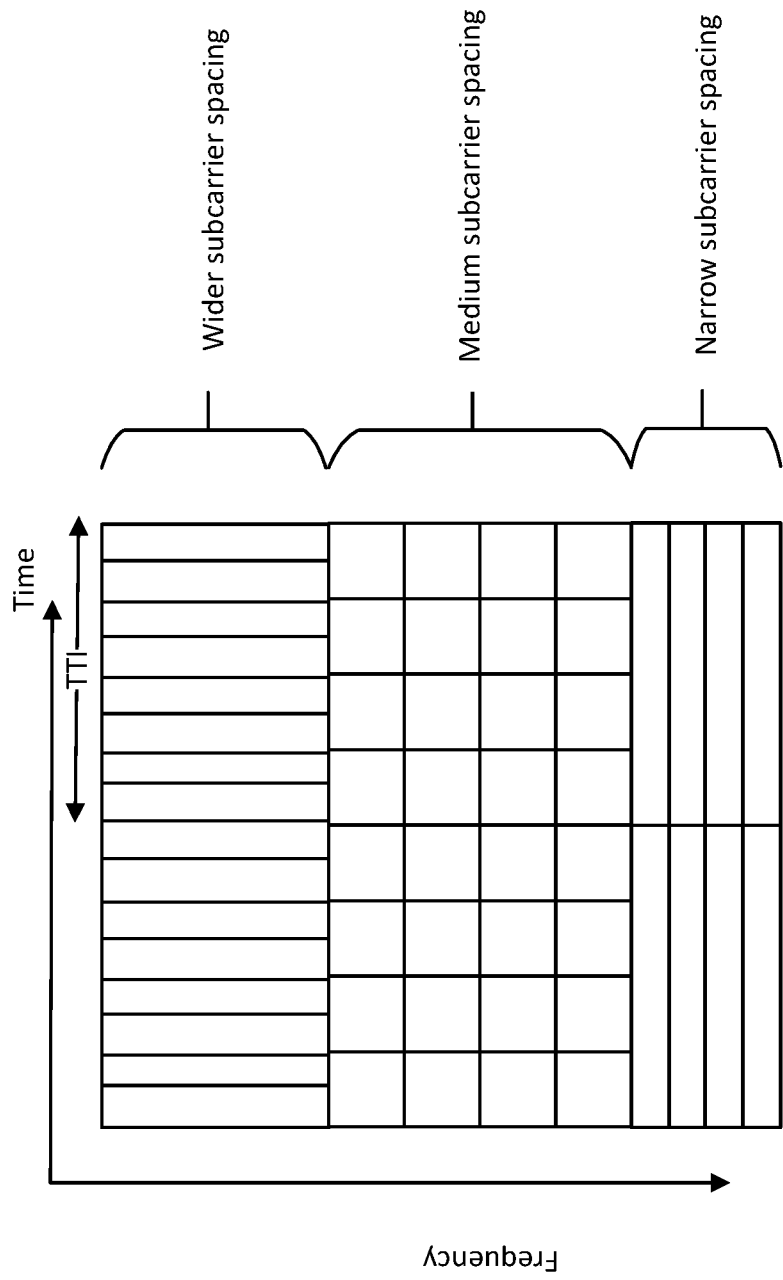
FIG. 5 shows an example configuration of multiplexed numerologies for various use cases.

FIG. 5 shows an example configuration of multiplexed numerologies for 5G belonging to numerologies of case-1, case-2 and case-3.

Another challenge presented is DL control channel to support flexible frame structure in 5G. 5G provides various levels of QoS with bundled TTI designs for latency/efficiency tradeoff. In addition, 5G may support service-aware TTI multiplexing and self-contained TDD subframes.

However, if 5G inherits the PDCCH design in LTE, it will inherit certain shortcomings. For example, UEs may need to monitor the full bandwidth since the PDCCH is transmitted on the full bandwidth. For 5G mMTC, it may not be feasible to monitor full carrier BW. Further, in LTE, PDSCH demodulation is based on DM-RS while the PDCCH decoding is based on CRS, i.e., always-on. This kind of decoding latency and hierarchy might not be suitable for UR/LL in 5G. Also, LTE uses strict time domain division between control and data channels. 5G may require support for flexible time frame structures. Further still, EPDCCH beamforming with the PDSCH support may be required on demand.

Herein, the term "band slice" may refer to time-frequency resources configured for each numerology or the network slices configured for each numerology or group of UEs using each numerology. The term "bTTI" refers to the base transmission time interval in a 5G frame. A bTTI is a unit of a transmission time interval during which the band slice configuration cannot change. A band slice may be defined, for example, by one of the following parameters, or a combination thereof: symbol duration; subcarrier spacing; CP duration; resources in the time and frequency domain; adjoining guard band on top and bottom of the band slice; bTTI duration; TTI duration of each numerology; and/or the number of symbols.

Figure 6:
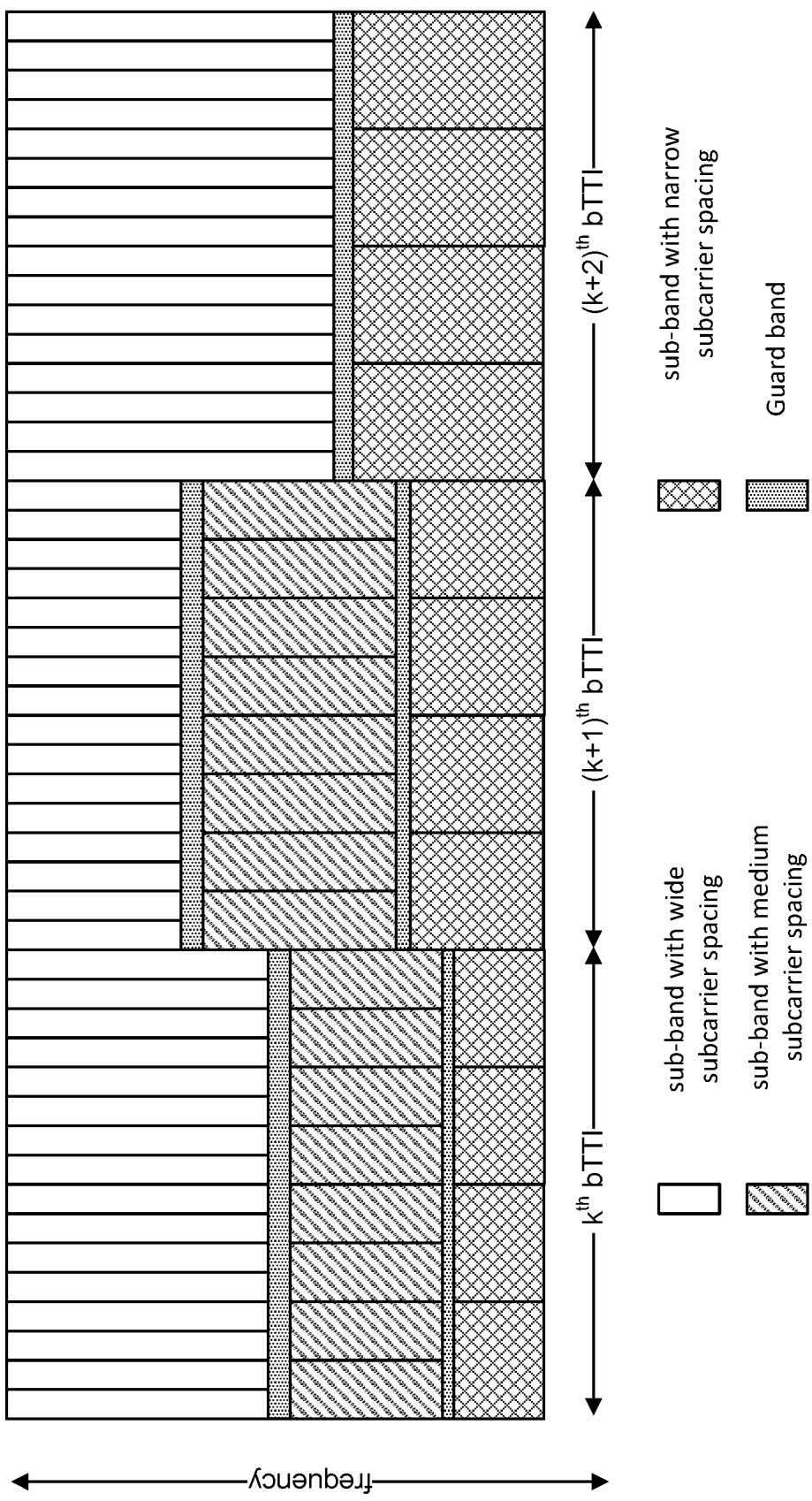
FIG. 6 shows an example time varying band slice configuration for different numerologies.

The band slices in a DL may be configurable either dynamically or semi-statically, thereby providing flexibility in assigning resources to different network slices. FIG. 6 shows an example configuration of time varying frequency assignments to different band slices in a DL resource grid. Every bTTI shows a different band slice configuration. Additionally, within each bTTI the resources are multiplexed in frequency.

Figure 7:
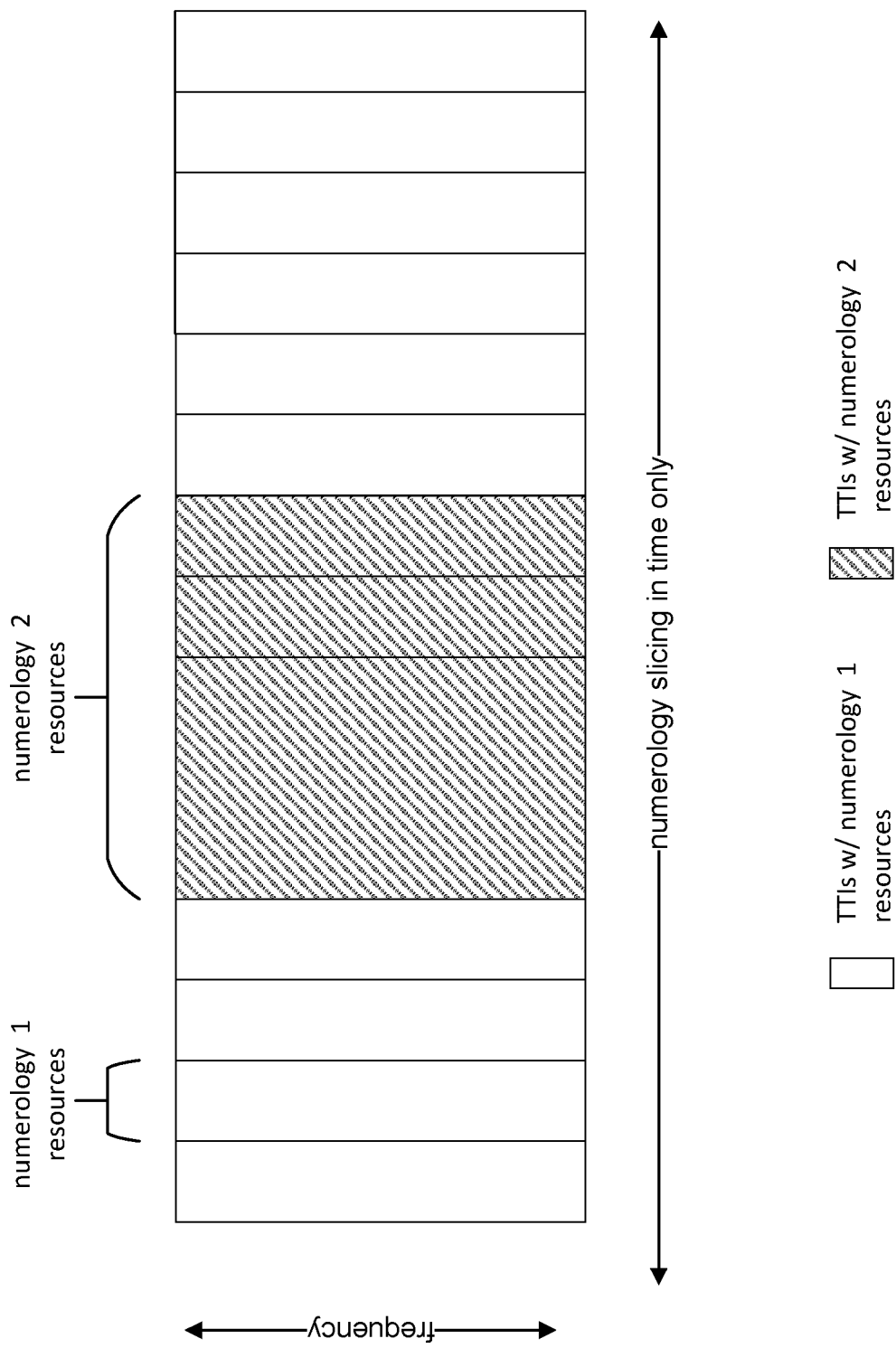
FIG. 7 shows an example of numerology slicing in time only.
Figure 8:
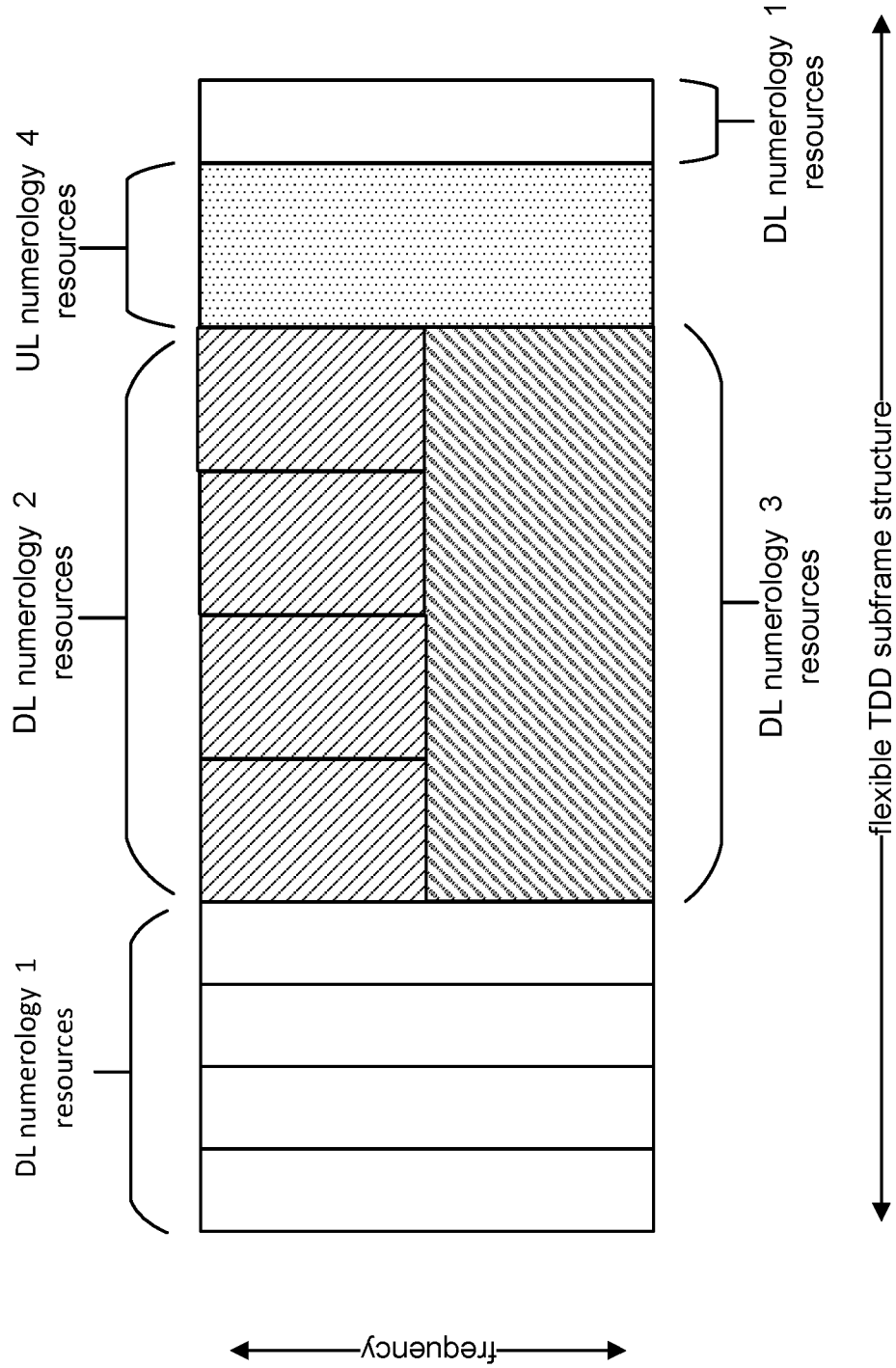
FIG. 8 shows an example of numerology slicing in both time and frequency resource.

The resource grid within a bTTI may be partitioned across the band slices in other ways, such as through time multiplexing, as shown in FIG. 7. Alternatively, the resource grid within a bTTI may be partitioned across the band slices by both time and frequency multiplexing as showing in FIG. 8.

Figure 9:
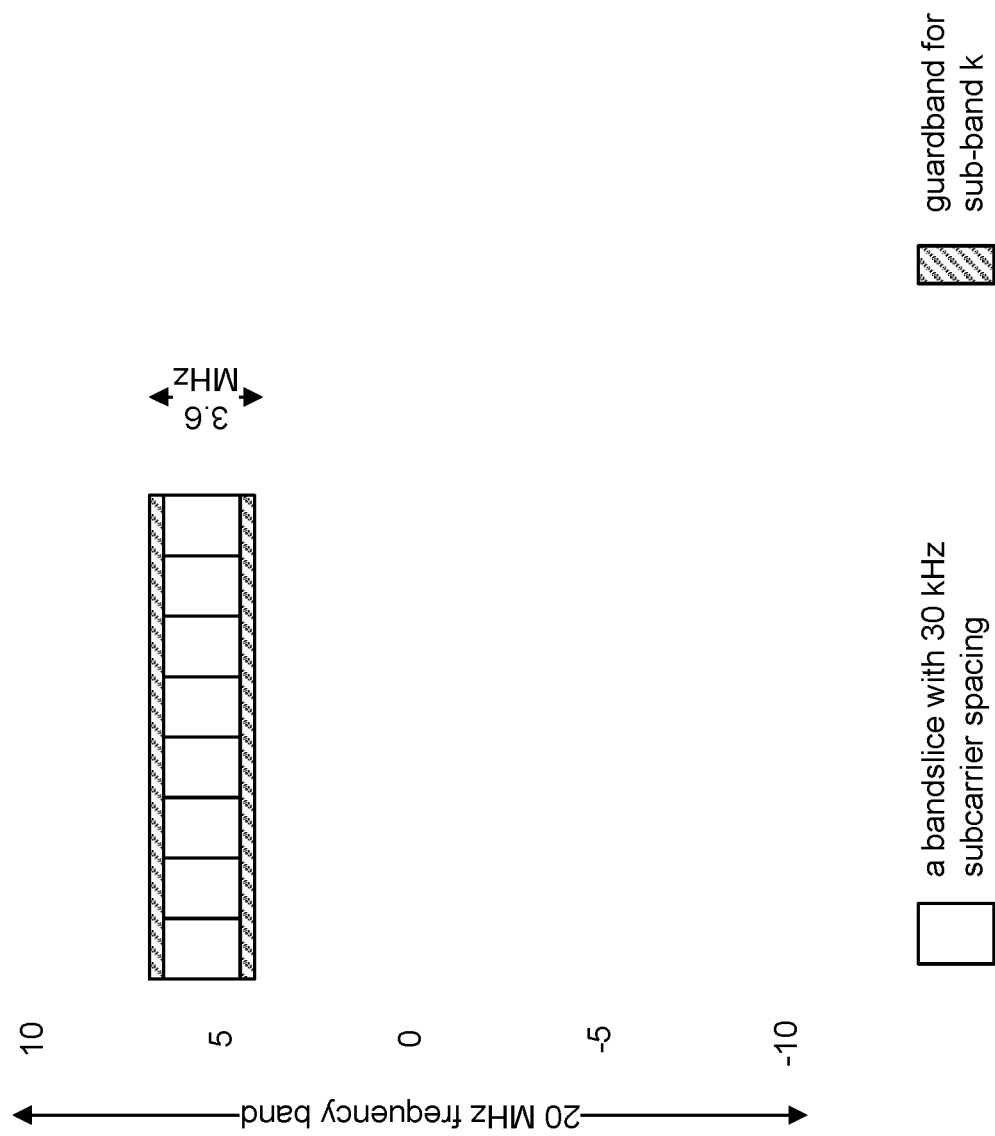
FIG. 9 shows an example of resource assignment in a DL based on a bandsliceConfig-k.

System information, such as the MIB, may provide numerology allocation information in a network where the numerology configuration is semi-statically updated. Accordingly, the system information may carry information pertaining to the number of permissible band slices, e.g., numBandslices K, and the configurations, e.g., bandsliceConfig-k where k=1, 2, . . . K. FIG. 9 shows an example of resource assignment in a DL based on a bandsliceConfig-k.

TABLE 6

Example numerologies supported in 5G

| | 5G numerology case 1 | 5G numerology case 2 | 5G numerology case 3 |
|---|---|---|---|
| Subcarrier spacing | $\Delta f = 15$ KHz, with $y = 1$ | $\Delta f = 30$ KHz with $y = 2$ | $\Delta f = 60$ KHz with with $y = 4$ |
| $T_{guard}(z)$ | $T_{guard}(z = 1) = 4.7$ µs | $T_{guard}(z = 2) = 2.35$ µs | $T_{guard}(z = 3) = 1.175$ µs |
| Minimum TTI | 71.37 µs | 35.68 µs | 17.57 µs |

Table 7 shows an example configuration of the fields defining the $k^{th}$ band slice for a 20 MHz carrier and shows the corresponding pictorial depiction. Updates to the configuration may be made through RRC and MAC CE.

TABLE 7

Configuration of bandsliceConfig-k bandsliceConfig-k
    cpConfig-k = 2.35 (µs)
    subcarrierSpacing = 30 (KHz)
    guardBandTop = 90 (KHz)
    guardBandBottom = 90 (KHz)
    numResources = 120 (30 KHz subcarriers)
    startResource = 7.5 (MHz from the center of band)

Figure 10:
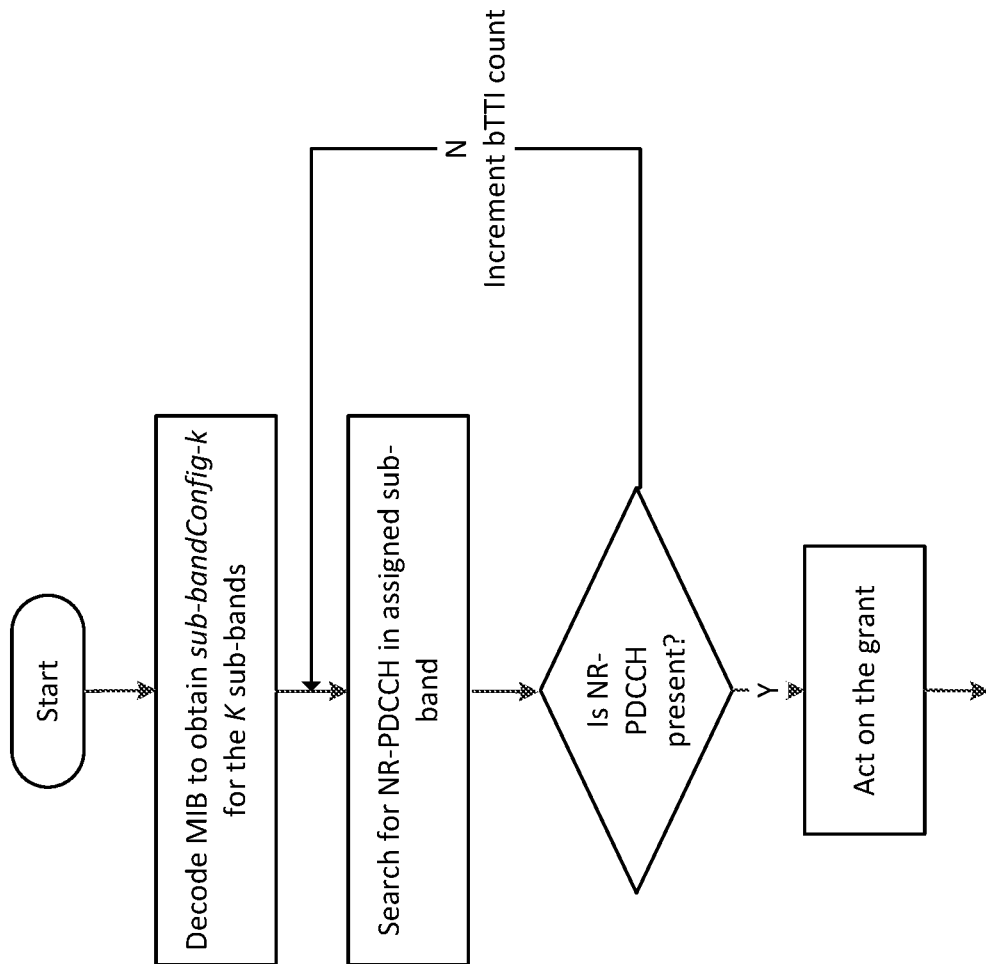
FIG. 10 is a flow chart of an example UE method to obtain the band slice configuration through system information where the information is configured through the MIB.

FIG. 10 shows an example UE method to obtain the band slice configuration through system information through the MIB. The UE decodes the MIB then holds the numerology configuration. The UE then decodes the NR-PDCCH of its band slice to obtain the control information.

Figure 11:
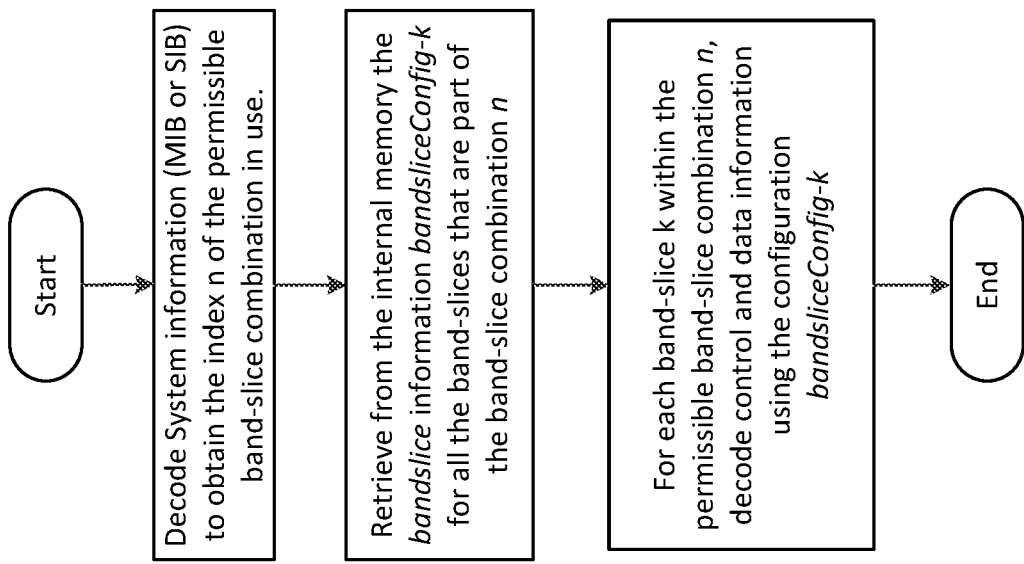
FIG. 11 is a flow chart of an example method where a bandsliceConfig-k may be implicitly signaled to the UE.

FIG. 11 illustrates an example method where the field of bandsliceConfig-k may be implicitly signaled to the UE, rather than explicitly. For example, the UE may have a set of permissible combinations of band slices C, and then the UE may receive an index pointing to one of the permissible combinations with set C. The set of permissible combinations C may be defined, e.g., in a "numerologyBook" as C=(combination 1, combinaiton2, . . . combination n, . . . combination N) where the index of permissible combinations is n=1, 2, . . . N. The set of permissible combinations C may be specified and known to both the UE and the network, e.g., eNB or the equivalent 5G RAN node.

Numerology assignment for each band slice in a network where the numerology configuration is dynamically updated may be allocated dynamically via a Physical Downlink Numerology Indication Channel (PDNICH). Here, each bTTI has its own PDNICH defining the location of the band slices in that bTTI. For example, PDNICH carries the indices of the signaling fields shown in Table 7 for each of the K band slices. These configurations may be signaled on MIB or SIB, for example. Further, The PDNICH may be located in the first symbol of the bTTI in order to minimize the latency in processing the DCI and data.

Resources for PDNICH may be allocated by a common PDNICH allocation method, whereby PDNICH for all the band slices is signaled in a common numerology through a "PDNICH-numerology-Config," for example, that is received by all or multiple network slices. The PDNICH resources and numerology is indicated to the terminals through the system information. For example, the system information may indicate the fields shown in Table 8 to define the resources of PDNICH.

The resources with respect to the starting location and number of resources may be predefined in the 3GPP standards. Then, given the beginning frequency location and subcarrier spacing, the terminal may determine the PDNICH resources without ambiguity.

Figure 12:
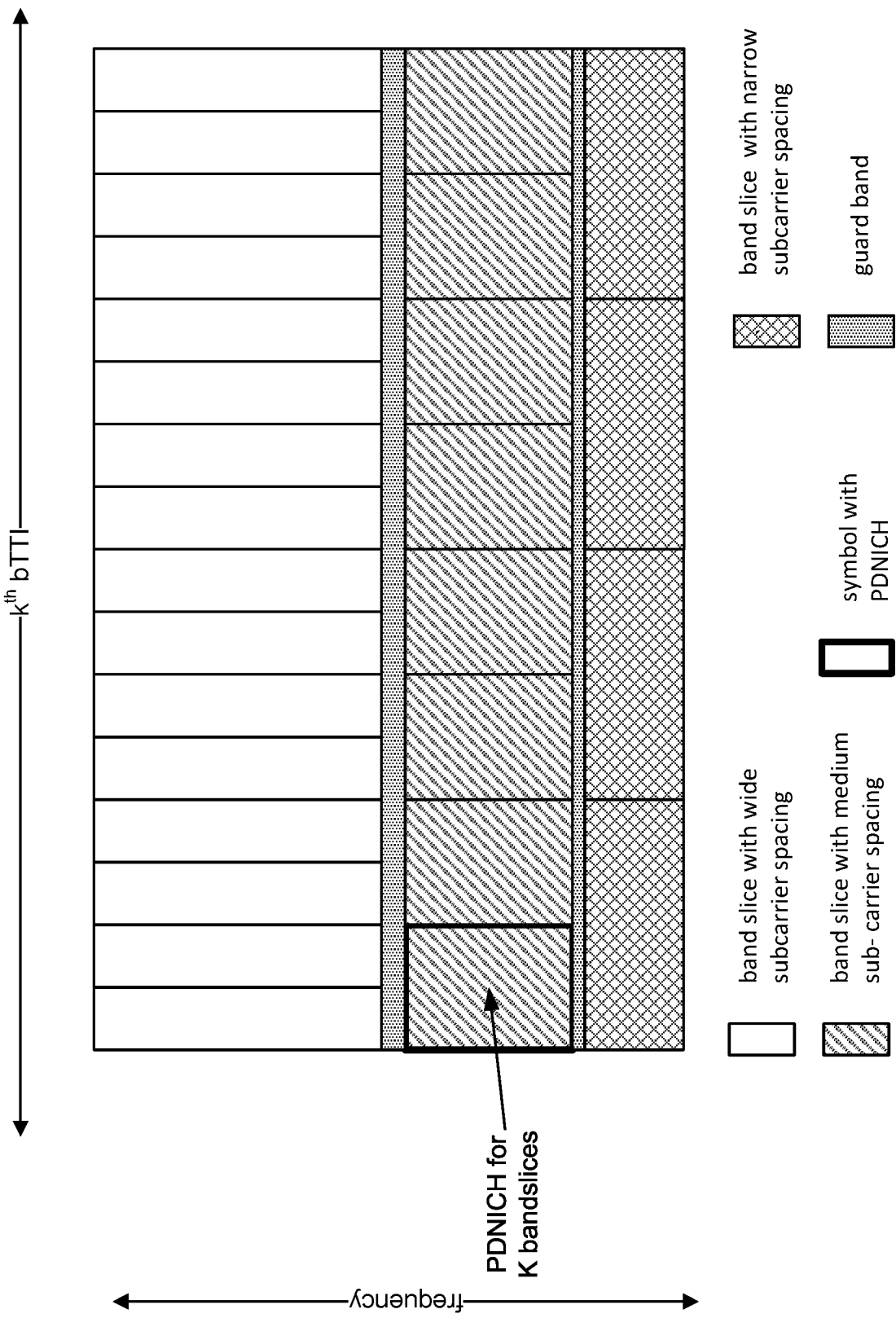
FIG. 12 shows an example configuration of a bTTI carrying the PDNICH in a band.
Figure 13:
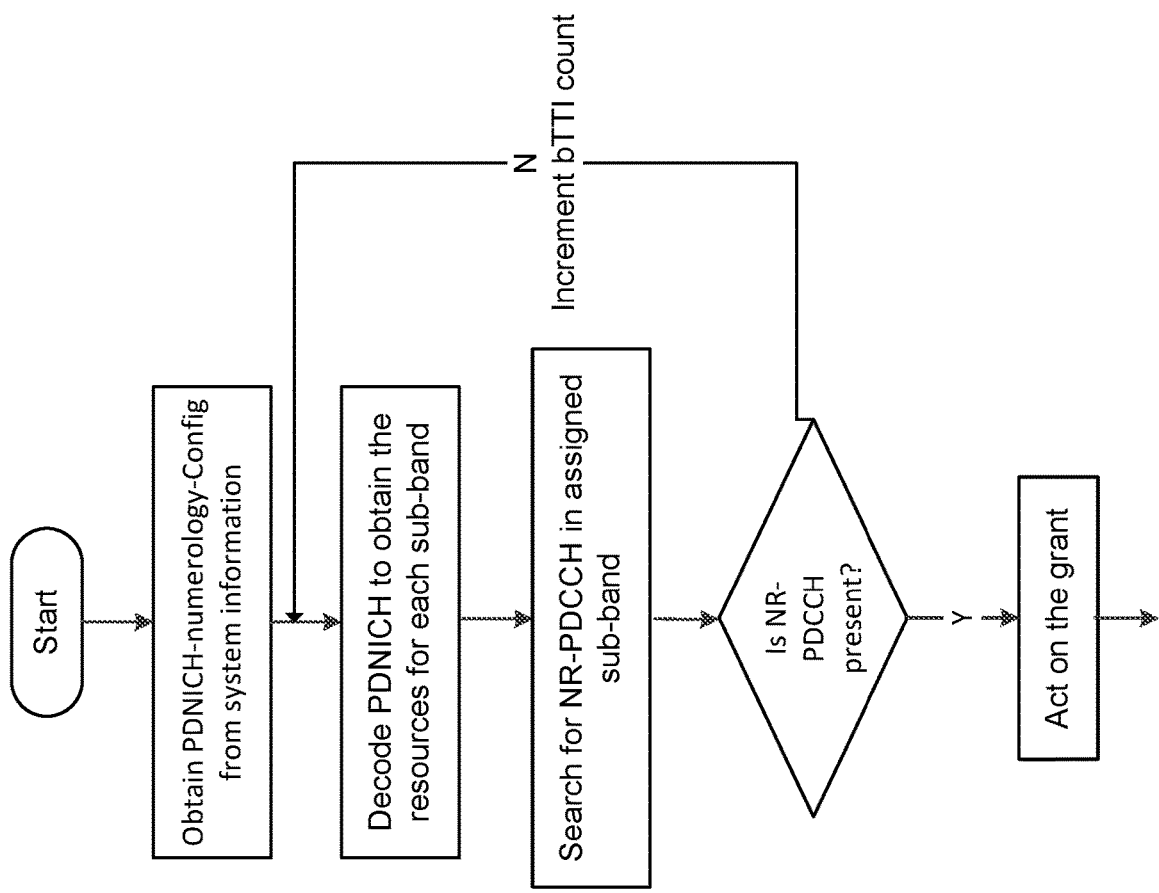
FIG. 13 shows an example UE method to obtain the band slice configuration through PDNICH-numerology.

FIG. 12 shows an example configuration of a bTTI carrying the PDNICH in the band slice-2. FIG. 13 shows the UE method used to obtain the band slice configuration through PDNICH-numerology. The UE obtains the PDNICH numerology through system information. The UE may also obtain PDNICH numerology by decoding the PDNICH from each bTTI the UE decodes the PDNICH. The UE may then decode the downlink information from its respective NR-PDCCH.

TABLE 8

Configuration of PDNICH-Numerology-Config

PDNICH-Numerology-Config
    cpConfig-k = 2.35 (μs)
    subcarrierSpacing-k = 30 (KHz)
    startingFrequencyResource = 0.96 (MHz from the center of band)

Figure 14:
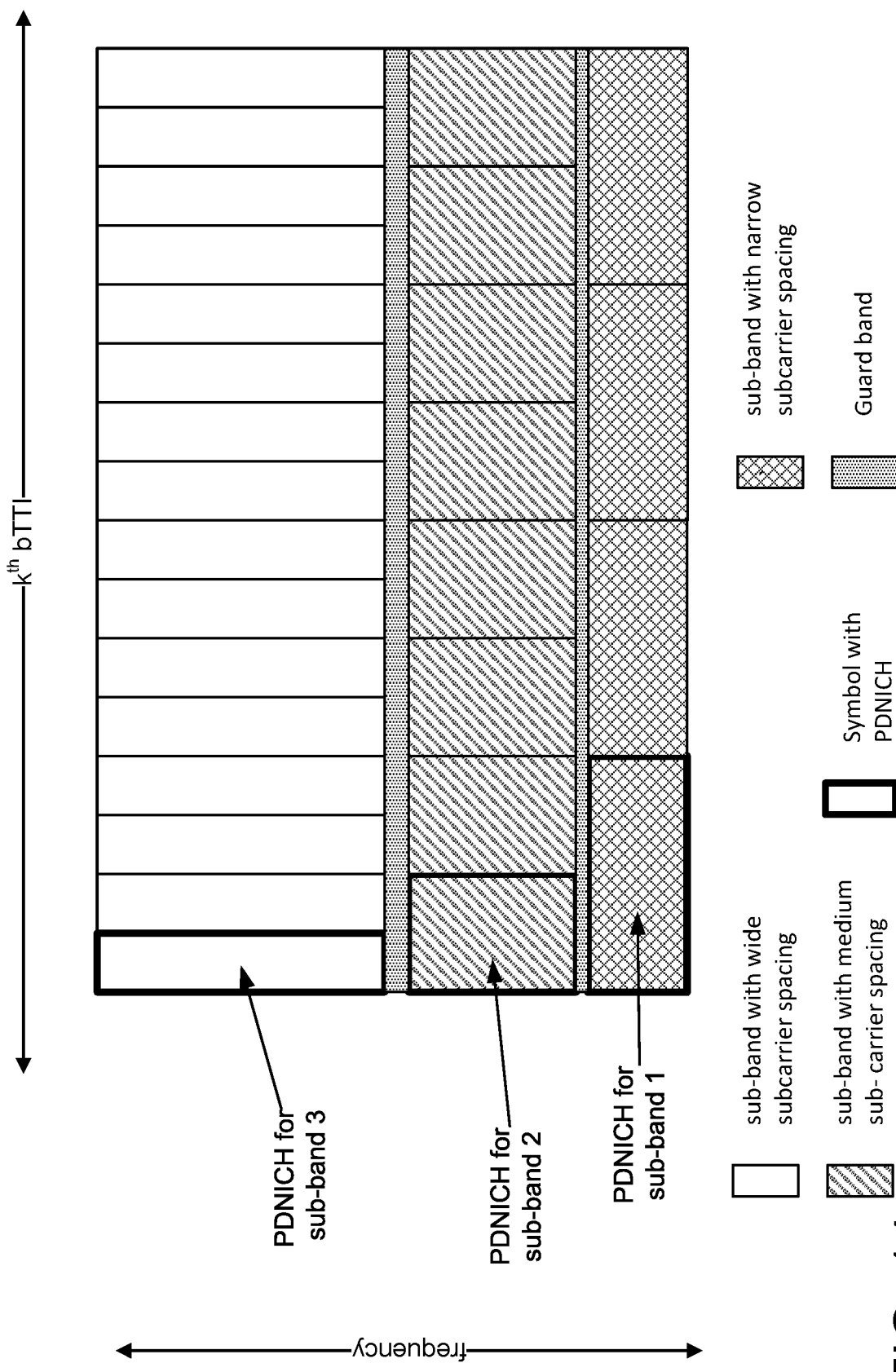
FIG. 14 shows an example of multiple PDNICH resources located in respective band slices.

Resources for PDNICH may be allocated by a per-slice PDNICH allocation scheme, whereby PDNICH is configured separately for each of the numerologies supported by the cell. FIG. 14 shows an example of multiple PDNICH resources located in respective band slices.

Multiple possible resources may be predefined for each PDNICH in the 3GPP standards, and the bTTI may carry one such configuration for each PDNICH. The terminal may blindly decode all the possible configurations corresponding to the network slice that it is allocated to in order to determine the PDNICH resources and its content for that network slice. This solution limits the search space of the terminal to its network slice.

Figure 15:
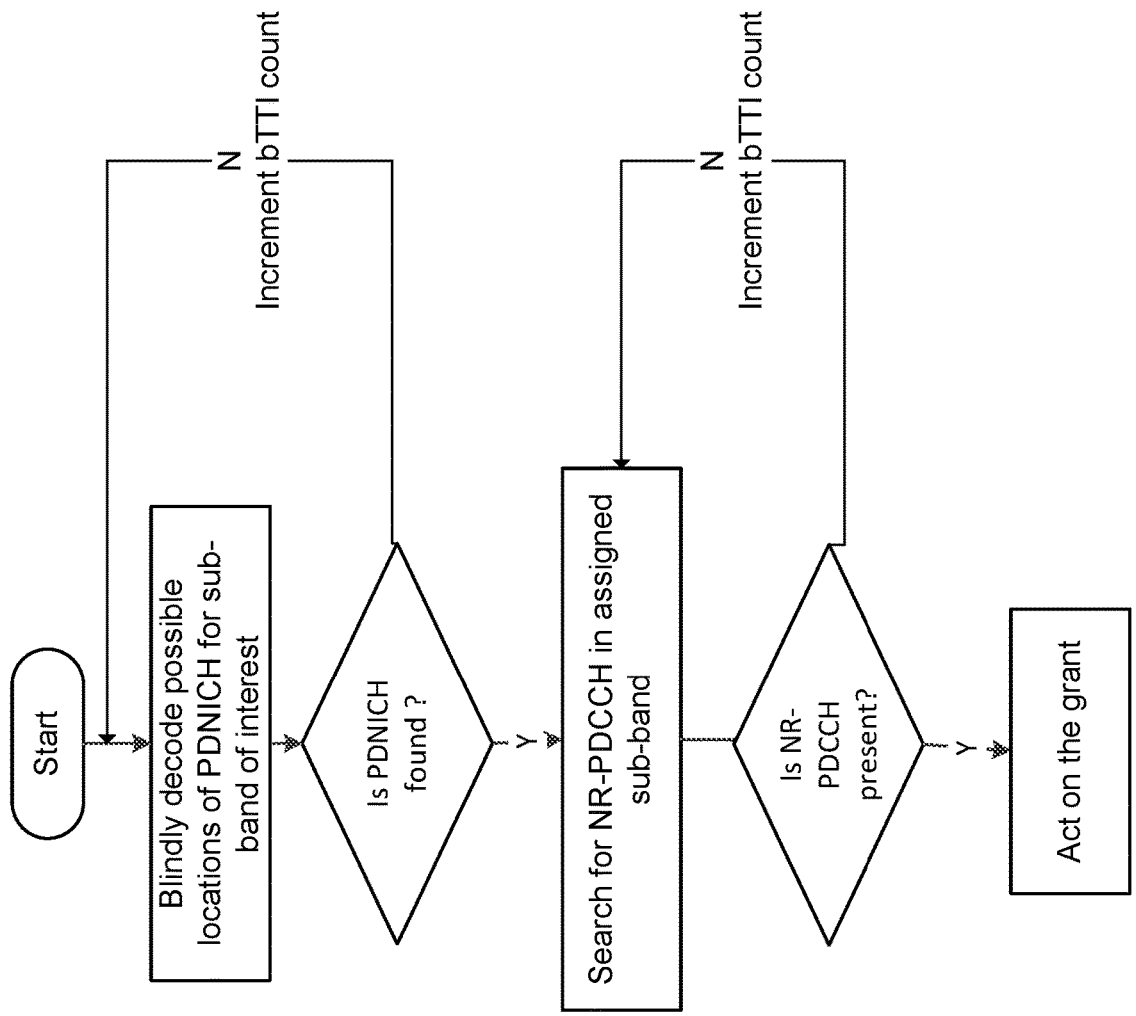
FIG. 15 shows an example UE method to obtain a band slice configuration by blindly decoding the PDNICH in all possible locations.

FIG. 15 shows the UE as an example method to obtain the band slice configuration by blindly decoding the PDNICH in all possible locations. Here the UE blindly decodes a search space every bTTI to obtain the PDNICH and then proceeds to decode the control information.

In an example solution, the index into the numerologyBook may be signaled through the PDNICH.

Figure 16:
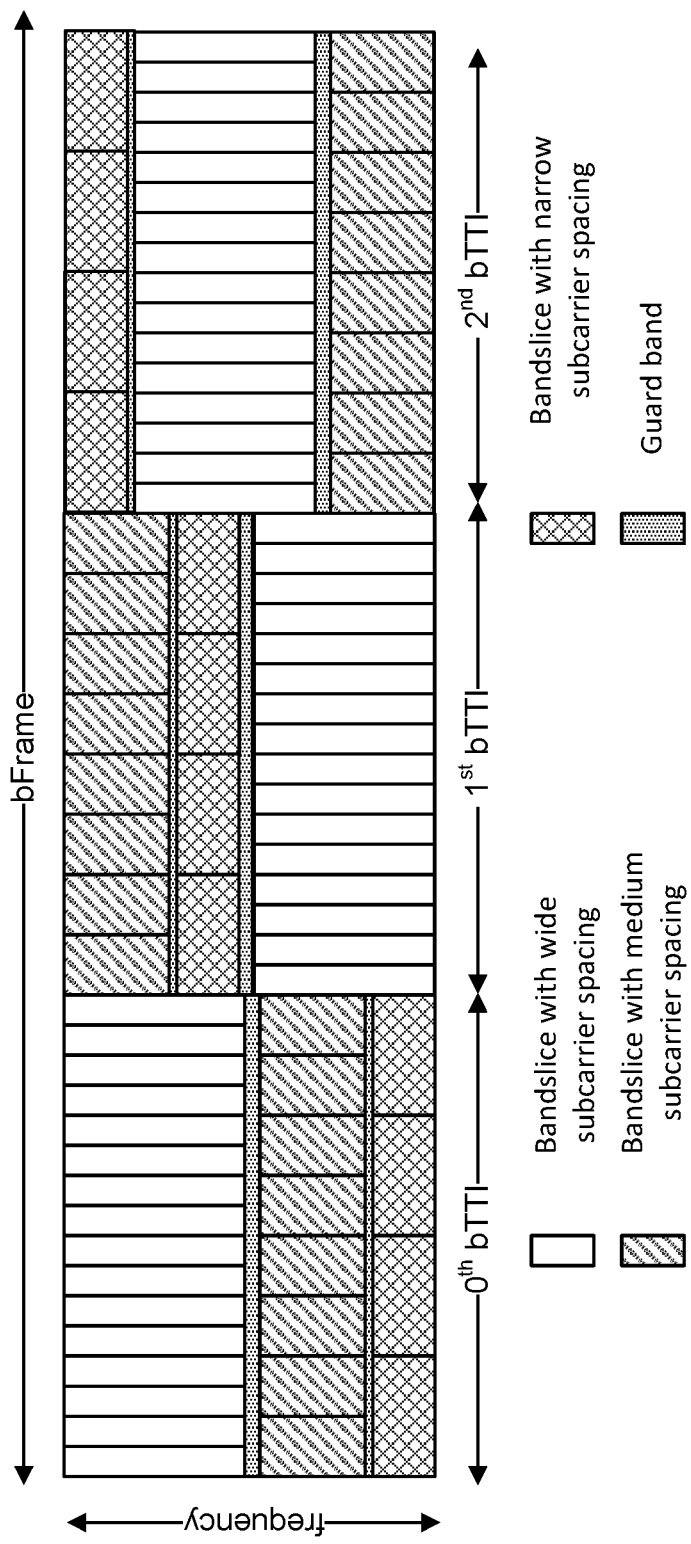
FIG. 16 illustrates an example of band slices within a bFrame.

Band slices may hop in frequency according to a predefined pattern available in the 3GPP standards, or based on a pattern provided through system information and updated through MAC CE. For example, consider a signaling interval "bFrame" defined as the duration of B bTTIs. The network may configure the $0^{th}$ bTTI of the bFrame. Then locations of the band slices for subsequent bTTIs may occur according to a predefined pattern. This solution provides minimal signaling overhead while supporting gain through frequency hopping. FIG. 16 illustrates hopping within a bFrame.

In 5G, the downlink reference signal, downlink control channel, and downlink data channel may follow the self-contained and lean-carrier design principles. The transmission of NR-PDCCH, for example, may be more flexible than E-PDCCH in LTE and take the advantage of pre-coding or beamforming of the downlink data channel. The 5G demodulation reference signal (NR-RS) and NR-PDCCH may use the same pre-coding/beamforming such that NR-PDCCH may be demodulated using NR-RS. The NR-RS is transmitted when only there is a DL data transmission.

3GPP NR may specify NR-RS allocation/configurations for each supported numerology. In other words, RE positions of each antenna port's NR-RS may be specified for each supported numerology, e.g., subcarrier spacing, number of symbols, CP length, etc. For example, for UR/LL, the NR-RS and data may be multiplexed in a frequency division manner to meet latency requirements. For eMBB, the NR-RS and data may be multiplexed in both frequency and time division. Thereby different numerologies may have different NR-RS allocation/configurations schemes. NR-RS allocation schemes may be specified in the standards by using frequency shift (in the unit of subcarrier) and time shift (in the unit of symbol) in the rules of mapping NR-RS to resource elements. For example, frequency shift and time shift are defined as functions of parameters such as cell ID, numerology index, etc.

The sequence of NR-RS may re-use the design of UE-specific RS defined in Section 6.10.3 of 3GPP TS 36.211, where the pseudo-random sequence generator for the RS is initialized with a function of Cell ID and UE ID. To decode the NR-PDCCH dynamically, a UE may first calculate the NR-RS location based on RE or RBG location.

Blind decoding for the NR-PDCCH may be achieved by first detecting the presence of an NR-RS, and then using the detected NR-RS to decode NR-PDCCH. Alternatively, without detecting the NR-RS, a UE may implicitly assume that NR-RS and NR-PDCCH are both transmitted, and decode NR-PDCCH.

A method including first detecting NR-RS may proceed according to the following example. In Step 1, the UE obtains potential positions or search space of NR-RS. Upon obtaining the DL numerology allocation information through MIB/SIB, RRC signals or PDNICH, the UE may obtain the RE positions of each antenna port's NR-RS in each resource block (RB) that belongs to a particular band slice according to the NR-RS allocation scheme for the band slice/numerology. The UE may obtain the potential positions or search space of its NR-RS, such as on several REs used by several different antenna ports. The starting location based on RBG of the UE-specific search space may be varied for each TTI or subframe.

In Step 2, the UE detects a specific NR-RS. For each possible NR-RS position, the UE will detect whether its NR-RS is actually transmitted or not. Detection may be achieved by correlating the received signals on these REs with UE's specific NR-RS. Once the presence of its NR-RS is detected, the UE will proceed to Step 3 to decode NR-PDCCH. If no UE-specific NR-RS is detected, then UE will not proceed to decode NR-PDCCH.

In Step 3, the UE undertakes blind decoding of the NR-PDCCH. Upon detecting the NR-RS, the corresponding NR-PDCCH's starting location may be derived from RE positions of the NR-RS. For example, a NR-PDCCH starting location in time and frequency resource may be obtained according to a predefined formula of the detected NR-RS positions. This formula may be UE-specific. In this way, a UE may avoid trying blind decoding all NR-PDCCH possible candidates before detecting a UE-specific NR-RS for demodulating NR-PDCCH.

Blind decoding for the NR-PDCCH may be achieved without first detecting the NR-RS, and may proceed according to the following example. To decode the proposed NR-PDCCH dynamically, a UE (user) first calculates the NR demodulation reference signal (NR-RS) location. In this option, UE assume the NR-RS and NR-PDCCH are present at the same time, i.e., that NR-RS and NR-PDCCH are present simultaneously. The search space of NR-PDCCH and NR-RS may be either configured by RRC or a predefined formulation. Once the channel estimation is obtained from NR-RS, the UE may start to demodulate the NR-PDCCH. In this setup, the UE may start to blind decode for all possible NR-PDCCH candidates. With the possibilities of different RNTIs, NR-PDCCH candidates, NR-DCI and NR-PDCCH formats, a significant number of attempts may be required to successfully decode the NR-PDCCH. To overcome this complexity, the UE first tries to blindly decode the first CCE in the control channel candidate set of a subframe. If the blind decoding fails, the UE tries to blindly decode the first 2, 4 then 8 CCEs sequentially, where the starting location may be given by a predefined function, for UE-specific scheme. The NR-PDCCH candidate sets correspond to different NR-PDCCH formats. If the UE fails to decode any NR-PDCCH candidate for a given PDCCH format it tries to decode candidates for other NR-PDCCH formats. This process is repeated for all possible NR-PDCCH formats.

If one of decoded NR-PDCCH candidates pass the CRC, then it may be declared a successful decoding of NR-PDCCH. The CRC may be masked with UE's ID, such as a UE-RNTI, to ensure which NR-PDCCH is belonging to the UE. Once the NR-PDCCH is successfully decoded, the UE may start to de-map the content of decoded PDCCH to the transmitted DCI format.

Figure 17:
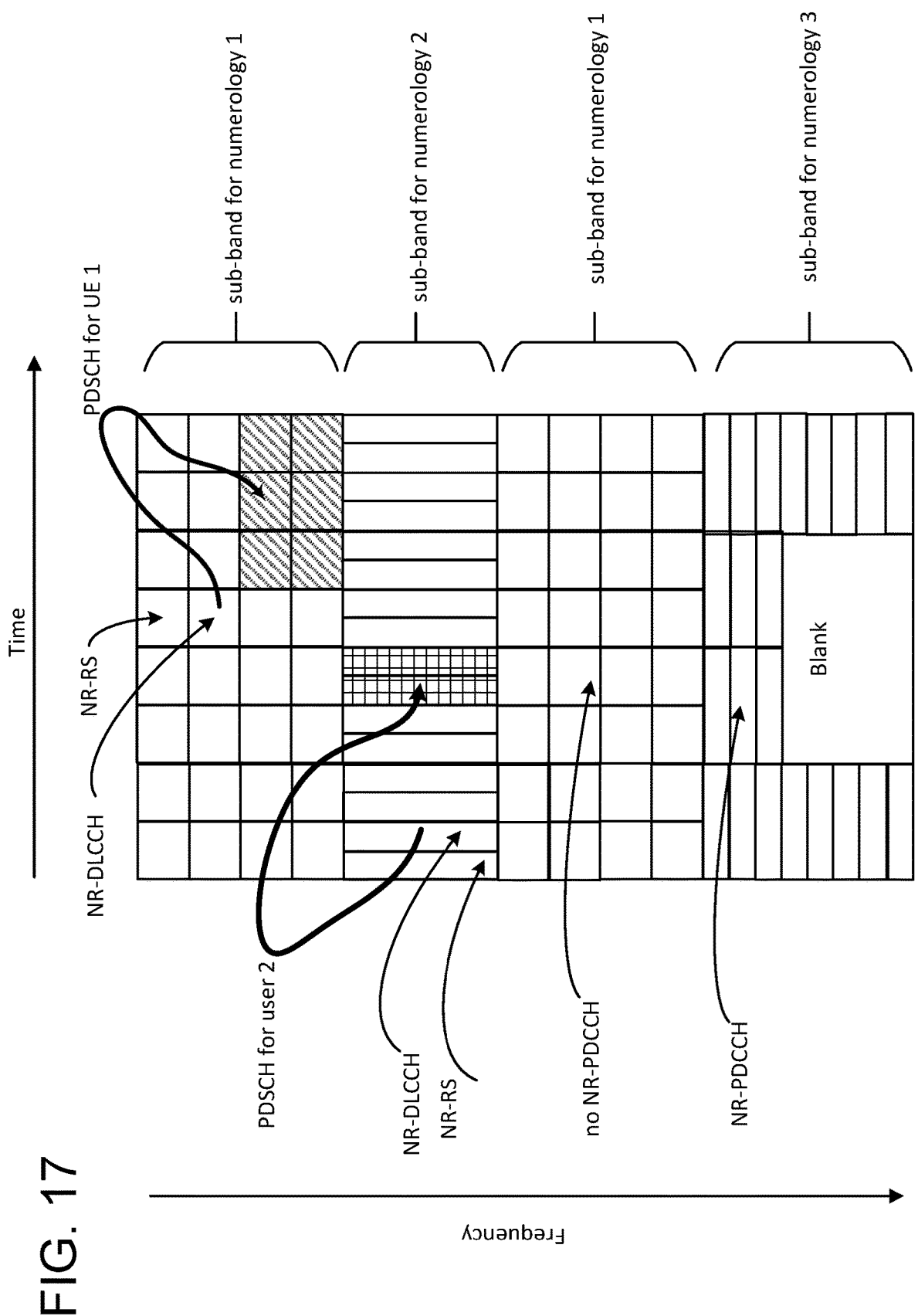
FIG. 17 shows an example 5G system supporting three different numerologies with three UEs.

FIG. 17 shows an example 5G system supporting three different numerologies with three UEs. A UE with numerology 1 will try to decode NR-PDCCH with a predefined formula to calculate all possible NR-PDCCH starting frequency. After the UE obtains the channel estimation information from NR-RS then it is able to demodulate the NR-PDCCH candidates simultaneously. If none of decoded CRC are passed, then this UE may continue monitoring NR-PDCCH with other supporting numerology if necessary. If there is a CRC pass among one of NR-PDCCH candidates, then this UE may start to map the decoded information into DCI.

Figure 18:
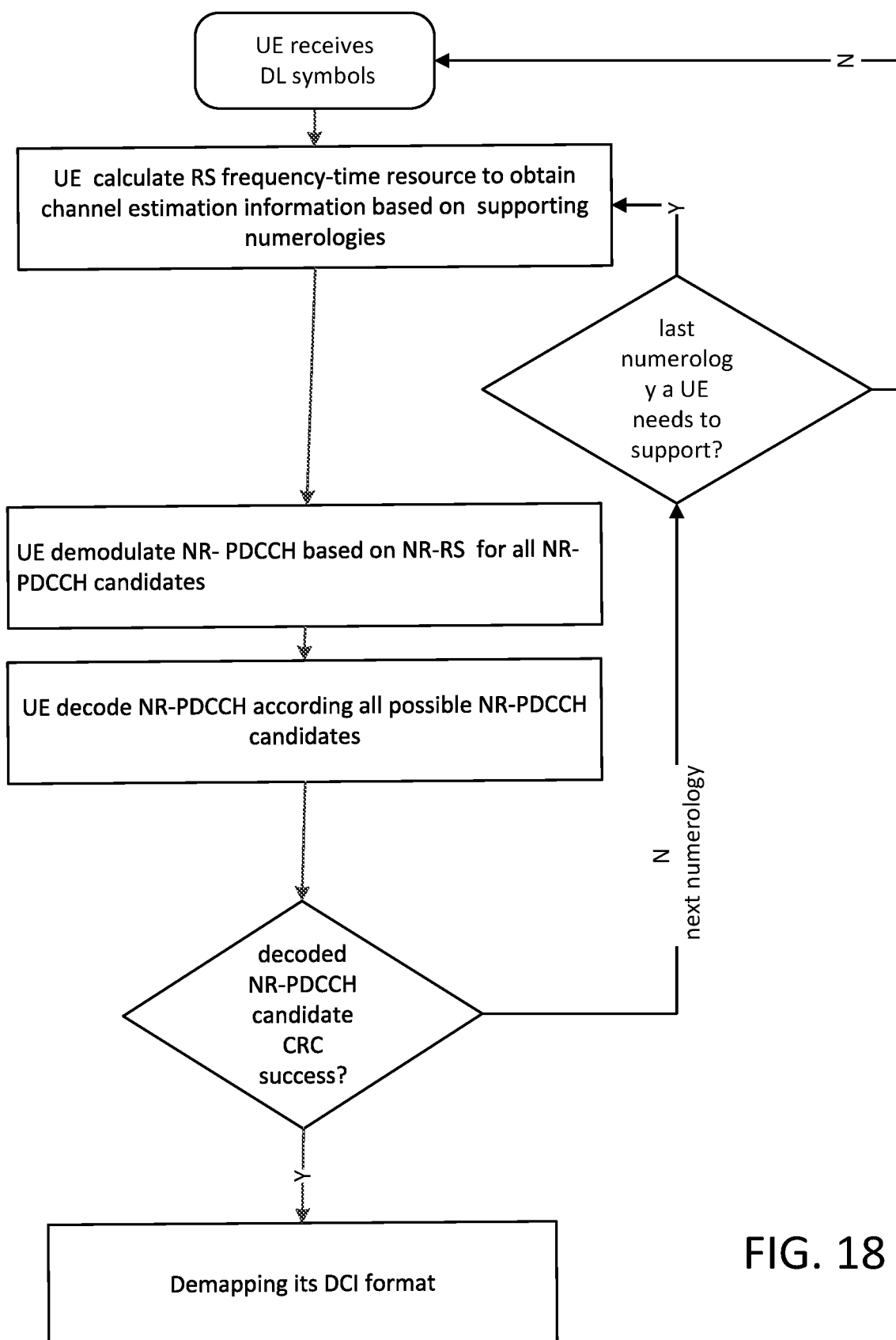
FIG. 18 is a flow chart of an example UE method for decoding NR-PDCCH.

FIG. 17 show an example NR-PDCCH for supporting multiplexed numerologies and use cases. FIG. 18 shows an example UE method for decoding NR-PDCCH.

In addition to the NR-PDCCH, 5G may use a new radio Physical Control Format Indicator channel (NR-PCFICH) as a physical channel carrying information on how many contiguous symbols are used to signal the NR-PDCCH. Within a bTTI, one or more NR-PDCCH symbols may be configured in each band slice to carry control information such as power-control commands and UL, DL grant-related information for the terminals configured for that numerology. These NR-PDCCH regions may be broadcast or multicast so that all intended terminals may monitor the region for a grant and decode the corresponding control information. Herein, the term "multicast-NR-PDCCH" refers to a contiguous region of NR-PDCCH signals signaled in this manner. A multicast-NR-PDCCH may configure a DL grant in one or more symbols locations following the multicast-NR-PDCCH and up to the symbol carrying the next multicast-NR-PDCCH.

In a manner similar to decoding PDCCH in LTE, the terminals may blindly decode the multicast-NR-PDCCH to see if they have a grant. The multiple NR-PDCCH opportunities may occur with a TTI corresponding to a single numerology enabling time-slicing to support sTTIs of multiple durations and hence multiple use cases.

Figure 19:
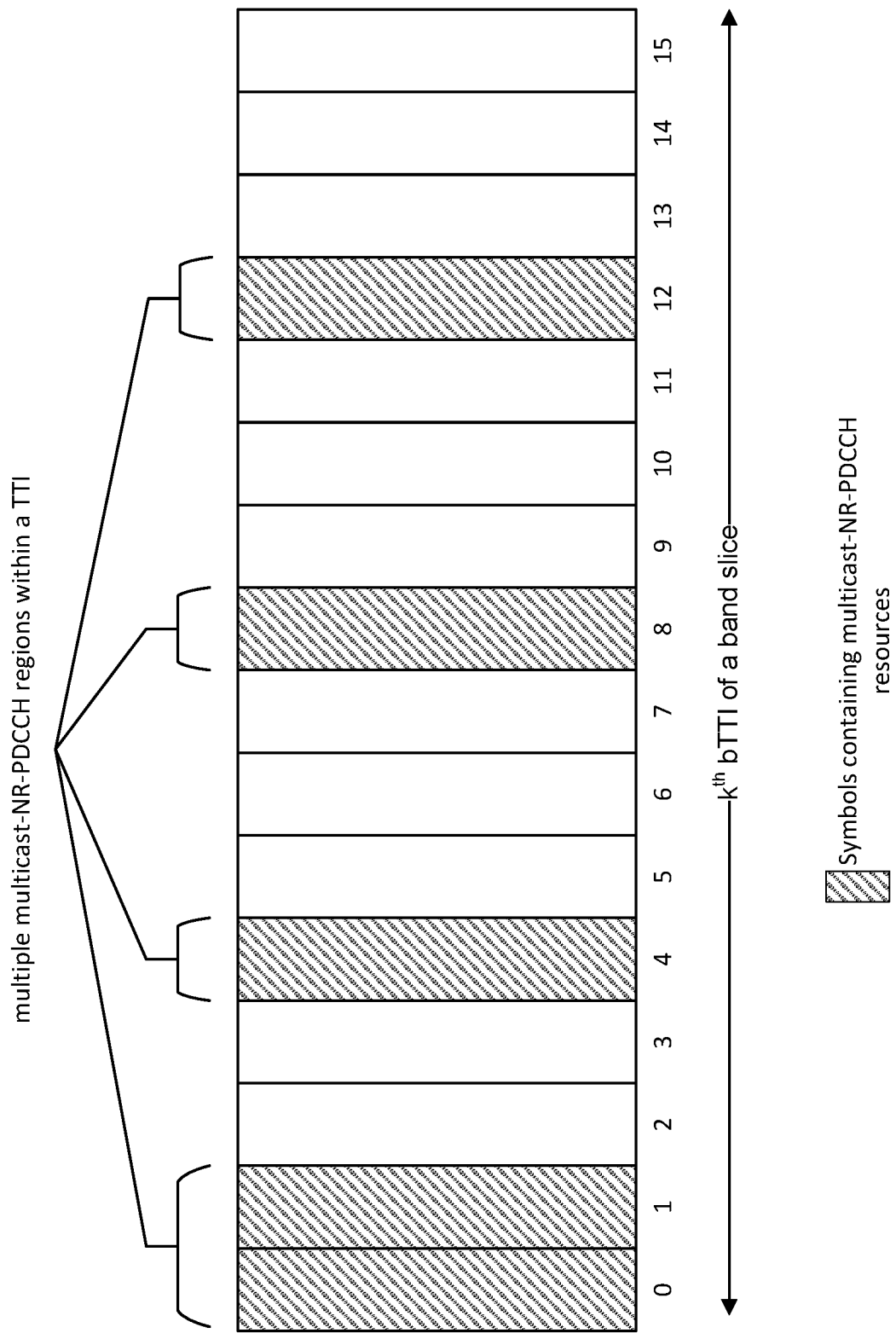
FIG. 19 shows an example configuration where multiple multicast-NR-PDCCH are carried in different symbols within a band slice.

FIG. 19 shows an example configuration of symbols carrying multiple multicast-NR-PDCCH in different symbols within a band slice. The multicast-NR-PDCCH in symbol 0, 1 may indicate a DL grant in one or more symbols from the set {3,4} in the bTTI while the multicast-NR-PDCCH in symbol 8 may indicate a DL grant in one or more symbols from the set {9,10,11}. Depending on amount of control information, the multicast-NR-PDCCH region in each band slice may have varying number of resources spanning more than 1 contiguous symbol and changing dynamically every bTTI.

Figure 20:
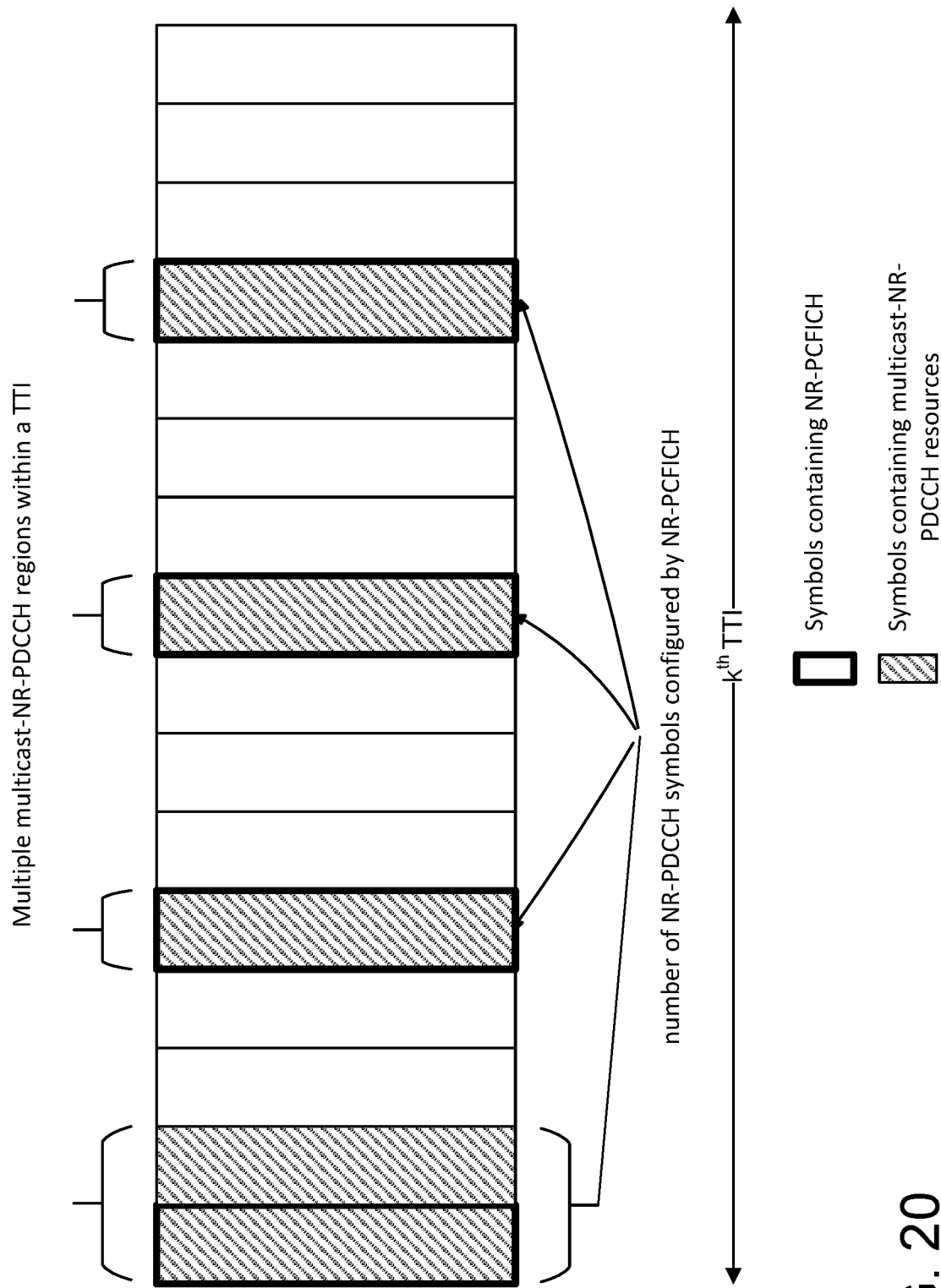
FIG. 20 shows example symbols for multiple multicast-NR-PDCCH regions configured through NR-PCFICH.

The number of symbols and resources for each multicast NR-PDCCH may be indicated via a NR-PCFICH, as shown in the example of FIG. 20. A NR-PCFICH may be configured for each broadcast NR-PDCCH, where its resources are predefined in the 3GPP standards with respect to the band slice size and location. The resources for NR-PCFICH may be limited to the leading symbol of the multicast-NR-PDCCH region and be multiplexed with those of the corresponding multicast-NR-PDCCH so that the latency to process data is minimized.

Figure 21:
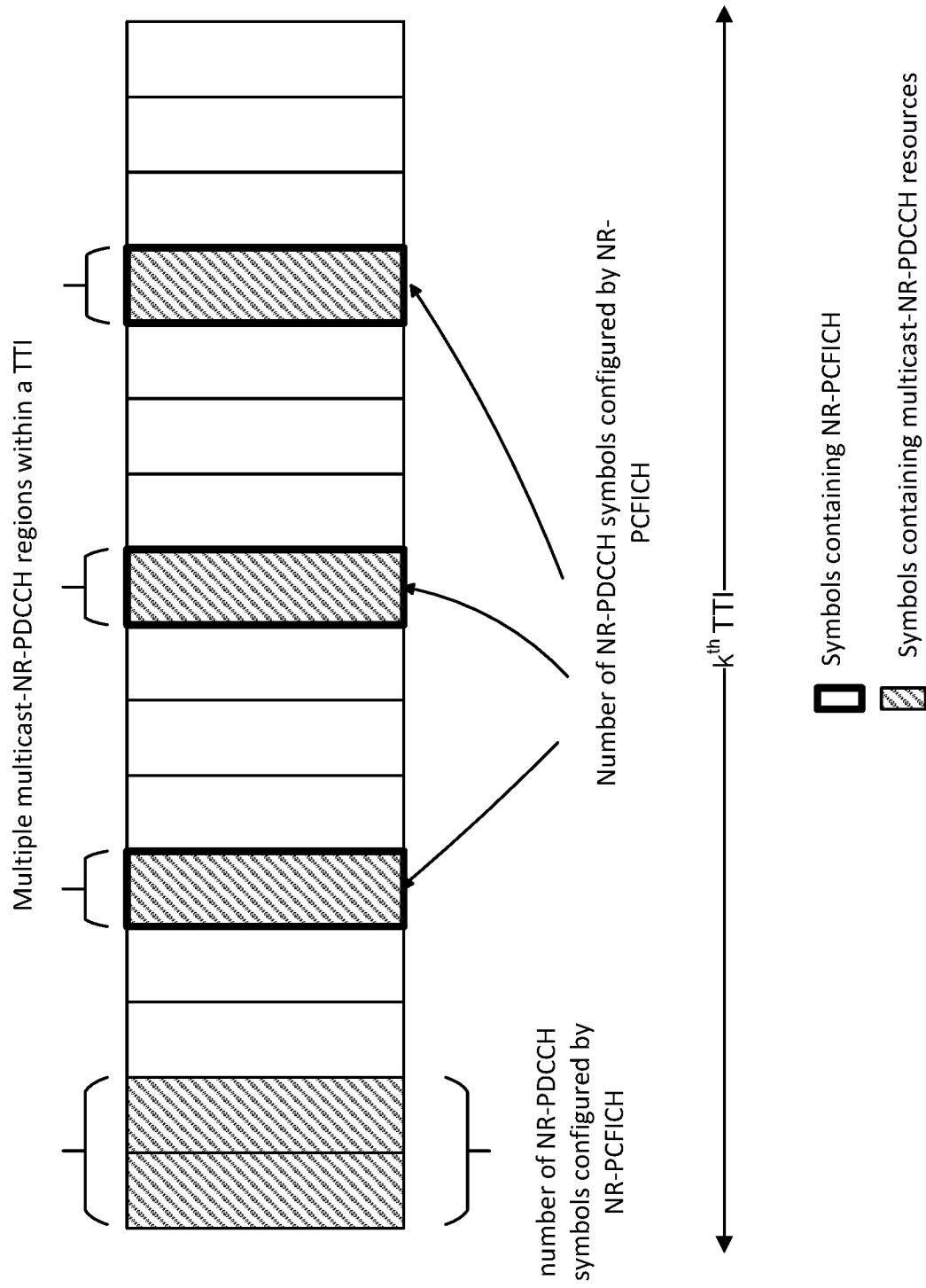
FIG. 21 shows an example configuration of a band slice in a bTTI.

FIG. 21 shows an example configuration of a band slice in a bTTI where the number of symbols for the first multicast-NR-PDCCH is configured by the PDNICH and the remaining by NR-PCFICH. The PDNICH, if present, may indicate the number of symbols for the first multicast-NR-PDCCH region of the bTTI through the field numControlSymbols, as shown in an example configuration of the $K^{th}$ band slice in Table 9. Subsequent multicast-NR-PDCCH regions in the bTTI carry a NR-PCFICH.

TABLE 9

PDNICH field indicating number of symbols
for first multicast-NR-PDCCH for band slice K bandsliceConfig-k
    cpConfig-k = 2.35 (μs)

TABLE 9-continued

PDNICH field indicating number of symbols
for first multicast-NR-PDCCH for band slice K subcarrierSpacing = 30 (KHz)
guardBandTop = 90 (KHz)
guardBandBottom = 90 (KHz)
numResources = 120 (30 KHz subcarriers)
  startResource = 7.5 (MHz from the center of band)
numControlSymbols = 1

Resources for the multicast-NR-PDCCH, other than the first one, may be set up by system information reserving locations for each band slice within the TTI for each numerology. MAC CE may then semi-statically update the set up. Alternatively, future resources for the multicast-NR-PDCCH may be set up by a prior occurrence of the multicast-NR-PDCCH that reserves the resources for the subsequent multicast-NR-PDCCH within a TTI for a given numerology.

For some network slices such as mMTC, in order to conserve battery power, the DL control information may occur only in specific multicast-NR-PDCCH regions, for example, in the multicast-NR-PDCCH occurring at the start of the TTI.

Some types of control information may be split into multiple regions. For example, the multicast-NR-PDCCH may assign a DL grant to a UE in a bTTI but additional control information may be provided by a resources referred to as "pre-coded-NR-PDCCH" and located within the DL grant. In other words, the pre-coded-NR-PDCCH is self-contained within the subframe of the DL grant.

For example, the multicast-NR-PDCCH may provide the DL grant location and DMRS resource information for the pre-coded-NR-PDCCH of that grant. Once the terminal decodes this multicast-NR-PDCCH, it may determine the location of its pre-coded-NR-PDCCH and decodes it to determine the transmission mode, DMRS information for the layers, antenna configuration, etc. The solution enables minimizing the amount of resources allotted for multicast-NR-PDCCH and thereby reduces the latency. It also allows a portion of the DCI to be pre-coded, thereby providing higher SNR or alternatively requiring fewer resources for the DCI.

Figure 22:
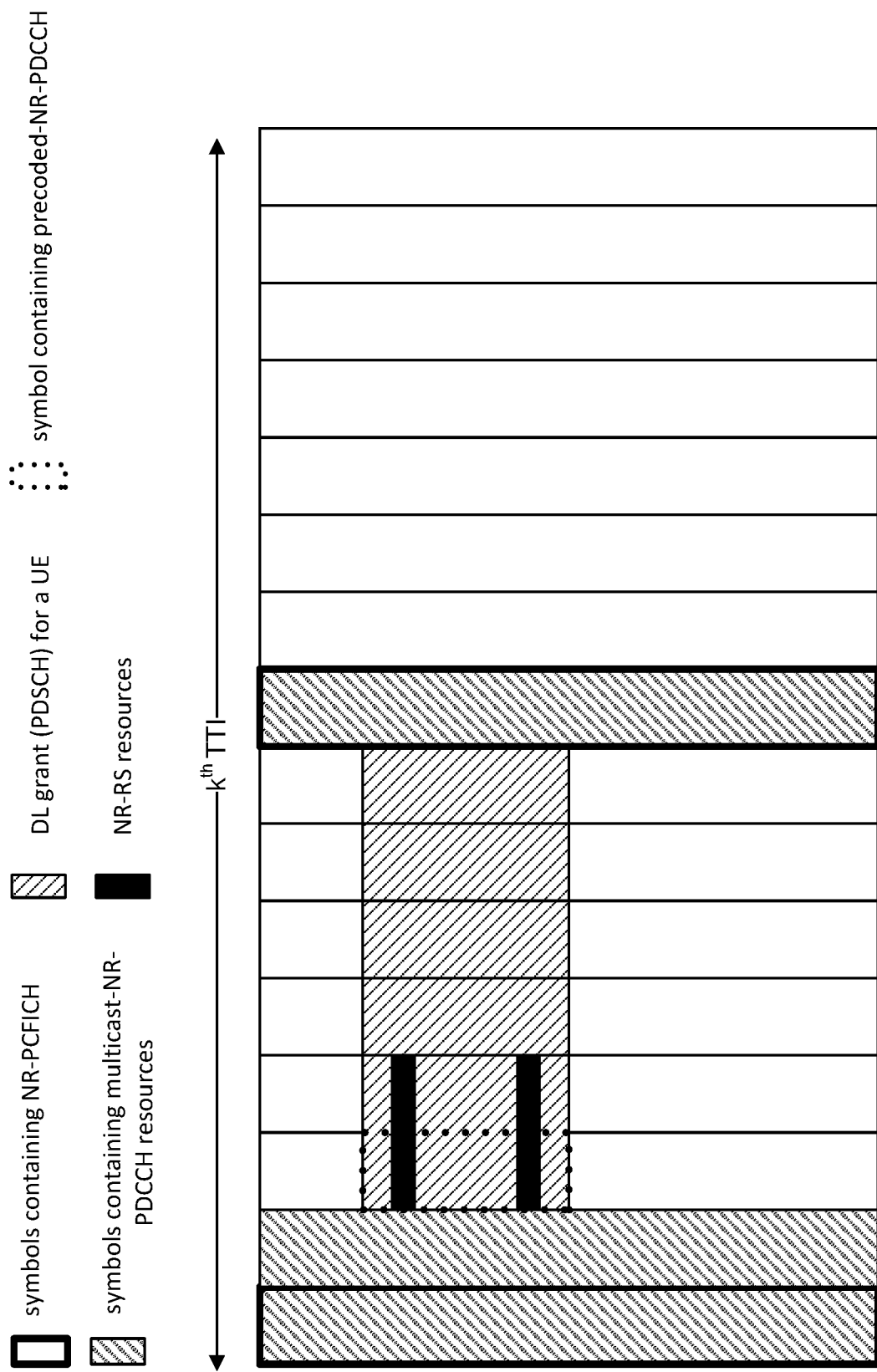
FIG. 22 shows an example configuration indicating the pre-coded-NR-PDCCH in a self-contained manner within the DL grant to the UE.
Figure 23:
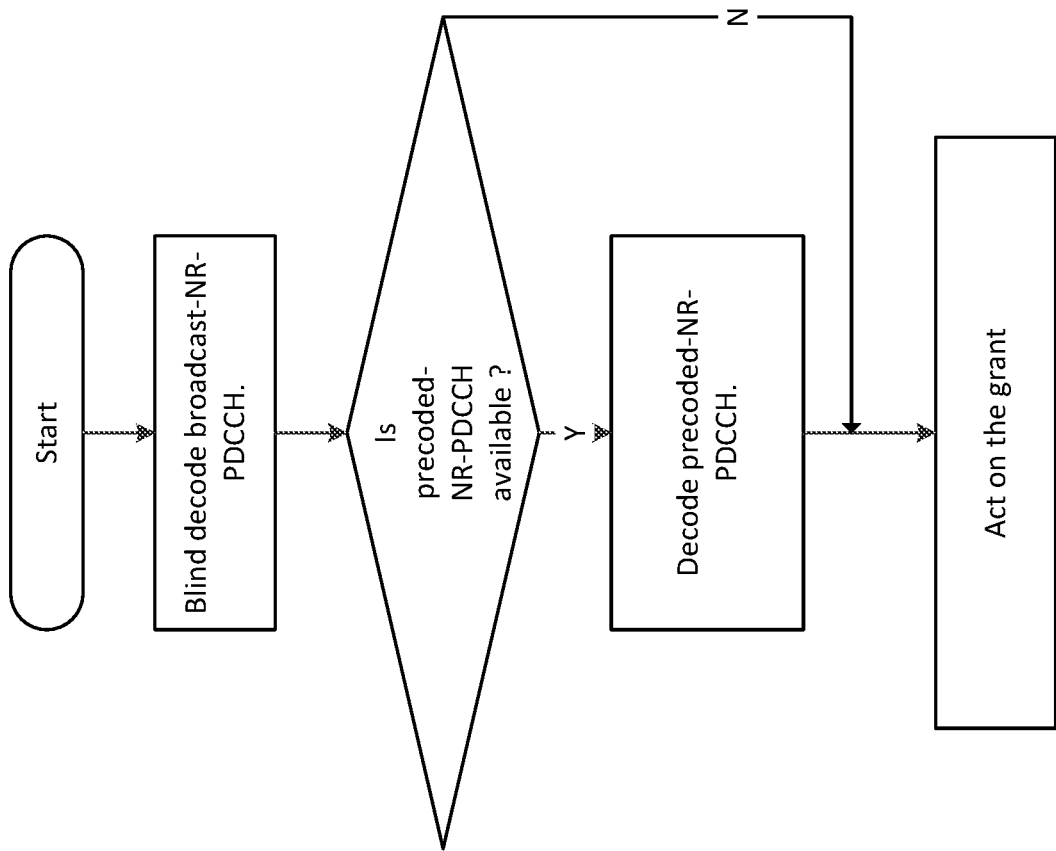
FIG. 23 is a flow chart of an example method involved for decoding downlink control information.

FIG. 22 shows an example configuration indicating the pre-coded-NR-PDCCH in a self-contained manner within the DL grant to the UE. FIG. 23 shows an example method involved in decoding the downlink control information in two steps: decoding multicast-NR-PDCCH from the respective band slice, and then decoding the pre-coded-NR-PDCCH following which the UE acts on the grant.

The DMRS may be used for one or more layers of the DL data and be shared by the pre-coded-NR-PDCCH to minimize the reference signal overhead. A pre-coded-NR-PDCCH may be located in the early symbols of the subframe, and sufficient number of DMRS resources may be located in the early symbols of the subframe, so that the pre-coded-NR-PDCCH may be decoded with minimal latency. FIG. 22 shows NR-RS resources allocated to a UE and shared to decode the pre-coded-NR-PDCCH.

In order to address the problems associated with the large latency of transmission mode switching in the current 3GPP system, the following example mechanisms to enable dynamic transmission mode switching, while not increasing the number of blind decoding attempts, are proposed.

A new downlink control signaling, Physical Slot Format Indicator Channel (PSFICH), may be used to inform the UE about necessary information of the current slot, such as the length of the slot, the symbols for downlink transmission region, and the symbols for uplink transmission region. The PSFICH may be transmitted at the first symbol of each slot. The PSFICH may also be encoded in low coding rate and transmitted in transmit diversity mode to improve reliability.

A two-tier NR PDCCH may be used to support dynamic transmission mode switching and reduce the blind decoding attempts. The first tier NR PDCCH may be transmitted in the downlink control region, and its search space could be common and/or UE-specific. The first tier NR PDCCH may have a unified NR DCI format, which does not depend on the transmission mode. The first tier NR PDCCH may also contain the necessary information for the second tier NR PDCCH blind decoding, such as the index of the NR DCI format used for the second tier NR PDCCH and the search space indicator used to configure the second tier NR PDCCH search space. The second tier NR PDCCH may contain all of the required information for the scheduled downlink transmission. The second tier NR PDCCH may be transmitted in the control region or the data region. The second tier NR PDCCH search space may be UE-specific and may be determined by the search space indicator in the first tier NR PDCCH, the current slot structure, and/or the UE ID. For different transmission modes, the second tier NR PDCCH may have different DCI formats, which are signaled in the first tier NR PDCCH. The transmit diversity scheme or beam based diversity scheme may be applied to signals in the control region, and the NR PDCCH located in the data region may be configured with the same transmission mode as the data channel.

Another option to signal the index of the second tier NR DCI format, which may be through the MAC CE. In this case, the first tier NR PDCCH may not be necessary.

A further option is NR transmission modes where the number of which is much less the number of transmission modes in the current LTE.

Another option is to use various NR DCI formats for different NR transmission modes to support the two-tier NR PDCCH.

Figure 24:
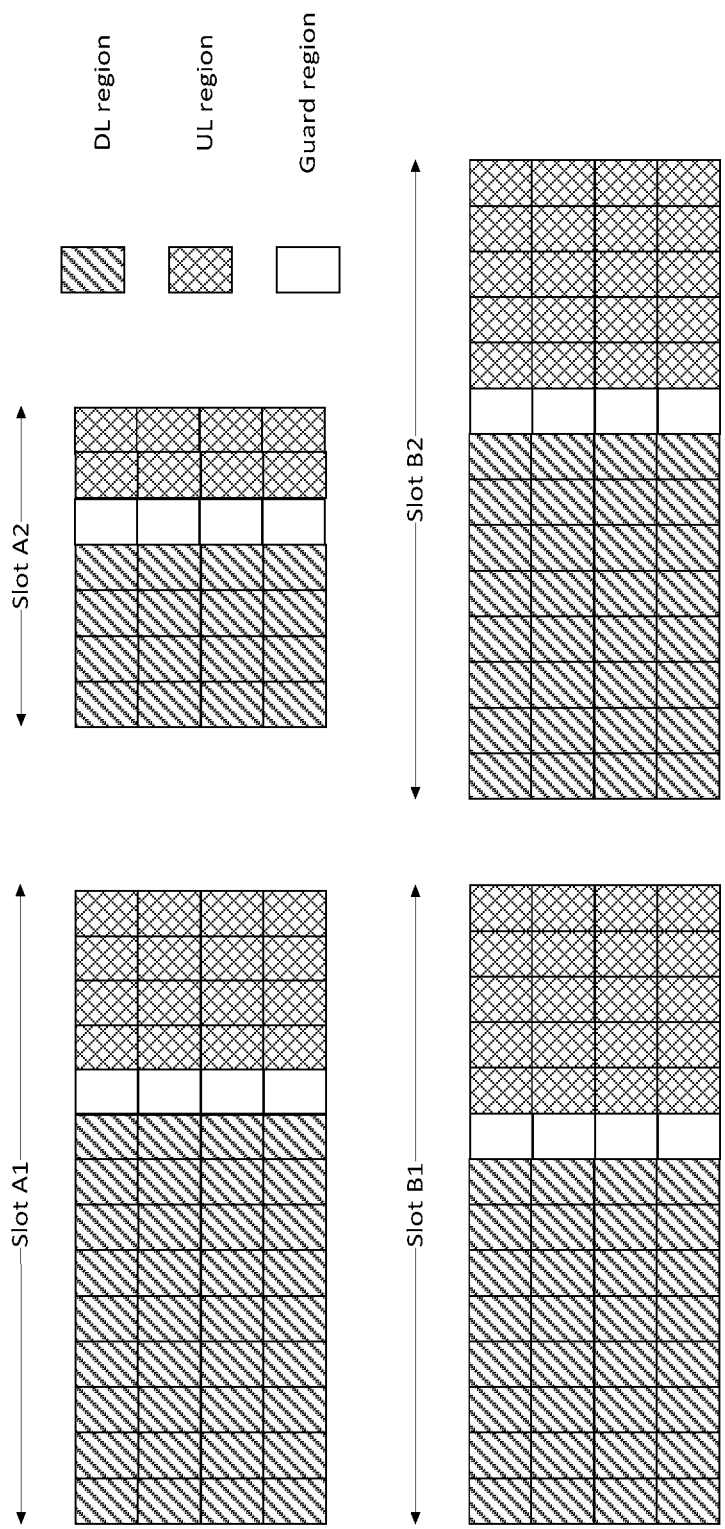
FIG. 24 shows example slot structures with dynamic and static slot structures.

A new channel Physical Slot Format Indicator Channel (PSFICH) is defined which is used to indicate the self-contained structure of the current slot. There is one and only one PSFICH in each cell. The PSFICH indicates the instantaneous sizes of the downlink region and the uplink region in terms of the number of OFDM symbols. If the slot size is dynamic, it should also signal the size of the current slot. For example, the following information can be transmitted in the PSFICH: size of the downlink region (e.g., 4 bits for the number of OFDM symbols in the downlink region); size of the uplink region (e.g., 4 bits for the number of OFDM symbols in the uplink region; and size of the current slot (e.g., 4 bits for the number of OFDM symbols in the current slot.)
{ }
Example PSFICHs with dynamic and static slot sizes are shown in FIG. 24, while their PSFICHs are summarized in Table 10.

TABLE 10

PSFICHs with Dynamic and Static Slot Sizes

| | Field Name | | |
|---|---|---|---|
| | PSFICH A1 | PSFICH A2 | PSFICH B |
| Size of the downlink region | 9 | 4 | 8 |
| Size of the uplink region | 4 | 2 | 5 |
| Size of the current slot | 14 | 7 | Static (14) |

If the number of symbols in the guard region is static or semi-static, it may not be necessary to signal the size of the uplink region directly, which can be calculated from the sizes of the current slot, the downlink region and the guard region.

The PSFICH may be transmitted in single antenna or transmit diversity mode. The PSFICH contains N information bits, where N depends on whether the sizes of the current slot and the uplink region are explicitly signaled. It is first coded by a channel code with a rate of 1/R, where the rate 1/R should be low to improve the reliability. The RN coded bits are scrambled with a scrambling code, depending on TRP ID, to randomize the interference, and then are modulated and mapped to resource elements RE. These REs should be well spread in frequency and cover the full downlink bandwidth.

In an exemplary mapping, coded bits are modulated by $2^d$-QAM, and the i-th coded symbol group containing S symbols is mapped to the k-th RE group with S REs, where $$k = k' + \left\lfloor i * \frac{dS * M}{RN} \right\rfloor,$$

M is the total number of RE groups in the downlink bandwidth, $$k' = \left(\frac{N_{SC}^{RB}}{2}\right) * (N_{ID}^{TRP} \bmod 2 N_{RB}^{DL}),$$

where $N_{ID}^{TRP}$ is the TRP ID, and $N_{sc}^{RB}$, $N_{RB}^{DL}$ are the number of subcarriers in a RB and the number of RBs in the downlink channel, respectively.

Note: When the PSFICH and the PCFICH are transmitted separately, the RE groups that they are mapped to cannot be overlapped. The PSFICH should be mapped to resource elements first, and the mapping of the PCFICH should avoid the REs occupied by the PSFICH.

The PSFICH may be combined with PCFICH to form a new downlink control channel. The PSFICH may also carry information of the size of the downlink control region. For example, the size of the downlink control region may also be transmitted in the PSFICH, including two bits for the number of OFDM symbols at the beginning of the downlink region, where the size of the downlink control region should be less than or equal to the size of downlink region.

Figure 25:
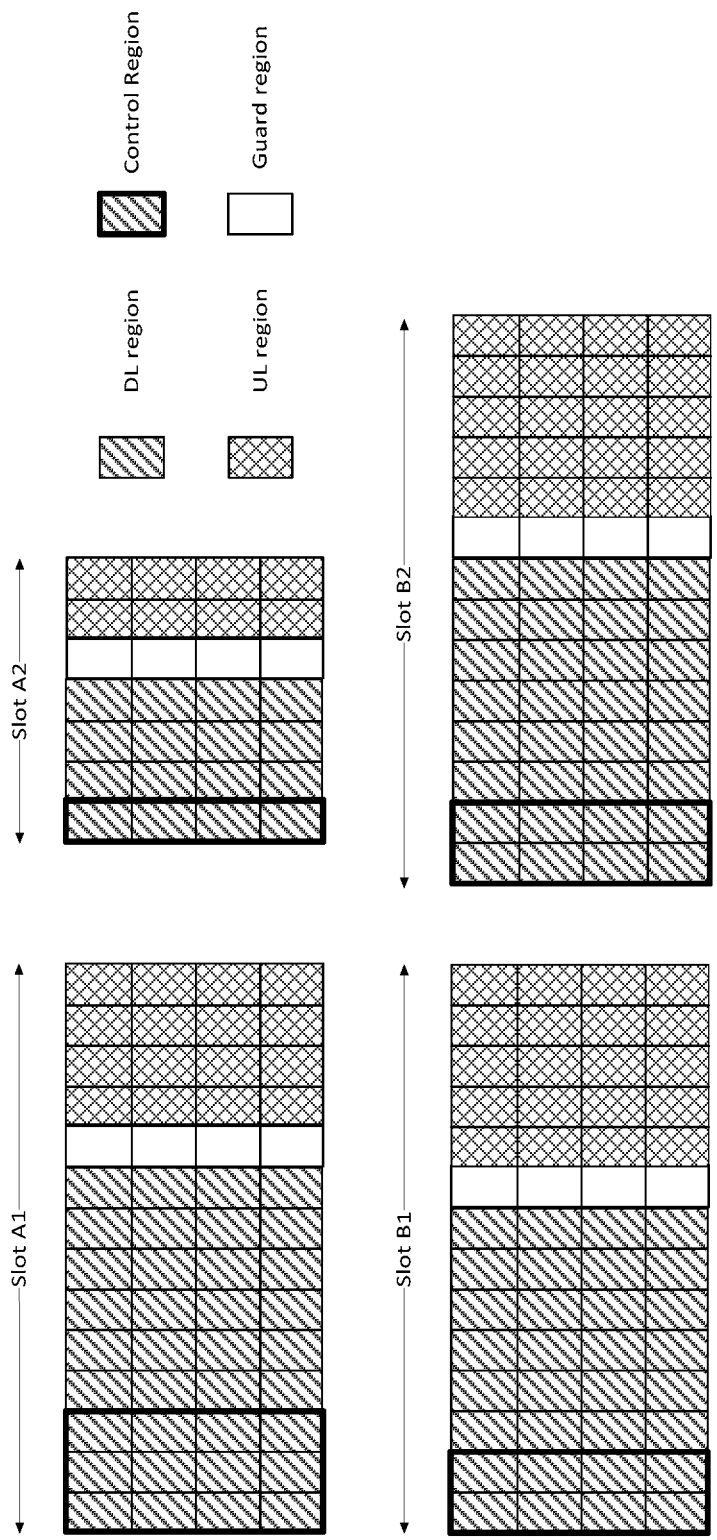
FIG. 25 shows example slot structures indicated by PSFICH with CFI.

Example slot structures indicated by PSFICH with Control Format Indicator (CFI) are shown in FIG. 25, while their PSFICHs are summarized in Table 11.

TABLE 11

PSFICHs with Control Format Indicator

| | Field Name | | |
|---|---|---|---|
| | PSFICH A1 | PSFICH A2 | PSFICH B |
| Size of the downlink region | 9 | 4 | 8 |
| Size of the DL control region | 3 | 1 | 2 |
| Size of the uplink region | 4 | 2 | 5 |
| Size of the current slot | 14 | 7 | Static (14) |

The physical layer procedure for PSFICH with CFI, such as channel coding, scrambling, modulation, and RE mapping, should remain the same as described above.

In this section, a two-tier NR PDCCH channel structure to support dynamic transmission mode switching in NR is proposed. The NR DCI formats for the two-tier NR PDCCH can be defined as follows.

The NR DCI format 0 may be the only NR DCI format used for the first tier NR PDCCH. A transmission mode for the data transmission and a subgroup index $n_0$ for the second tier search space may be transmitted by means of the NR DCI format 0.

The transmission mode for the data transmission may be a field with a fixed number of bits (e.g., 3 bits) which explicitly signals to the UE the transmission mode to be used for the downlink data transmission. Since the one-to-one mapping between the transmission mode and the second tier NR DCI format, it can be used to determine the second tier NR DCI format and reduce the UE's blind decoding attempts. In NR, the transmission modes may include transmit diversity, open-loop transmission, spatial multiplexing and beamforming. For example, "000", "001", "010" and "011" may be used in this field to indicate the transmission modes of transmit diversity, spatial multiplexing and beamforming, respectively; and The subgroup index $n_0$ for the second tier search space may be a field of d bits, (e.g., d=1), which signals to the UE the subset of the second tier search space to be used in blind decoding. As a result, the UE can only blindly decode from a subset of NR PDCCH candidates from its search space, but not from the entire search space.

Error detection is provided on the NR DCI transmission through a Cyclic Redundancy Check (CRC). The entire payload of the NR DCI format 0 contains the information bits and the CRC parity bits. The CRC parity bits are calculated based on the information bits, which contains the two fields defined above, and then are scrambled with the corresponding RNTI so that the UE can confirm whether the DCI is intended to send to itself.

As an alternative, to reduce the overhead of the first tier NR PDCCH, it could be transmitted in a group based approach. The first tier NR DCIs for multiple UEs can be combined to a single message and transmitted together. The NR node may group at most K active UEs together and assign them a group ID, where K is predefined in the standard specification. The NR DCI format 0 messages for UEs in the group are attached to form a single message. The CRC parity bits are calculated based on the entire payload of the combined message, and then scrambled with the group ID. The group ID is configured to the UE through RRC signaling, and the location of UE's individual message in the combined message could be predefined or signaled to the UE through RRC signaling. After receiving the signal, the UE can perform CRC, and if successful, the UE may obtain its first tier NR PDCCH message from its assigned location.

Another method of reducing the overhead is to set an expiration time for a first tier NR PDCCH message. If the message is the same from the previous slots and it is not expired, the NR node has no need to resend the same message. When the UE receives a new first tier NR PDCCH message, it may apply the same configuration for the transmission mode and the second tier search space in the following slot, until a new first tier NR PDCCH comes or the current one expires. The expiration time may be predefined in the standard specification or configured by higher layer signaling.

The second tier NR DCI formats are designed for different transmission modes. In NR, the transmission modes may include transmit diversity, open-loop transmission, spatial multiplexing, and beamforming. Only one NR DCI format may be needed for each of these transmission modes in NR. The following information may be transmitted by all NR DCI formats for the second tier NR PDCCH.

A carrier indicator may be used for cross carrier scheduling, which is optional and configured by RRC signaling. The basic information of other carriers, such as numerology, is also signaled through higher layer signaling. For example, a resource allocation may carry the resource allocation assignment. If there are different resource allocation methods in one NR DCI format, then a resource allocation flag field may be required to indicate which method is selected.

An alternate option is to configure the resource allocation method through higher layer signaling; a modulation and coding scheme (for each transmission block); a new data indicator (for each transmission block); a redundancy version (for each transmission block); a HARQ process number; a Downlink Assignment Index; transmission power control information; and SRS request (only be present for TDD operation).

In the NR DCI format for open-loop transmission, precoding matrix information may also be required, including information such as codebook index and PMI. The antenna ports for open-loop transmission could be predefined in the standards or configured by higher layer signaling.

In the NR DCI format for spatial multiplexing transmission, the number of layers and antenna port indices may also be required. This information may be signaled to the UE implicitly or explicitly. For implicit signaling, a set of limited configurations of these parameters may be predefined in the standard specification or configured by higher layer signaling. In the NR DCI format, only the index of the selected configuration is required.

In the NR DCI format for beamforming transmission, antenna port index information may be required. The antenna ports are different from those for spatial multiplexing. Each antenna port for beamforming transmission represents a pair of transmit and receive beams, which are found in beam training. The maximum number of transmit and receive beam pairs is configured by higher layer signaling. The antenna port index could be signaled to the UE implicitly or explicitly. For implicit signaling, a set of limited configurations of these parameters could be predefined in the standard specification or configured by higher layer signaling. In the NR DCI format, only the index of the selected configurations is signaled.

For transmit diversity transmission, no more information is required in its NR DCI format. The details for the transmit diversity are discussed further below.

The second tier NR DCI formats have the same error detection and scrambling procedure as the first tier NR DCI format, so that the UE could decide whether the NR DCI is intended to send to itself.

The first tier NR PDCCH may be transmitted in the downlink control region, and may be mapped to the resources in either common search spaces or UE-specific search spaces. The control region consists of a set of CCEs, with indices from 0 to $N_{CCE,k}-1$, where $N_{CCE,k}$ is the total number of CCEs in the control region of slot k.

The common search space is defined as a set of NR PDCCH candidates which could be used to transmit system control messages as well as individual control messages. To achieve the high reliability requirement for the system messages, the common search spaces may be defined with high aggregation levels. For example, the CCEs corresponding to m-th NR PDCCH candidate in the common search space with aggregation level 1 may be defined as l(m mod $\lfloor N_{CCE,k}/l \rfloor$)+i, where i=0, . . . , l−1, m=0, . . . $M_0^{(l)}$−1, k is the slot number and $M_0^{(l)}$ is the number of NR PDCCH candidates the search space.

The UE-specific search space may be different for each UE for efficient utilization of the resources in the system. To exploit any possible frequency diversity and randomize the interference, the UE-specific search space may be designed to be time-variant and to spread across the full bandwidth. The aggregation levels for the UE-specific search space for the first tier NR PDCCH may be designed to meet the required performance even for the UE at cell edge.

The second tier NR PDCCH may be transmitted in the downlink control region or the downlink data region, which is configured by higher layer signaling, and may be mapped to the resources in the UE-specific search spaces.

In the downlink control region, to avoid a situation where the second tier NR PDCCH candidates are blocked by the first tier NR PDCCHs, the UE-specific search spaces for the first tier and the second tier NR PDCCHs should come from different CCE sets A' and A''. As an example, from the total $N_{CCE,k}$ CCEs in the downlink control region, the first $N'_{CCE,k}$ CCEs form the set of CCEs for the first tier NR PDCCH (i.e., A'), and the other $N'_{CCE}$ (=$N_{CCE,k}-N'_{CCE,k}$) CCEs form the set of CCEs for the second tier NR PDCCH (i.e., A'').

For example, the search spaces for the first tier and the second tier NR PDCCHs in the downlink control region may be defined as follows.

The CCEs in the set A' corresponding to the m-th NR PDCCH in the UE-specific search space for the first tier NR PDCCH with aggregation level 1 could be defined as l(($Y_{k,1}$+m') mod $\lfloor N'_{CCE,k}/l \rfloor$)+i, where i=0, . . . , l−1, k is the slot number, m'=m+$M_1^{(l)}*n_{CI}$ where $n_{CI}$ is the carrier indicator field value if the UE is configured with carrier indicator field, else m'=m, where m=0, . . . $M_1^{(l)}$−1 and $M_1^{(l)}$ is the number of NR PDCCH candidates the search space. The variable $Y_{k,1}$ is defined as $Y_{k,1}=(I_{1,1}*Y_{k-1,1})$ mod $I_{2,1}$, where $Y_{-1,1}$ is the corresponding RNTI and $I_{1,1}$ and $I_{2,1}$ are two large integers, which are coprime.

The CCEs in the set A'' corresponding to the m-th NR PDCCH in the $n_0$-th group in the UE-specific search space for the second tier NR PDCCH with aggregation level 1 could be defined as $$l\left(\left(Y_{k,2} + (n_0 - 1)\left\lfloor \frac{N''_{CCE}}{2^d} \right\rfloor + m'\right) \bmod \lfloor N''_{CCE,k}/l \rfloor\right) + i,$$

where i=0, . . . , l−1, k is the slot number, $n_0$=1, 2, . . . , $2^d$ is the group index configured by the first tier NR PDCCH, m'=m+$M_2^{(l)}*n_{CI}$ where $n_{CI}$ is the carrier indicator field value if the UE is configured with carrier indicator field, else m'=m, where m=0, . . . $M_2^{(l)}$−1 and $M_2^{(l)}$ is the number of NR PDCCH candidates the $n_0$-th group of the search space. The variable $Y_{k,2}$ is defined as $Y_{k,2}=(I_{1,2}*Y_{k-1,2})I_{2,2}$, where $Y_{-1,2}$ is the corresponding RNTI, $I_{1,2}$ and $I_{2,2}$ are two large integers, which are coprime a may be different from $I_{1,1}$ and $I_{2,1}$.

In the downlink data region, higher layer signaling can configure a UE with one or two sets for NR PDCCH monitoring, one of which is a localized set and the other a distributed set. Each set consists of a set of CCEs, with indices from 0 to $N_{CCE,p,k}-1$, where $N_{CCE,p,k}$ is the total number of CCEs in the set p of slot k.

For example, the UE specific search spaces for the second tier NR PDCCH in the downlink data region may be defined as follows.

The CCEs corresponding to the m-th NR PDCCH in the $n_0$-th group in the UE-specific search space for the second tier NR PDCCH with aggregation level 1 could be defined as $$l\left(\left(Y_{p,k} + \left\lfloor \frac{m * N_{CCE,p,k}}{l * M_p^{(l)}} \right\rfloor + (n_0 - 1) \left\lfloor \frac{N_{CCE,p,k}}{l * M_p^{(l)} * 2^d} \right\rfloor + m'\right) \bmod \lfloor N_{CCE,p,k}/l \rfloor\right) + i,$$

where $i=0, \ldots, l-1$, k is the slot number, $n_0=1, 2, \ldots, 2^d$ is the group index configured by the first tier NR PDCCH, $m'=n_{CI}$ if the UE is configured with carrier indicator field where $n_{CI}$ is the carrier indicator field, else $m'=0$, and $m=0, \ldots, M_p^{(l)}-1$ and $M_p^{(l)}$ is the number of NR PDCCH candidates in the $n_0$-th group of the search space. The variable $Y_{p,k}$ is defined as $Y_{p,k}=(I'_{1,p}*Y_{p,k-1}) \bmod I'_{2,p}$ where $Y_{-1,p}$ is the corresponding RNTI, $I'_{1,p}$ and $I'_{2,p}$ are two large integers, which are coprime and may be different from $I_{1,1}$ and $I_{2,1}, I_{1,2}$ and $I_{2,2}$.

Figure 26:
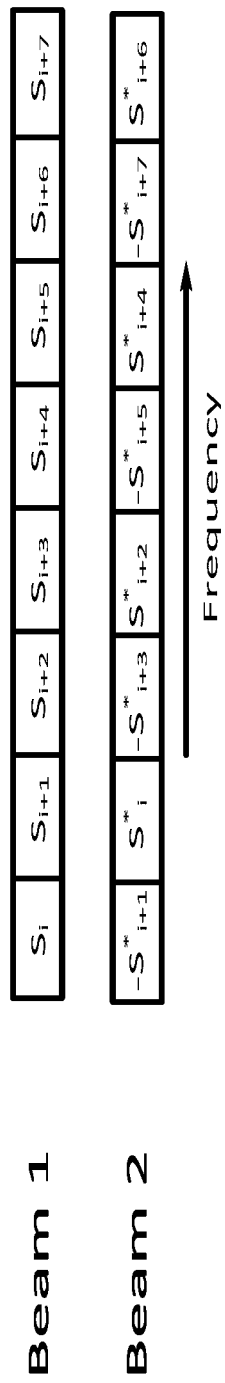
FIG. 26 shows an example beam based Space-Frequency Block Code (SFBC).
Figure 27:
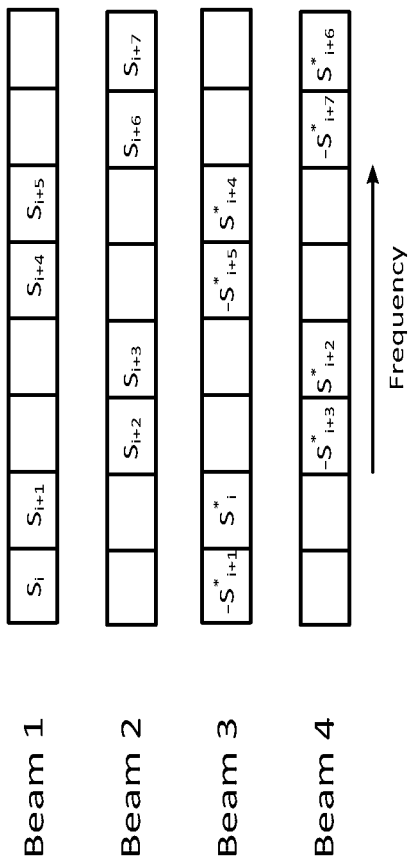
FIG. 27 shows an example beam based Frequency Switch Transmit Diversity (FSTD).

To achieve a high reliability, the NR PDCCH in the control region may be transmitted by beam based transmit diversity. The transmit diversity can be based on Space-Frequency Block Code (SFBC) and Frequency Switch Transmit Diversity (FSTD). FIGS. 6 and 7 illustrate the transmit diversity schemes, which may utilize multiple beams to provide diversity gain. As shown in FIG. 26, the SFBC may operate on two beams, while at least four beams may be needed for FSTD as shown in FIG. 27.

During beam training, the UE may report the best M beams according to SINR or other criterion, where M may be configured by RRC signaling as well as a threshold. In an example case where the UE has less than M beams with performance meeting the given threshold, the UE would only report the beams achieving the given threshold. After beam training, the NR node transmits the actual number P of formed beam pairs to the UE through RRC signaling, where P may be less than or equal to M. Antenna ports $n_1$, $n_2$, ... $n_p$ are defined for each of the P Tx beams. An exemplary antenna port mapping for the NR PDCCH in the control region is shown as follows.

If $P \geq 4$, FSTD may be applied to the NR PDCCH in the control region. The signals are mapped to the antenna ports $n_1, n_2, n_3, n_4$ for transmission;

If $P=2, 3$, SFBC may be applied to the NR PDCCH in the control region. The signals are mapped to the antenna ports $n_1, n_2$ for transmission; and If $P=1$, single beam transmission may be applied to the NR PDCCH in the control region. The signals are mapped to the antenna ports $n_1$ for transmission.

The above beam training and antenna port mapping procedure is applicable not only for the NR PDCCH transmission but also for NR data transmission.

As an alternative to the two-tier NR PDCCH, this method supports configuration of potential transmission modes by RRC signaling and then the transmission mode to be used by the UE at any given point in time is activated by NR (New Radio) node (e.g. gNB) command using MAC Control Element (CE) signaling in the MAC header.

As an example, the NR node (e.g., gNB) could configure, through RRC signaling, the UE with the set of potential transmission modes the NR Node intends to use for the UE. This could be based on one or more of the following: the UE capability, the services the UE intend to use or the network assumed the UE will be using based on the UE service usage history, the operator policy, the UE subscription profile and expected experienced user experience (e.g. platinum, gold, silver or bronze level). An example of an Antenna configuration information element within an RRC configuration message is illustrated below.

Example of Antenna Information Elements

```
-- ASN1START
AntennaInfoCommon ::=           SEQUENCE {
    antennaPortsCount               ENUMERATED {an1, an2, an4, spare1}
}
AntennaInfoDedicated ::=        SEQUENCE {
    transmissionModeList            TransmissionModeList OPTIONAL
TransmissionModeList    ::=     SEQUENCE (size 1...maxNumberOfTransmissionMode) of
TransmissionMode
TransmissionMode        ::= INTEGER (1...axNumberOfTransmissionMode) where tm1 corrsponds to
transmission model, tm2 for transmission mode2,....etc.
        codebookSubsetRestriction       CHOICE {
            n2TxAntenna-tm3                 BIT STRING (SIZE (2)),
            n4TxAntenna-tm3                 BIT STRING (SIZE (4)),
            n2TxAntenna-tm4                 BIT STRING (SIZE (6)),
            n4TxAntenna-tm4                 BIT STRING (SIZE (64)),
            n2TxAntenna-tm5                 BIT STRING (SIZE (4)),
            n4TxAntenna-tm5                 BIT STRING (SIZE (16)),
            n2TxAntenna-tm6                 BIT STRING (SIZE (4)),
            n4TxAntenna-tm6                 BIT STRING (SIZE (16))
        } OPTIONAL,                                                             -- Cond TM
        ue-TransmitAntennaSelection     CHOICE{
            release                         NULL,
            setup                           ENUMERATED {closedLoop, openLoop}
        }
}
AntennaInfoDedicated-v920 ::=   SEQUENCE {
    codebookSubsetRestriction-v920  CHOICE {
        n2TxAntenna-tm8-r9              BIT STRING (SIZE (6)),
        n4TxAntenna-tm8-r9              BIT STRING (SIZE (32))
    } OPTIONAL                                                                  -- Cond TM8
}
AntennaInfoDedicated-r10 ::=    SEQUENCE {
    transmissionMode-r10            ENUMERATED {
```

```
                                        tm1, tm2, tm3, tm4, tm5, tm6, tm7, tm8-v920,
                                        tm9-v1020, tm10-v1130, spare6, spare5, spare4,
                                        spare3, spare2, spare1},
        codebookSubsetRestriction-r10   BIT STRING                    OPTIONAL,      -- Cond TMX
        ue-TransmitAntennaSelection     CHOICE{
            release                     NULL,
            setup                       ENUMERATED {closedLoop, openLoop}
        }
    }
}
AntennaInfoDedicated-v10i0::=   SEQUENCE {
    maxLayersMIMO-r10           ENUMERATED {twoLayers, fourLayers, eightLayers}    OPTIONAL   --
Need OR
}
AntennaInfoDedicated-v1250 ::=  SEQUENCE {
    alternativeCodebookEnabledFor4TX-r12    BOOLEAN
}
-- ASN1STOP
```

The NR Nodes may activate or deactivate a transmission mode using MAC CE. The NR node may perform real-time transmission mode activation or deactivation decisions based on UE feedback (e.g., MAC level feedback) including feedback on UE radio link condition and channel state information, variation in overall network load condition, and network operator policies. Information similar to that defined in NR DCI format 0 may be carried in a new MAC Control Element as defined below.

The transmission mode Activation/Deactivation MAC control element may be defined over a fixed number n of octets. The transmission MAC CE may be identified by a MAC PDU sub-header with a Logical Channel Identifier (LCD). Two examples of MAC CE are illustrated below.

Figure 28:
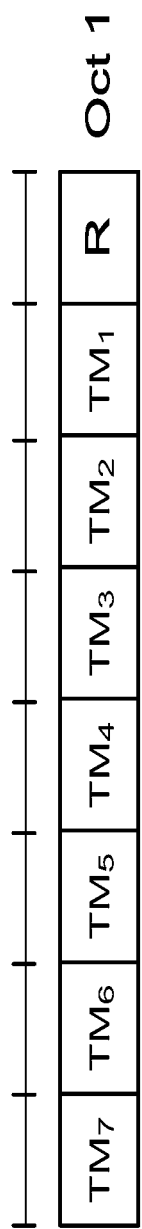
FIG. 28 shows an example transmission mode activation/deactivation MAC control element of one octet.

An Activation/Deactivation MAC control element with one octet is shown in FIG. 28. It has a fixed size and consists of a single octet containing seven C-fields and one R-field. An example of an Activation/Deactivation MAC control element of four octets is shown in FIG. 29. It has a fixed size and consists of a four octets containing 31 C-fields and one R-field. The TMi field may be set to "1" to indicate that the TM shall be activated. The TMi field may be set to "0" to indicate that the TM shall be deactivated.

The logical channel ID may be one of the existing reserved values of LTE downlink logical channels between the range 01011 and 10111 (binary coding). Alternatively the LTE logical channel value ranges may be extended with new defined values assigned to the transmission mode MAC CE.

For this method, the NR PDCCH format should carry the same information as the second tier NR PDCCH defined above. The physical layer procedure and search space design could be the same as well.

Figure 30:
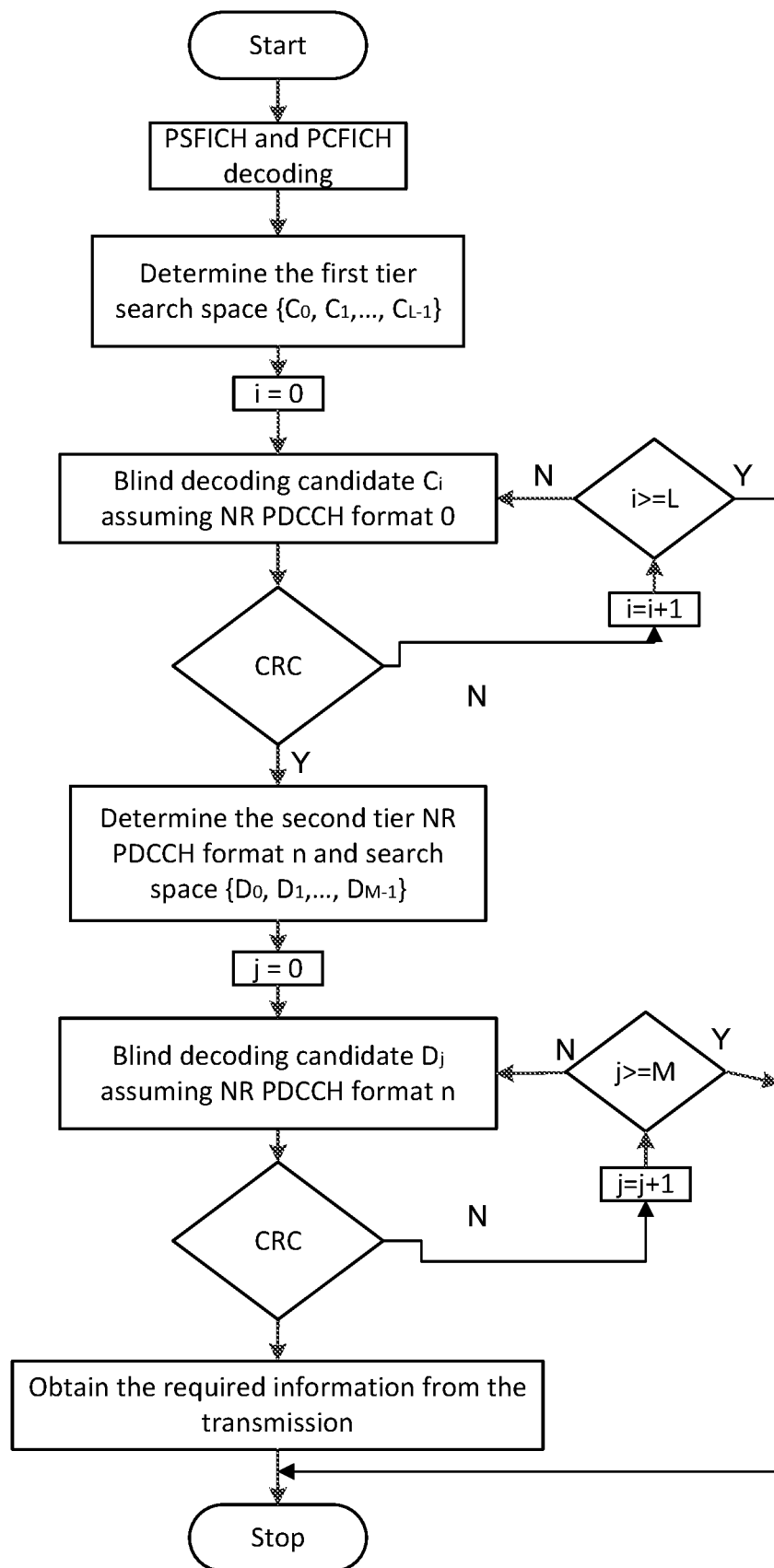
FIG. 30 illustrates an example procedure for two-tier NR PDCCH.

FIG. 30 shows an example procedure for the two-tier NR PDCCH detection by a UE. The UE first decodes the PSFICH and the PCFICH to obtain the slot structure and the size of the downlink control region. According to the slot structure and the size of the downlink control region, the UE determines the common search spaces and the UE specific search spaces for the first tier NR PDCCH. The UE monitors a unified NR DCI format 0 for the first tier NR PDCCH in its search spaces. The UE blindly decodes every candidate in its first tier NR PDCCH, and checks the CRS with its ID. If the CRCs are not successful for any NR PDCCH candidates in the search space, this implies that the UE is not scheduled in the current slot, and will not perform the second tier blind decoding. The UE monitors the corresponding second tier NR DCI format in its second tier search space. If CRC is successful, the UE can obtain the required information for the downlink or uplink transmission.

If the CRC is successful, the UE can obtain the index of the second tier NR DCI format and an index to determine the second tier search space from the NR DCI.

An alternative option of signaling the transmission mode is through MAC CE.

Various examples, solutions relating to NR-PDCCH design for improved reliability are discussed below.

LTE uses turbo codes to encode data in Uplink (UL) and Downlink (DL). The mother code consists of 2 parallel concatenated recursive convolutional encoders providing a code rate of 1/3. In New Radio (NR), low rate codes are being considered for encoding the data and control for both Ultra-Reliable and Low Latency Communications (URLLC) and massive Machine Type Communication (mMTC) applications. For URLLC, low rate codes provide higher reliability from improved coding gain. mMTC gains from low rate coding because the need for retransmissions is lowered—consequently power is conserved.

It is expected that NR will target much lower BLER for data than LTE (e.g., BLER of 10 or less). Currently LTE's operating point is typically 10-1 for a single transmission although it is a proprietary configuration in the eNB. The target BLER for NR is expected to be achieved through more robust low rate codes and possibly retransmissions.

3GPP TR 38.913 defines scenarios and requirements for next generation access technologies. According to this requirement, for URLLC the target for user plane latency should be 0.5 ms for UL, and 0.5 ms for DL. This implies that the BLER has to be achieved within these latency constraints.

For NR, it has been suggested that code rates between 1/3 and 1/15 are of interest. Packet sizes as small as 20 Bytes are being considered. These codes may be applied both for data and control channels in the UL and DL.

LTE supports a minimum packet size of 40 bits; if the Transport Block (TB) is smaller than 40 bits, it is zero-padded to have 40 bits. A Cyclic Redundancy Check (CRC) is applied to the TB. At the receiver, if this CRC check fails, a Non-acknowledgement (NACK) is sent and a retransmission follows.

Figure 31:
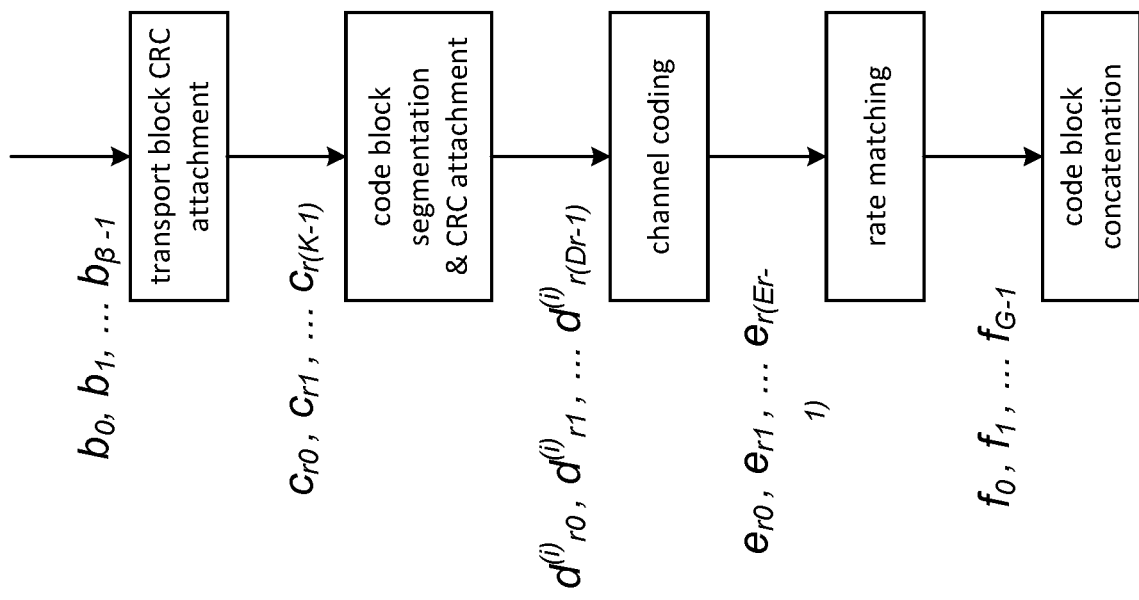
FIG. 31 is an example DL transmission chain for a transport block.

Transport block sizes greater than 6144 are split into multiple code blocks not exceeding 6144 bits. A CRC is applied to each code segment. Even if a single CB is in error, HARQ retransmissions consist of the entire transport block. FIG. 31 shows an example of the data processing chain in LTE UL.

It has been agreed in NR that a subframe may contain a fixed number of symbols. It may support multiple control regions and one or more data transmissions. Multiple numerologies may be multiplexed in a subframe through TDM/FDM.

3GPP TS 36.300 summarizes the different characteristics of MAC and RRC control are as shown in Table 12 below.

TABLE 12

Summary of the difference between MAC and RRC control

| Control entity | MAC control<br>MAC | | RRC control<br>RRC |
|---|---|---|---|
| Signaling | PDCCH | MAC control PDU | RRC message |
| Signaling reliability | ~$10^{-2}$ (no retransmission) | ~$10^{-3}$ (after HARQ) | ~$10^{-6}$ (after ARQ) |
| Control delay | Very short | Short | Longer |
| Extensibility | None or very limited | Limited | High |
| Security | No integrity protection<br>No ciphering | No integrity protection<br>No ciphering | Integrity protection<br>Ciphering |

A difference between MAC and RRC control lies in the signaling reliability. Due to the signaling reliability, signaling involving state transitions and radio bearer configurations should be performed by RRC. Basically, signaling performed by RRC in UTRA should also be performed by RRC also for E-UTRA.

Figure 32:
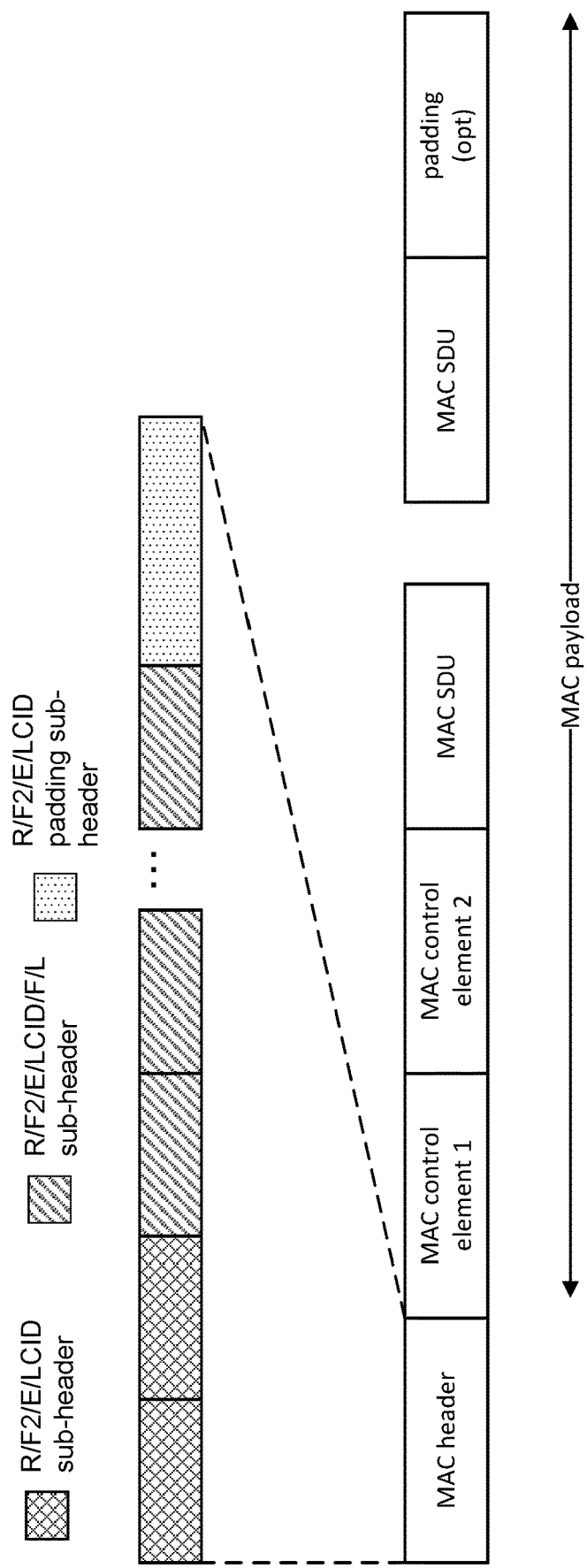
FIG. 32 is an example of a MAC PDU.

The MAC sublayer is responsible for the multiplexing/de-multiplexing of MAC Service Data Units (SDUs) belonging to one or more logical channels into/from transport blocks (TB) delivered to/from the physical layer on transport channels. A MAC Protocol Data Unit (PDU) consists of a MAC header, zero or more MAC SDUs, zero, or more MAC control elements, and optionally padding; as shown in FIG. 32.

Figure 33:
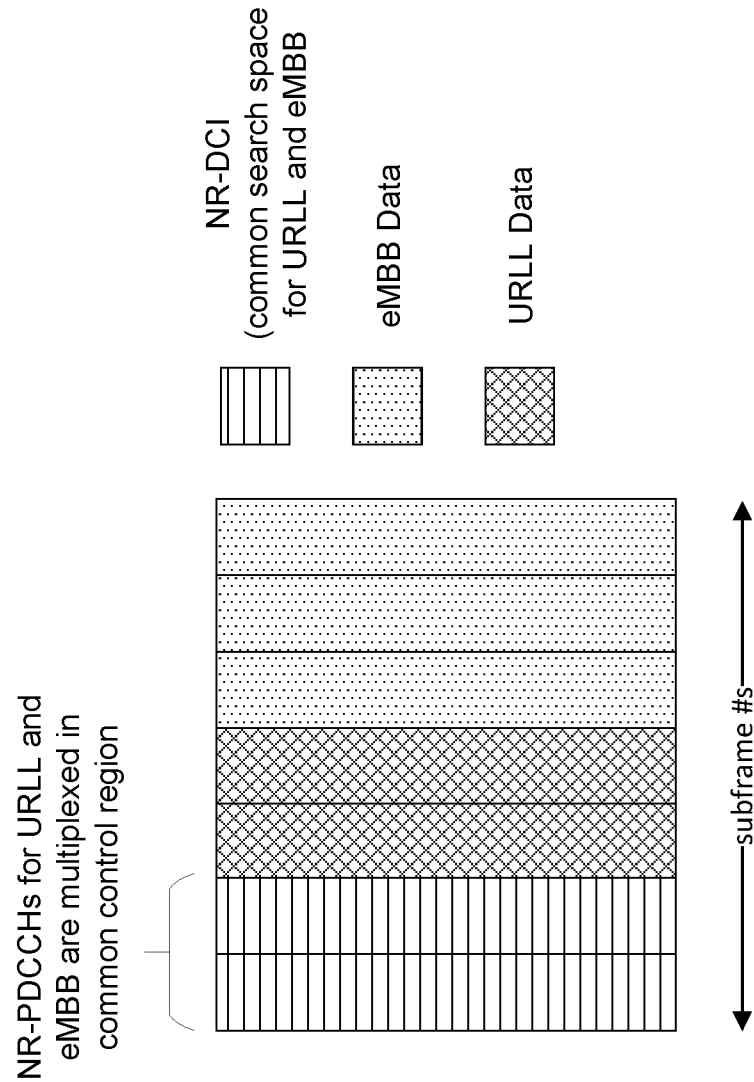
FIG. 33 shows an example of a Common control search space for eMBB and URLL.

In one example, the control information for different use cases is multiplexed within a common set of resources. For example, eMBB and URLL may both operate using the same subcarrier spacing. Accordingly, both use cases may have their NR-DCI (transmitted on NR-PDCCHs) mapped into a common control region in the subframe. In some cases, the URLL or eMBB UE blindly decodes the common control region to its respective NR-PDCCH(s). FIG. 33 shows an example where NR-PDCCH from URLLC and eMBB are multiplexed within a common control search space of a subframe. The remaining symbols of the subframe are multiplexed between URLLC and eMBB data.

In LTE, different aggregation levels were used to provide different code rates for the PDCCHs. The LTE eNB typically determines the aggregation level for a PDCCH based on the weakest SNR of a UE for whom the information is targeted, especially for multicast DCI. However, in NR, the reliability requirements of the NR-PDCCHs can be very different. For example, URLL may require error rates lower than $10^{-4}$ while eMBB may operate at $10^{-3}$. Here, the use case may be an additional driver in determining the coding rate of a particular NR-PDCCH.

Figure 34:
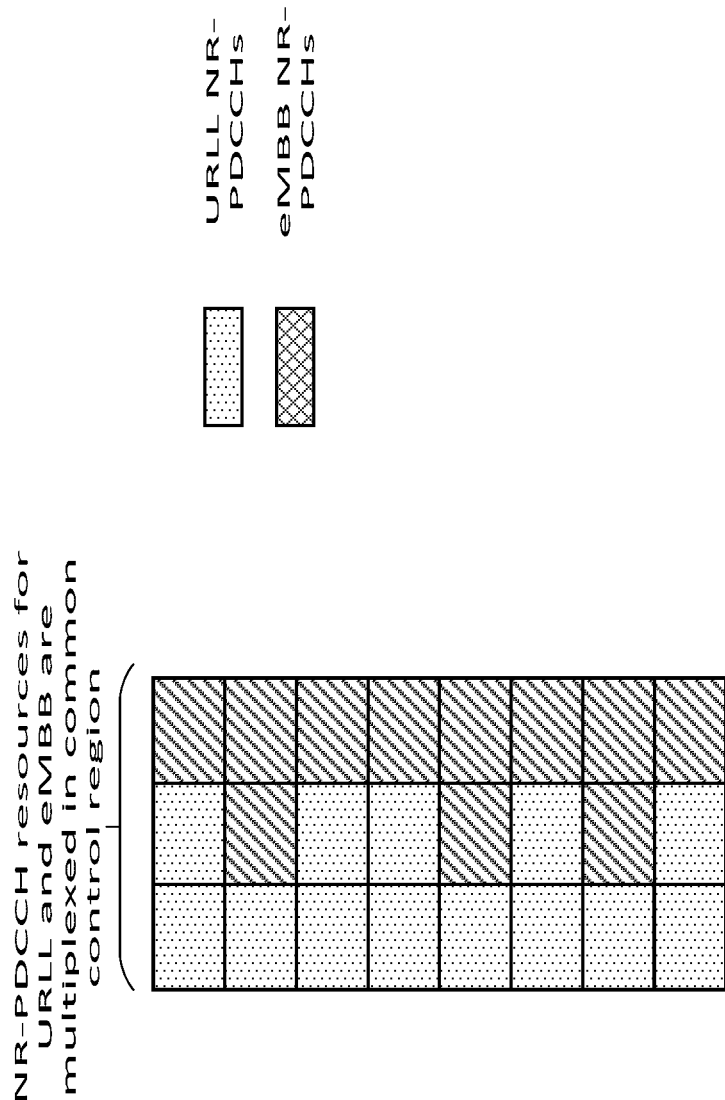
FIG. 34 shows an example of a URLL NR-PDCCHs being mapped in the leading symbols.

In another example, the NR-PDCCHs of use cases with more stringent latency requirements be mapped to resources in the leading symbols within the subframe. FIG. 34 shows an example where the NR-PDCCHs of the URLL use case are mapped beginning with the 1st symbol of the subframe. The NR-PDCCHs of the eMBB use case are mapped to available resources in the subsequent symbols.

Figure 35:
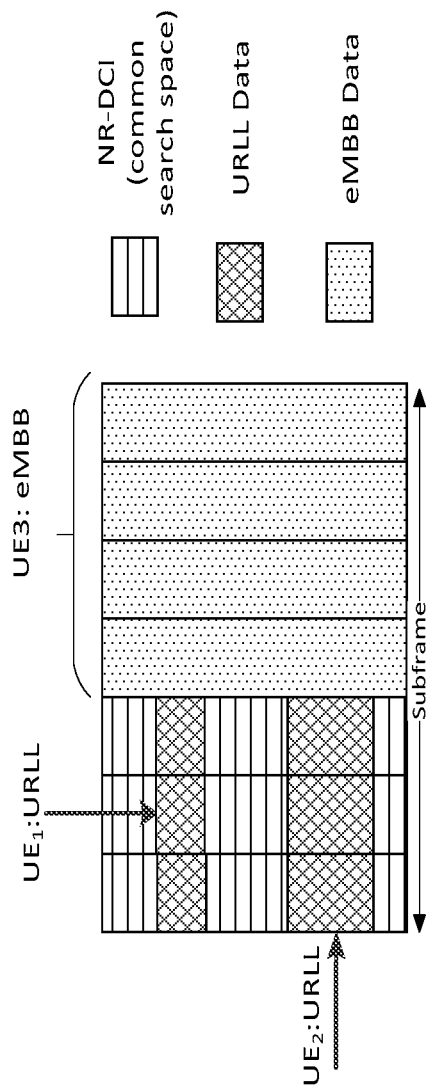
FIG. 35 shows an example of URLL data resources in the leading symbols of the subframe.

In an example, data for the latency constrained use cases is mapped to leading symbols or the earliest symbols occurring in a transmission interval. For example, as seen in FIG. 34, the data for URLL case is mapped to the leading resources in the transmission interval to reduce latency. FIG. 35 shows another example where the resources may be reserved for carrying data in the leading symbols of a subframe to provide minimal latency to data. Here, the leading symbols consist of resources preassigned to the common search space and resources reserved for data. The URLL data is carried in the leading symbols while eMBB data is carried in the following symbols. The NR-PDCCH for the URLL may be assigned in the leading symbols of the control region.

Figure 36:
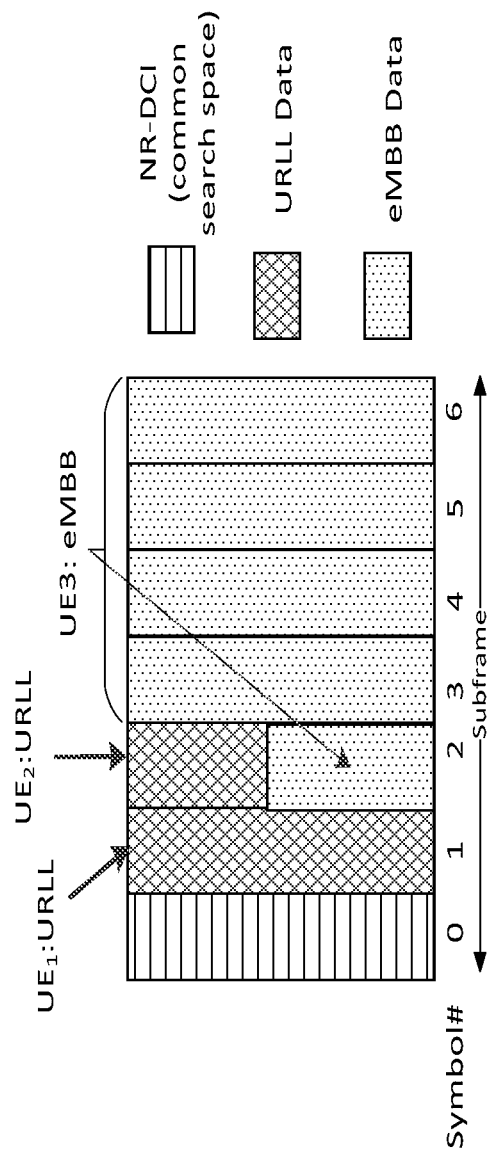
FIG. 36 shows an example of Resource multiplexing between UEs.

In order to support this, by way of one example, we propose that NR-DCI have the ability to configure the resources for the multiplexed users in terms of PRBs in each symbol. For example, in FIG. 36, three users are configured, 2 of which are URLL and 1 is eMBB. The NR-DCI for these grants should configure symbol #1 for UE1, #2 for UE2 and a part of symbol #2 and symbols #3 through 6 for UE3. One PRB may be smallest allocation of resources; so the NR-DCI would configure the PRBs per symbols for the UEs.

In an example, the NR-PDCCHs carrying DCI for multicast message may be transmitted using lower coding rates based on the reliability requirements for the most stringent use case among several use cases signaled in this DCI. For example, multicast NR-DCIs such as those for paging and power control may target both URLL and eMBB and should be coded with lower code rates to support the reliability requirements of URLL.

In another example, a common mother code may be used for some, for instance all, use cases. URLLs may use lower code rates to achieve additional reliability while eMBB may use higher code rates. An example way to achieve this is to enable appropriate rate matching to allow large aggregation levels for URLL. An example way to achieve these greater aggregation levels is to transmit the multiple redundancy versions $RV_0 \ldots RV_n$ (like the transport blocks/code blocks of PDSCH or PUSCH in LTE), where n≥1 and RV, is in the set of aggregation levels for eMBB. So the NR-Node shall transmit several redundancy versions of an NR-PDCCH to achieve the target code rate/aggregation level for URLL but at least one of the versions can be decoded by eMBB with acceptable error rate. These redundancy versions may be transmitted in one of the following ways.

Figure 37:
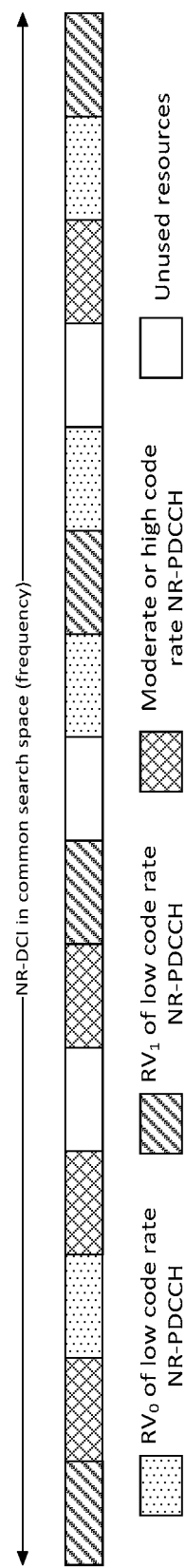
FIG. 37 shows an example of Low code rate NR-PDCCH split into RVs in frequency.

The different redundancy versions can be distinctly identified in frequency. FIG. 37 shows an example where two redundancy versions $RV_0$ and $RV_1$ are supported for the low rate NR-DCIs. $RV_0$ and $RV_1$ of a URLL's NR-PDCCH occur in symbol #0 but can be distinguished separately by a URLL UE. An example advantage of this scheme is that some devices that do not support URLL modes do not require low rate code decoders in their hardware. Effectively, the eMBB receiver can be unaware of the lower code rates as long as at least one of the RVs is within the set of code rates supported by eMBB use cases.

For example, an eMBB device that does not require the reliability levels of URLL operation may not require low code rate decoders. Assuming that the NR-PDCCH is a multicast message, such an eMBB device decodes $RV_0$ alone successfully with acceptable reliability. It may separately decode $RV_1$. If successful it ignores the repeated DCI; if it fails it ignores the DCI. On the other hand, the URLL UE jointly decodes $RV_0$ and $RV_1$ and achieves higher reliability without sacrificing latency.

Figure 38:
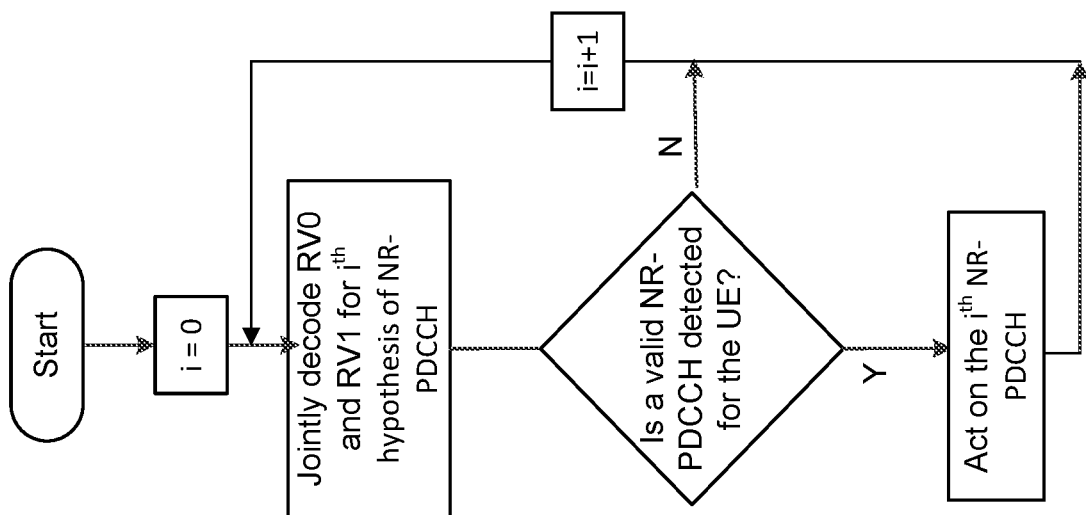
FIG. 38 shows an example of a URLL UE procedure for decoding its NR-PDCCHs.

FIG. 38 shows the URLL UE's procedure for blindly decoding the NR-PDCCH. Here, 2 redundancy versions are assumed for the low rate NR-DCI codes. The URLL UE jointly decodes them in its blind search.

Figure 39:
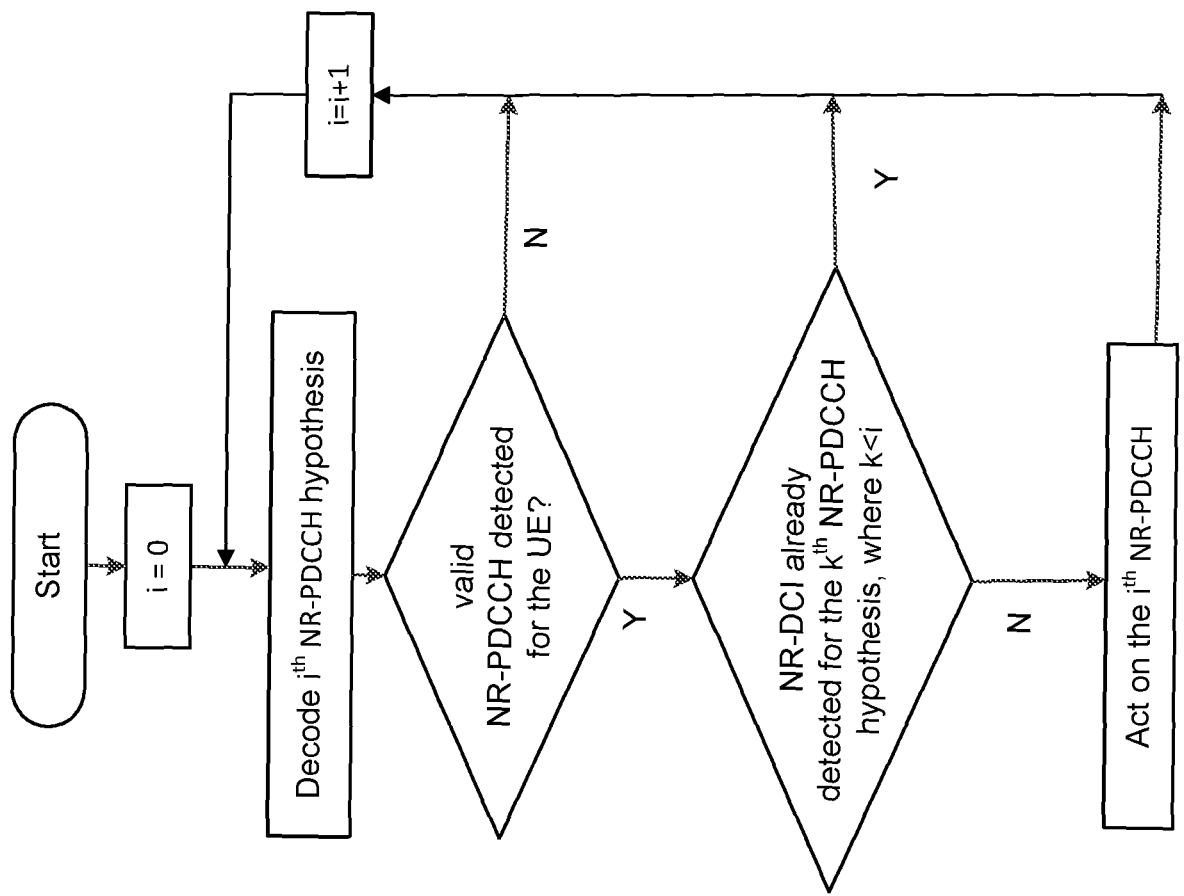
FIG. 39 shows an example of a eMBB UE procedure for decoding its NR-PDCCHs.

FIG. 39 shows the URLL UE's procedure for blindly decoding the NR-PDCCH. The eMBB UE ma ignore the low code rates and blindly decode the hypotheses, assuming eMBB code rates and aggregation levels.

Figure 40:
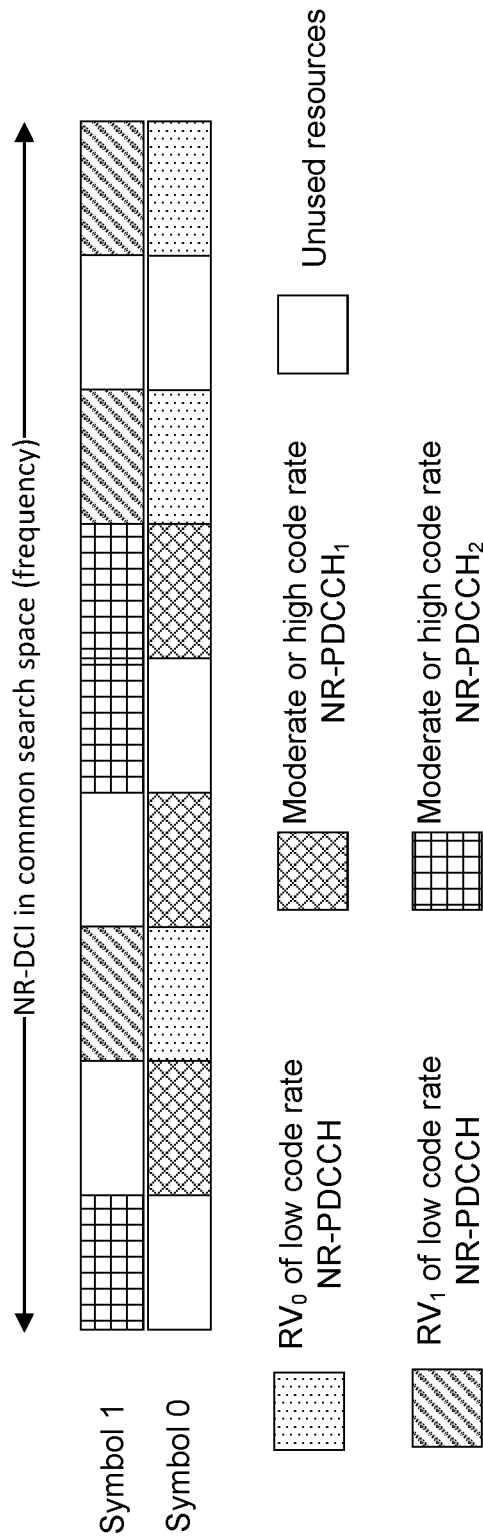
FIG. 40 shows an example of a Low code rate NR-PDCCH split into RVs in time.

Referring now to FIG. 40, the different redundancy versions may transmitted in different symbols. FIG. 40 shows an example where the NR-PDCCH for URLL use case is segmented into $RV_0$ and $RV_1$ transmissions on symbols 1 and 2 of a subframe and multiplexed with the NR-PDCCHs for eMBB. An advantage of this scheme is that latency constrained devices with good SINR can successfully decode RV0 with acceptable reliability and immediately respond to the NR-DCI. Devices with poor SINR wait for the $2^{nd}$ symbol and jointly decode $RV_0$ and $RV_1$ before acting on their grant. Through this scheme a vast majority of the UEs can be provided high performance with low latency. In some cases, only cell edge UEs are likely to suffer from worse latency. Note that with this scheme, UEs that might not need to support low rate NR-DCI code rates (for example eMBB UEs are not required to have low rate decoders in their hardware).

Figure 41:
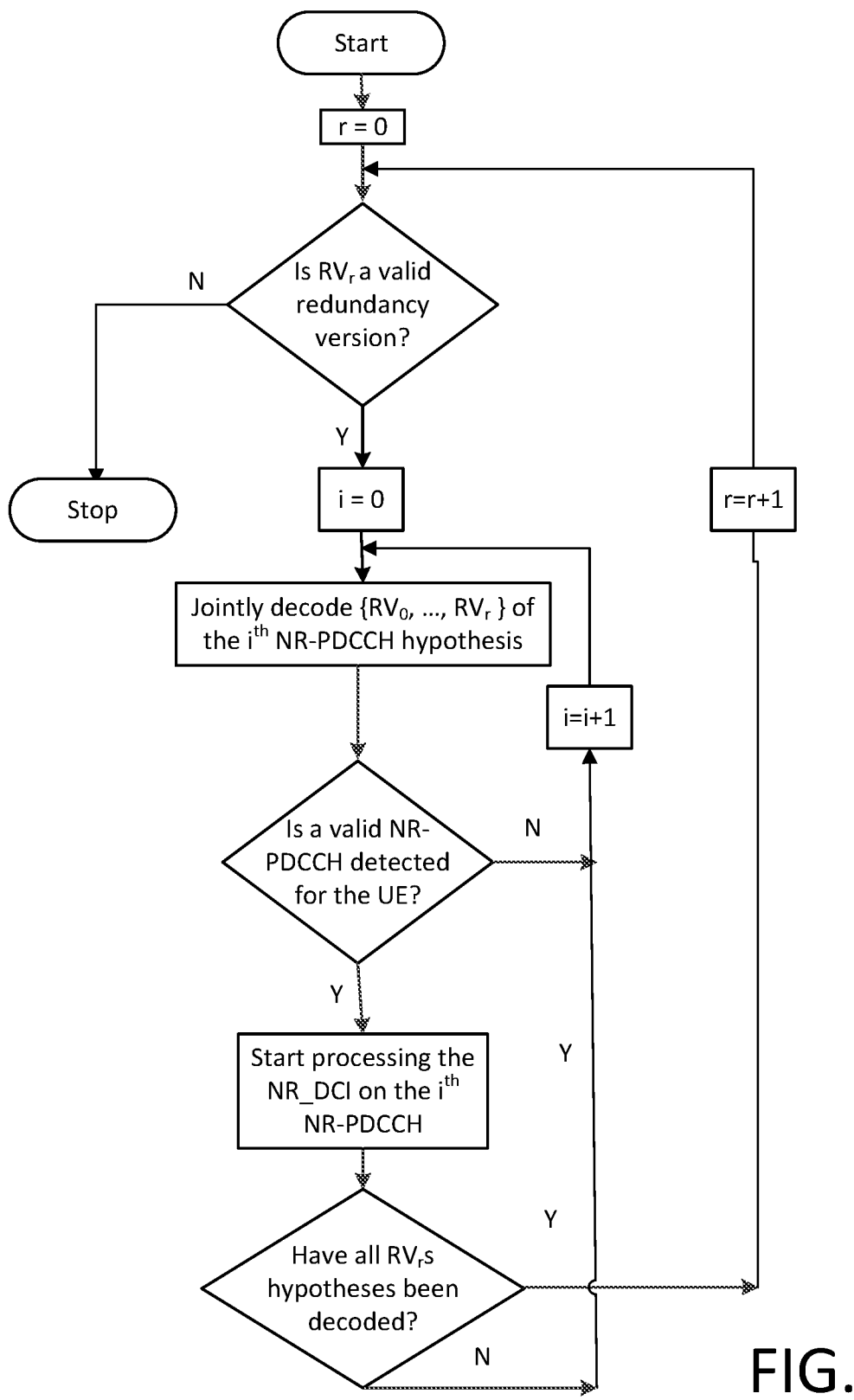
FIG. 41 shows an example of a URLL UE procedure for decoding NR-PDCCH by iterating through all NR-PDCCHs of a given RV.

FIG. 41 shows the URLL UE's procedure to obtain its NR-DCI. In the 1st step, the UE decodes all the RV0s blindly to search its NR-DCI. In the 2nd step it decodes RV0 and RV1 jointly. This is especially a good procedure to follow if the UE detects sufficient SINR operation conditions because the likelihood of detection is very high in the 1st step. Consequently the latency in FIG. 41 shows the URLL UE's procedure to obtain its NR-DCI. In the 1st step, the UE decodes all the RV0s blindly to search its NR-DCI. In the 2nd step it decodes RV0 and RV1 jointly. This may be especially a good procedure to follow if the UE detects sufficient SINR operation conditions because the likelihood of detection is very high in the 1st step. Consequently the latency in processing the NR-DCI can be minimized.

Figure 42:
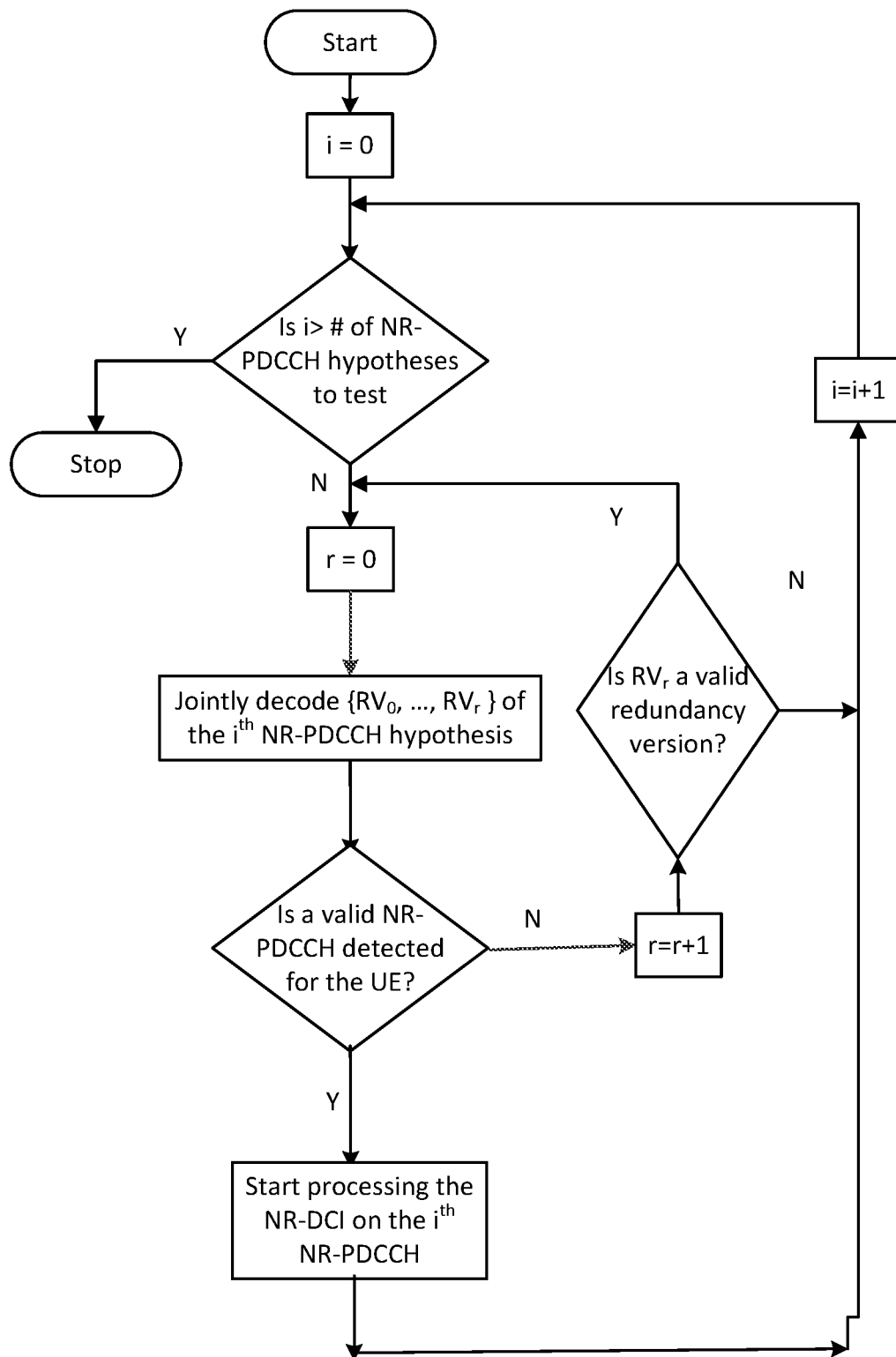
FIG. 42 shows an example of a URLL UE procedure for decoding NR-PDCCH by iterating through all RVs of a NR-PDCCH.
Figure 43:
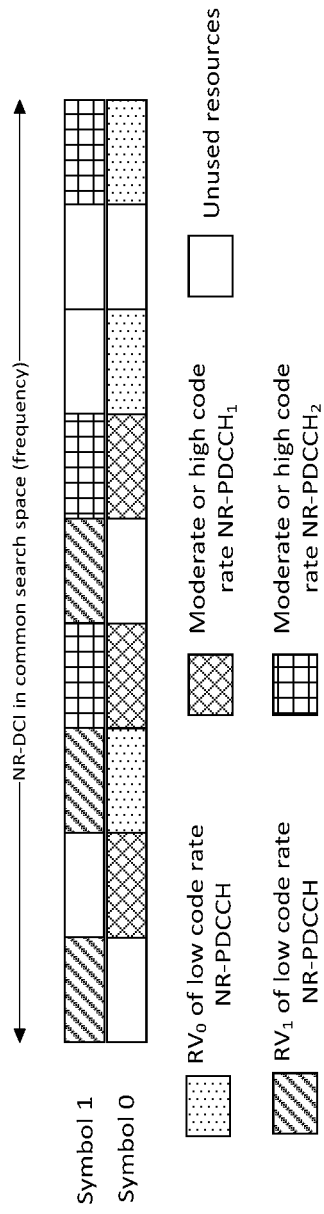
FIG. 43 shows an example of a low code rate NR-PDCCH split into RVs, using both time and frequency resources.

FIG. 42 shows an alternative procedure for the URLL UE to decode it NR-DCI. Here, the UE may decode $RV_0$ for an NR-DCI. If it fails, it decodes $RV_0$ and $RV_1$ together. Then it starts decoding the $RV_0$ of the next NR-DCI hypothesis. Thus, it iterates through all the redundancy versions for an NR-PDCCH before attempting to decode the next NR-PDCCH. FIG. 43 shows an example of a low code rate NR-PDCCH split into RVs, using both time and frequency resources.

Figure 44:
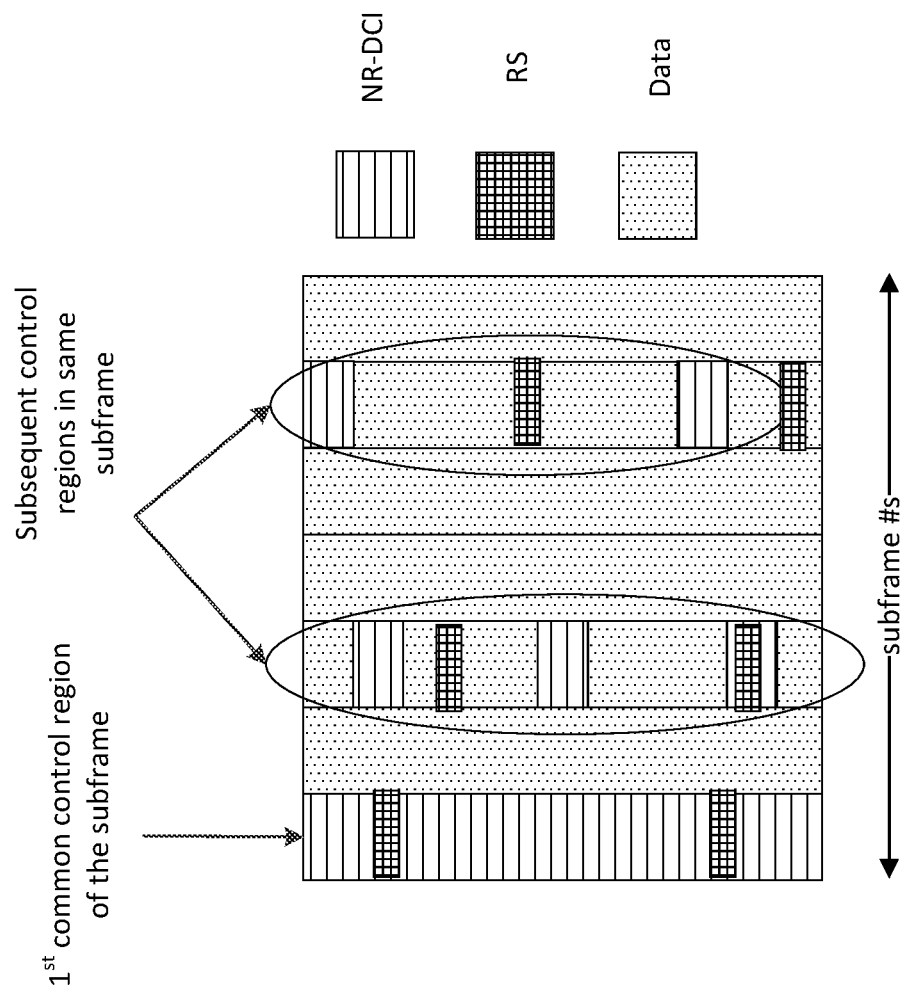
FIG. 44 shows an example of multiple DL control regions within a subframe.

In another example, both time and frequency demarcation is incorporated. FIG. 44 shows an example where the $RV_0$ and $RV_1$ occur in different symbols and different frequency locations. For these schemes transmitting the NR-PDCCH in multiple redundancy versions, we propose that the redundancy version patterns and resource allocation be predefined in the standard specification. The specific pattern used in a transmission may be configure in a UE semi-statically through RRC signaling and MAC CE updates.

Because URLL requires minimal latency and may require to use the leading symbols within certain transmission intervals, in some cases, we propose that MAC CEs that require high reliability have the flexibility to be transmitted in any of the symbols (unlike LTE where the CBs carrying the MAC CEs are mapped to the leading symbols). Further, multicast messages, such as paging and system information on NR-PDSCH, which are meant for both URLL and eMBB, may be encoded with rates suitable for higher reliability.

Turning now to dedicated control signaling for use case requiring increased reliability, the use cases may each have dedicated resources for control information signaling. For example, NR-PDCCH of URLL might not be multiplexed with those of eMBB.

Within a given use case, the NR-PDCCHs may be transmitted in a common search space and blindly decoded by a UEs to determine its DCI in a manner similar to decoding the PDCCHs in LTE. Alternatively the uNR-PDCCHs may be signaled to the UE in predefined locations in a manner similar to ePDCCH in LTE.

In both these scenarios the NR-PDCCH may be transmitted using multiple redundancy versions as described herein. Note that mMTC devices also benefit from having multiple redundancy versions for its NR-PDCCHs. For example, a UE can track its SNR and determine if it should decode one or more redundancy versions for achieving its target reliability and power consumption. If an mMTC device determines that it requires only 1 redundancy version, it only decodes $RV_0$ thereby conserving power.

Turning now to other solutions for control signaling, multiple control signaling regions may be present within a subframe in the DL as seen in FIG. 44, and each control region may have a different numerology. Each region may be blindly decoded by a UE to detect its NR-PDCCH.

Figure 46:
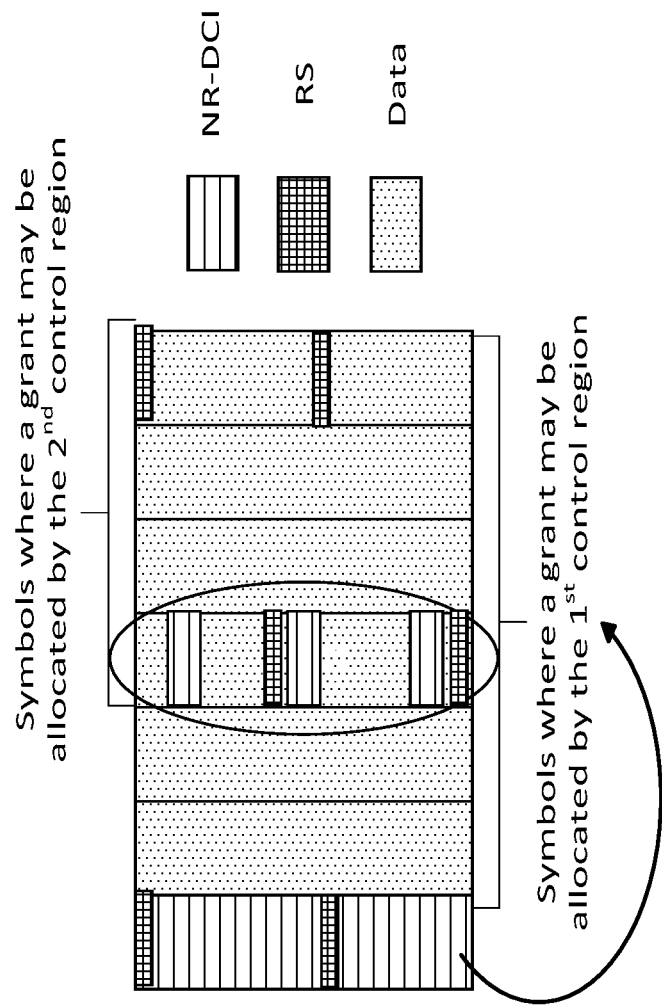
FIG. 46 shows an example of a control region that may not allocate a grant in symbols preceding it.

Each control region may provide grants that use resources in the same symbols as that control region and/or symbols following the control region as shown in FIG. 46. So a control region cannot provide a grant in resources preceding the control region in time. Also the NR-DCI(s) of a later control region may override the DCI(s) of an earlier control region if the DCIoverRideFlag is set TRUE, e.g. the MCS value, HARQ scheduling, power control, etc.

Figure 45:
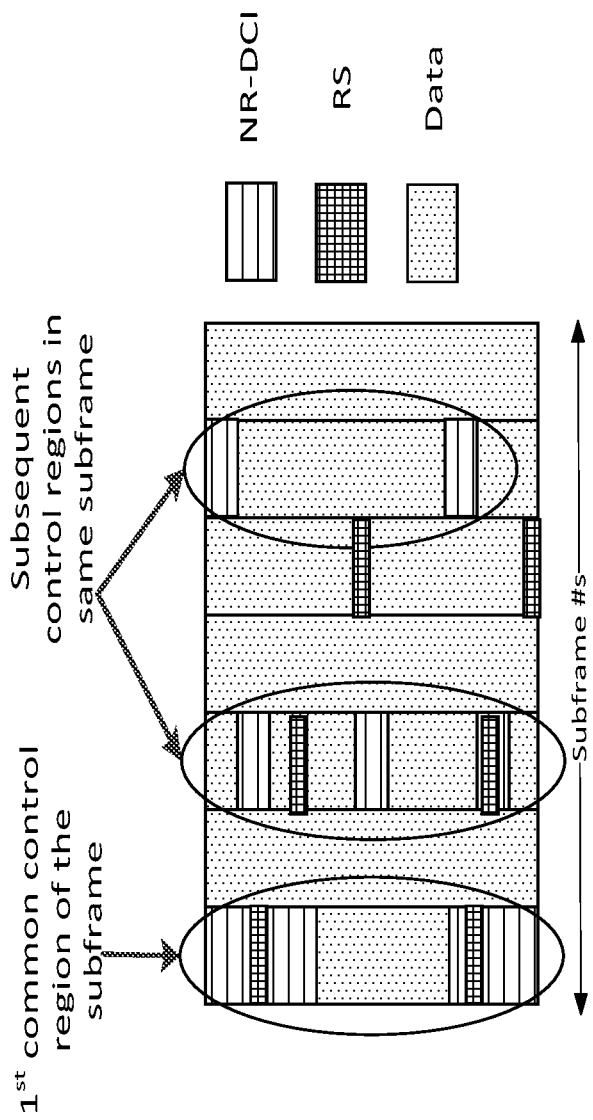
FIG. 45 shows an example of data and control regions multiplexed in the same symbol.
Figure 47:
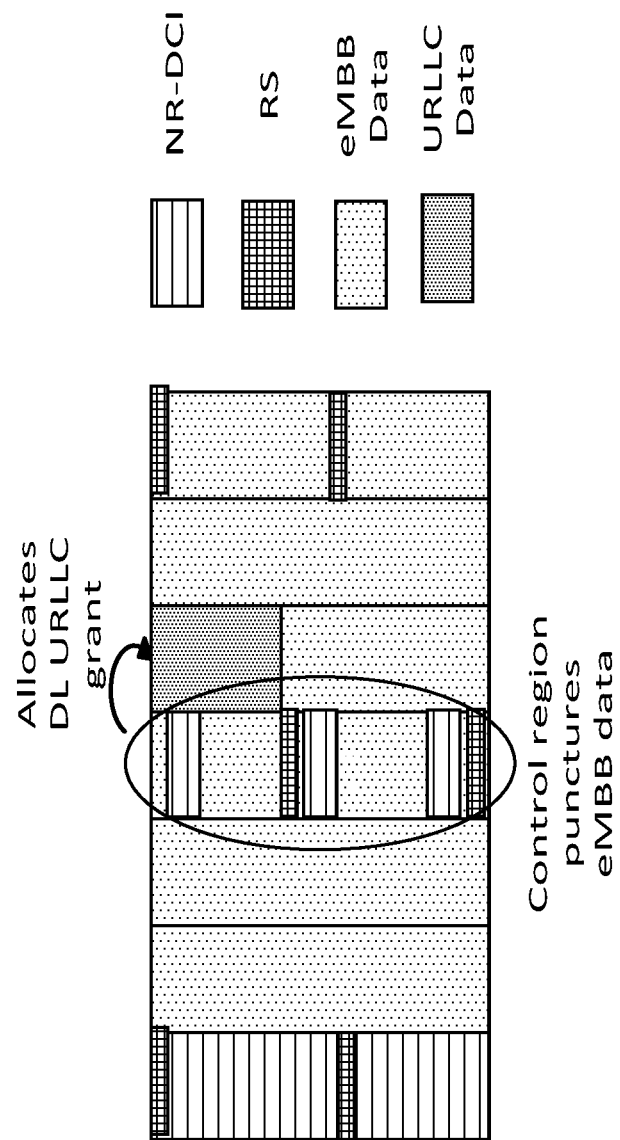
FIG. 47 shows an example in which the 2nd control region punctures eMBB data.

In general, the control region resources, RS and data resources may be multiplexed into a single symbol as shown in FIG. 45, where the first symbol of the subframe data, control and RSs are multiplexed together. Note that the subsequent control regions may puncture a data region. For example, a control region requiring limited resources may make a URLL grant in a subsequent symbol of the subframe—here the corresponding control region punctures the eMBB data as shown in FIG. 47. Note that the URLLC data may puncture the eMBB data.

Figure 48:
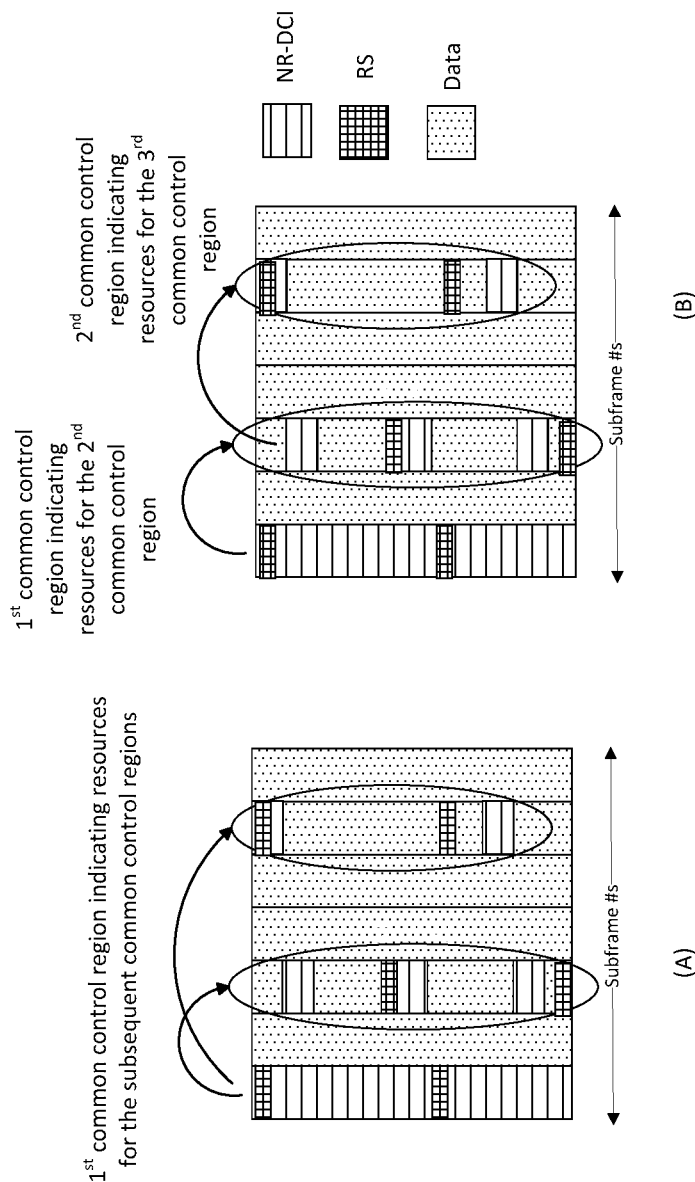
FIG. 48 shows an example of subsequent control regions being indicated by former control regions in a subframe.

In some cases, the control resources may be dynamically allocated. The 1st common control region may indicate the presence and resources of one or more subsequent control regions in the subframe. We also propose, in accordance with an example embodiment, that the Nth control region in a subframe may be indicated by any one of 1 through N−1 control regions. FIG. 48A shows an example where the 1st control regions indicate information about the 2nd and 3rd control regions in the subframe. FIG. 48B shows an example where the 2nd control regions indicate information about the 3rd control region in the subframe.

The information indicating the resources for each control region may include one or more of the following, presented by way of example and without limitation: number of control regions configured; numerology of each control region; resources of each control region (in terms of PRBS/symbols/REs); and beam index of each control region.

Figure 49:
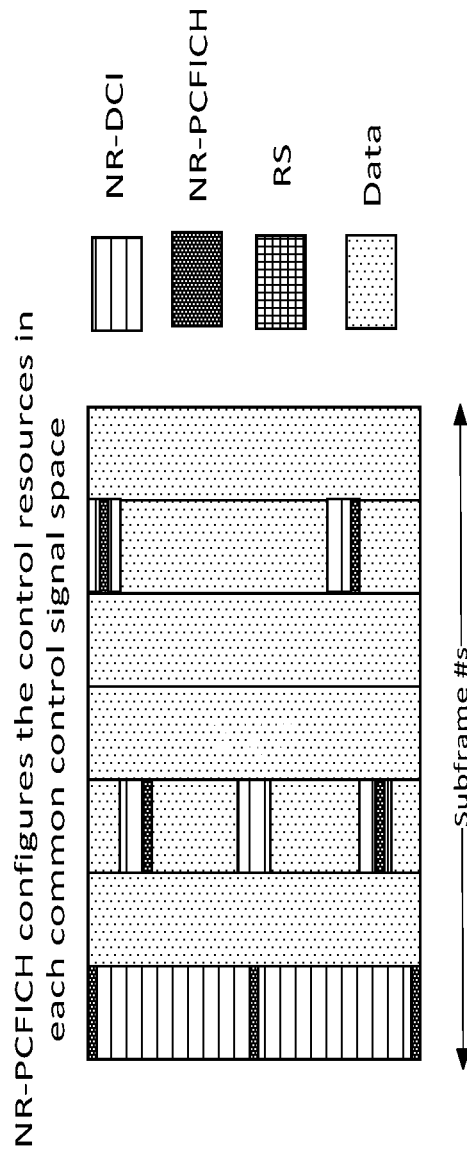
FIG. 49 shows an example of NR-PCFICH configuring the control regions in a subframe.

Alternatively, when control resources are dynamically allocated, each control region may have a corresponding NR-PCFICH (similar to the PCFICH in LTE) to indicate the presence and resources of the control regions. FIG. 49 shows an example where there are three common search space control regions and each is configured by its own NR-PCFICH occurring in the same symbol as the control region. Resources for each NR-PCFICH may be predefined in the standard specification or indicated through the system information. The UE may decode the NR-PCFICH—if successful, it will locate the control region. If no NR-PCFICH and corresponding control region need to be sent, those resources can carry data.

A single NR-PCFICH may indicate the resources for multiple control regions in the subframe. The information in an NR-PCFICH may include one or more of the following, presented by way of example and without limitation: number of control regions configured; numerology of each control region; resources of each control region (in terms of PRBS/symbols/REs); beam index of each control region.

Alternatively, the number of control regions may be configured semi-statically through system information. The actual resources and numerology may be configured through NR-PCFICH or the 1st control region as described above.

Figure 50:
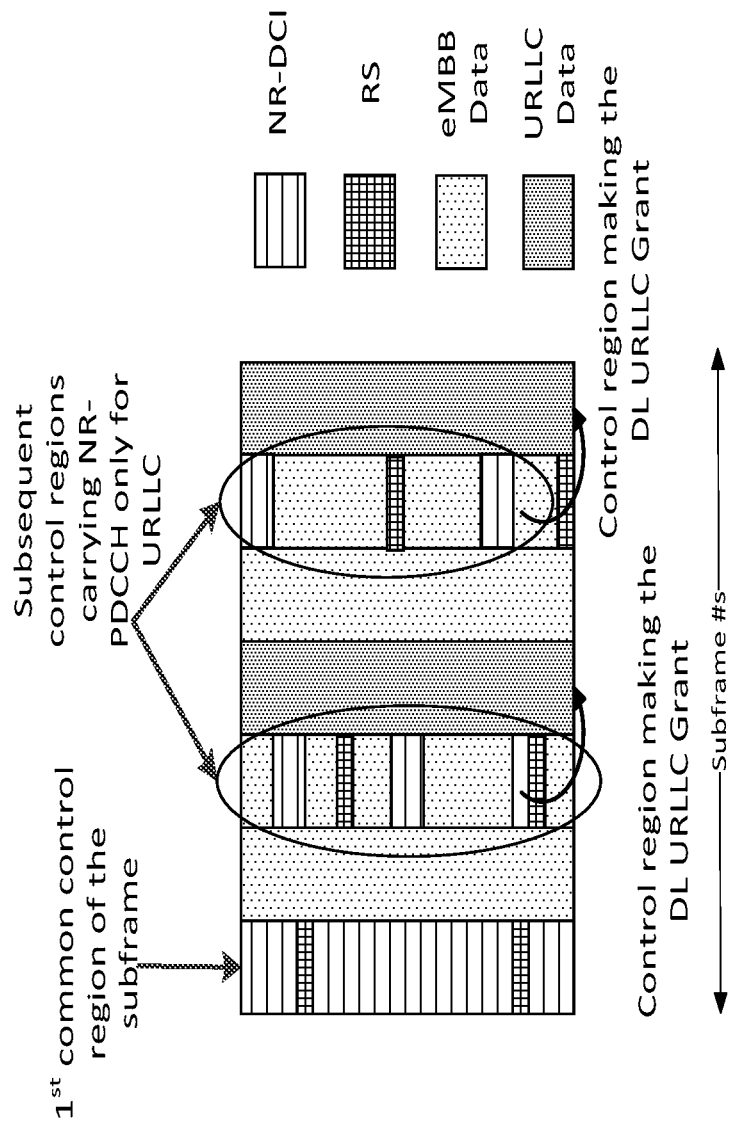
FIG. 50 shows an example of multiple DL control regions, where 2nd and 3rd control regions are for URLLC only.

In an example, the subsequent control regions may be used for, for instance only for, carrying specific types of control information such as DL and UL grants in order to facilitate low latency applications. Or they may also be configured to carry NR-PDCCH of certain use cases such as URLLC only so that eMBB devices may power down during a subframe if it does not find a grant in the 1st control region. In this example, the subsequent control regions resources may be predefined or configured semi-statically or dynamically but only URLLC UEs are required to decode those control regions. FIG. 50 shows a case where the first control region may carry NR_DCI for both eMBB and URLLC but the subsequent control regions in the subframe carry only NR-PDCCH for URLLC UEs.

Figure 51:
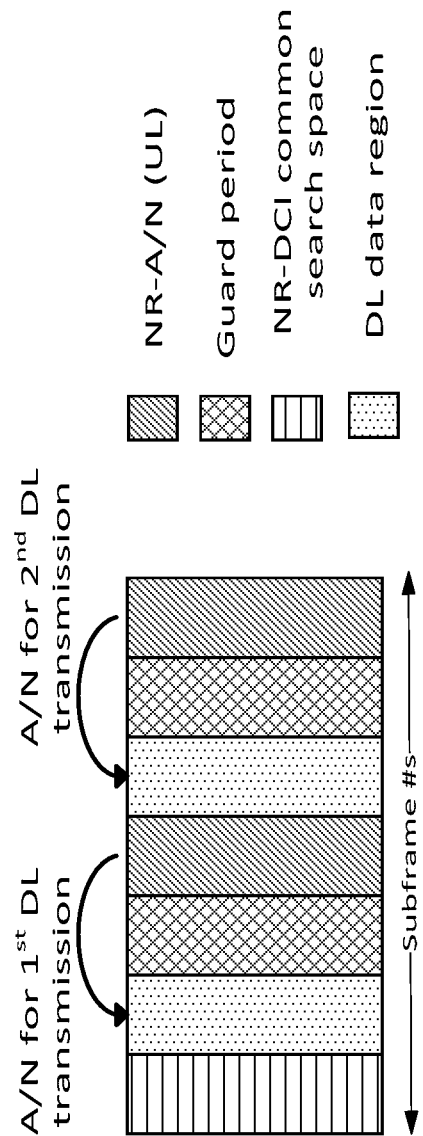
FIG. 51 shows an example of multiple UL control regions being configured within a subframe.

In another example, more than 1 UL control region may be configured in a subframe for example for carrying A/N corresponding to multiple DL transmissions within a subframe as seen in FIG. 51.

Figure 52:
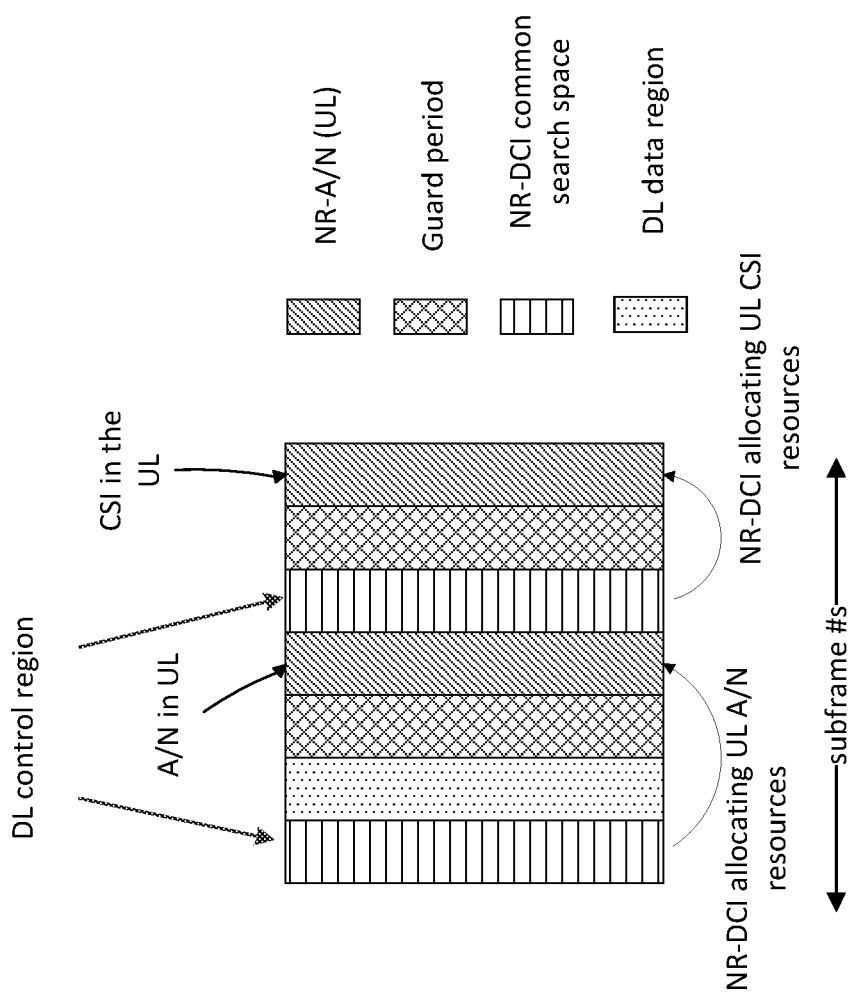
FIG. 52 shows an example of multiple DL control regions configuring UL control regions in a subframe.

Multiple DL control regions may provide for multiple UL transmission resources as shown in FIG. 52.

Figure 53:
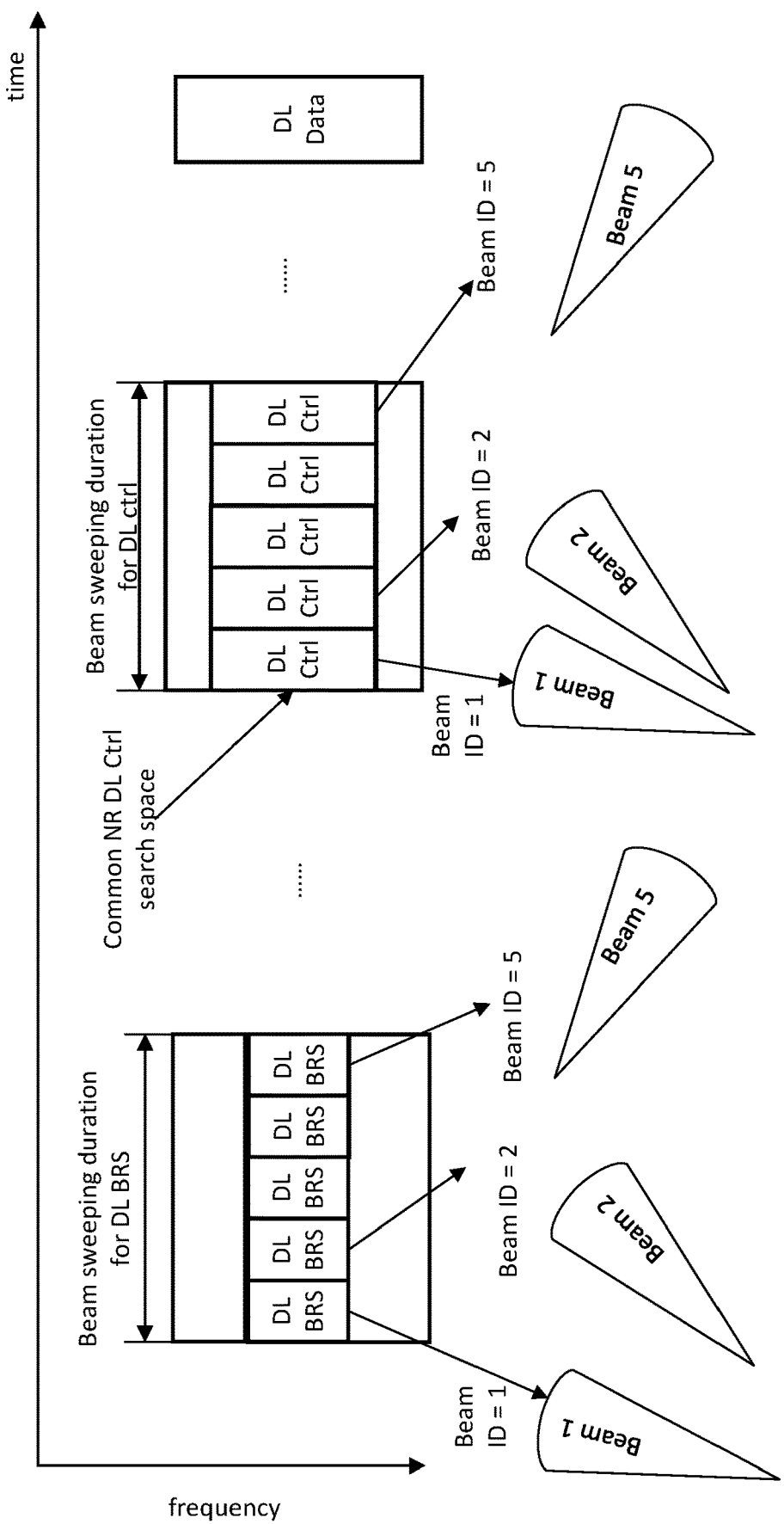
FIG. 53 shows an example of a NR DL control search space with beam sweeping.

Turning now to a Beamformed NR DL Control Channel, an NR DL control channel can be applied with beamforming. In the initial access stage, the resource allocation for beam sweeping subframes can be predetermined with fixed or pre-determined resources for synchronization channel, beam sweeping RS and primary broadcast channels. In this way, UE can find the best Tx beams during the Tx beam sweeping. In case of common NR DL control being needed, NR-node TX-beam sweeping based transmission can be used for supporting same coverage with the synchronization channel, beam sweeping RS and primary broadcast channels. Those common NR DL control channel search space can be applied with the same beams used in the beam sweeping for synchronization channel, beam sweeping RS and primary broadcast channels. Referring to FIG. 53, it shows the common NR DL control share the same beams setup as DL beam sweeping RS. The beam sweeping RS can be used for demodulation of common NR DL control channels.

Figure 54:
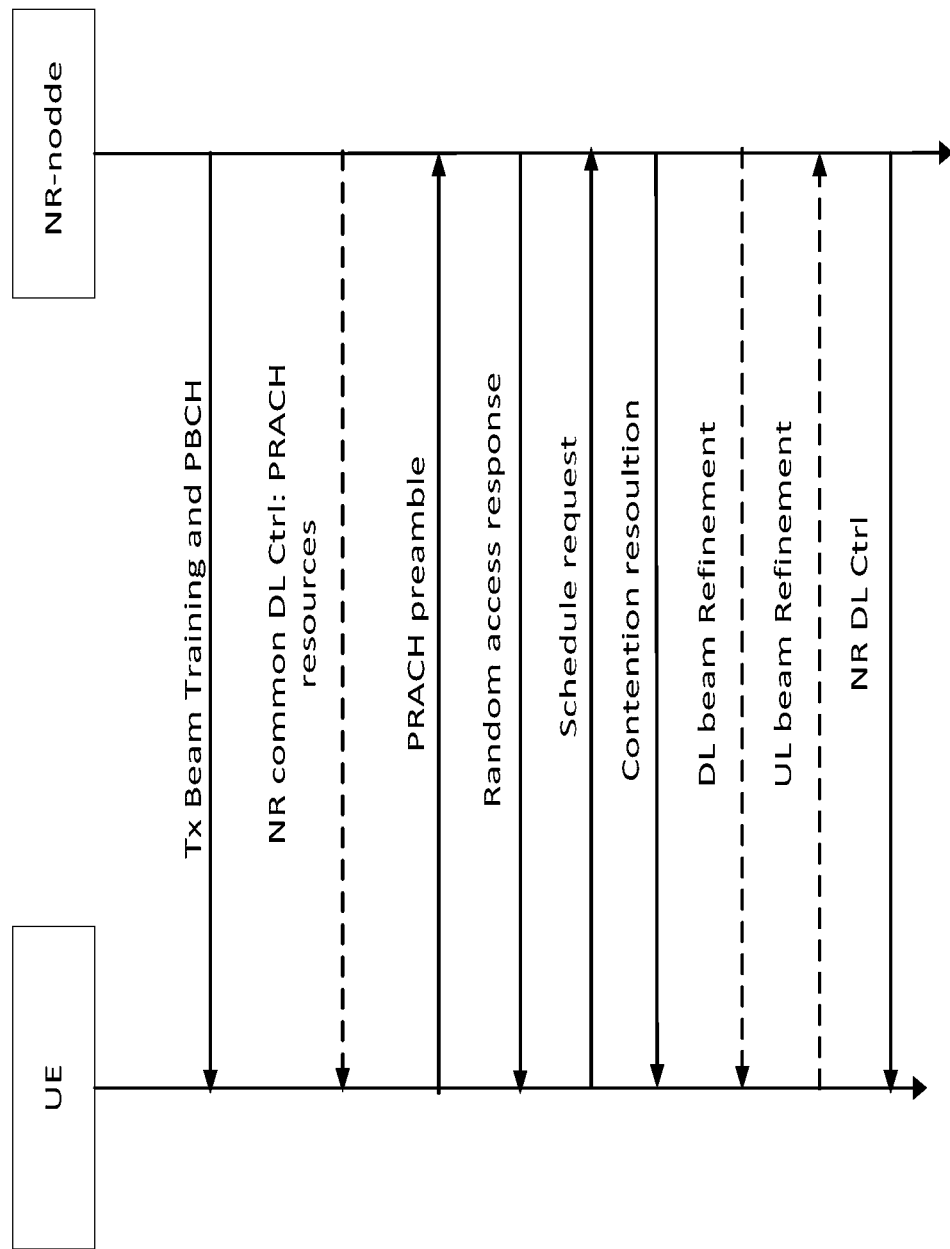
FIG. 54 shows an example of a UE procedure for NR DL control channel.

In an example, another on-demand beam formed NR DL control channel (UE-specific) can use the best Tx beams agreed in the initial access, or the beam refinement stage. By way of example, the PRACH preamble resource (grids, preamble ID and length) can be indicated by the detected best Tx beams/beam IDs transmitting from a single or multiple TR-nodes. If there is transmitting common DL control then it may provide PRACH resource information for UL PRACH preamble transmission either with best beam or UL beam sweeping operation. If there is no common DL control information then UE may still be able to derive the PRACH resources from the detected beam information. Since the allocated PRACH resource can be used as an implicit indication of the best transmit direction beam. A NR-node can detect the beam formed PRACH preamble indicated by the pre-allocated PRACH resource. Therefore, NR node can use this beamforming information for transmitting the random access response (RAR). Once the UE detect random access response, UE can form the received beamforming for the reception of the NR DL control channel. If there is a beam refinement procedure being performed before the transmission of the (US-specific) NR DL control channel then the UE can use the refinement beams for NR DL control reception. An example UE procedure for beam formed DL control channel is depicted in FIG. 54. In FIG. 54, the dash-line can be treated as an optional procedure. For example, if there is no common NR DL control channel available then the UE is still able to derive the PRACH resources from the beam training stages.

The 3GPP specification supports transmission of NR-DCI on multiple beams to improve coverage and reliability. Note that LTE supported only broadcast of the PDCCH. The beams may sweep through different spatial locations carrying NR-DCI as shown in FIG. 55.

Figure 55:
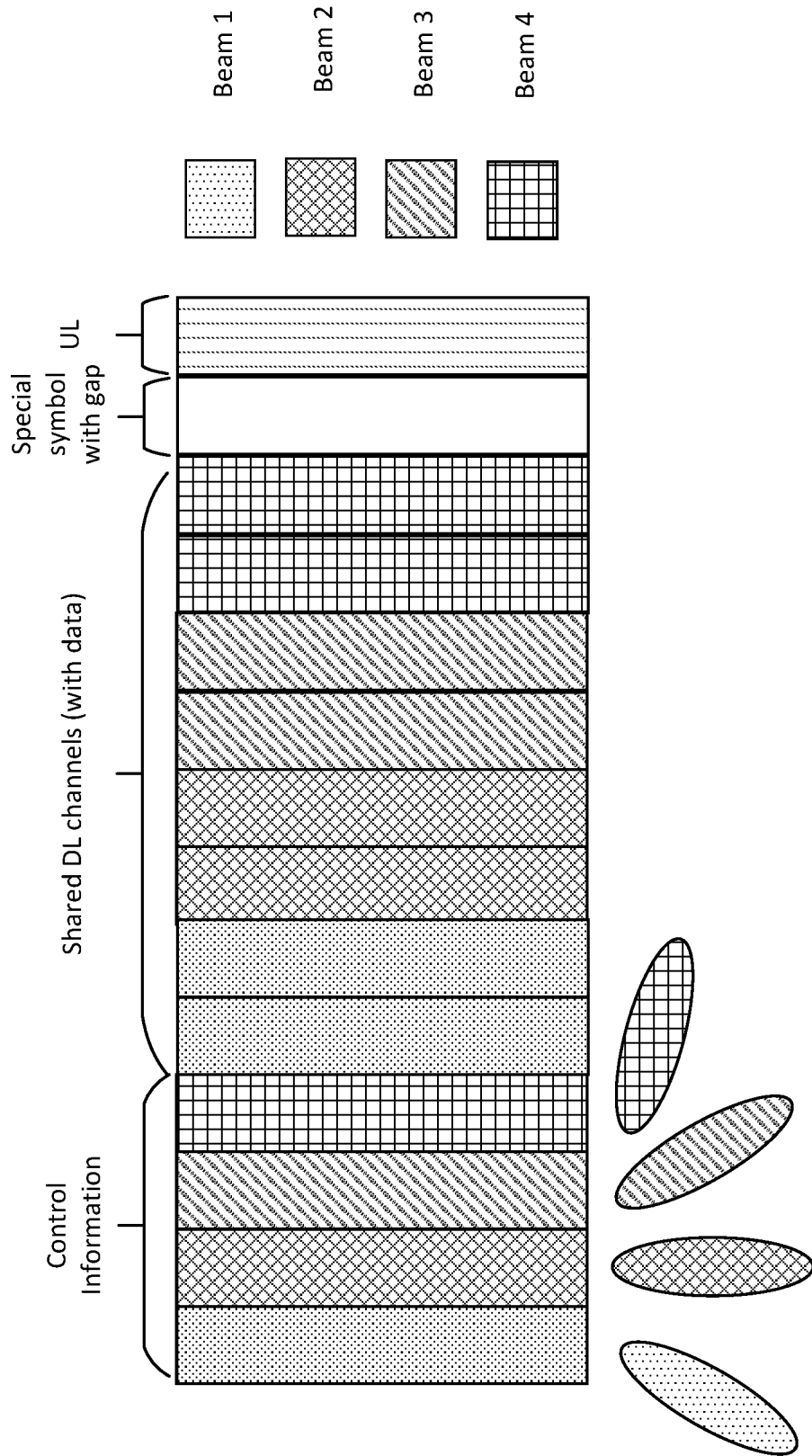
FIG. 55 is a diagram that illustrates control information transmitted on beams followed by shared channel transmission.

In this proposal note that the beams carrying control region sweep through the space before the UL/DL grant resources are made available as shown in FIG. 55. Here the DL grant is available N symbols after the control signaling. The advantage of this scheme is that latency is less in decoding important control signaling related to paging, RACH, etc.

Figures 56A, 56B:
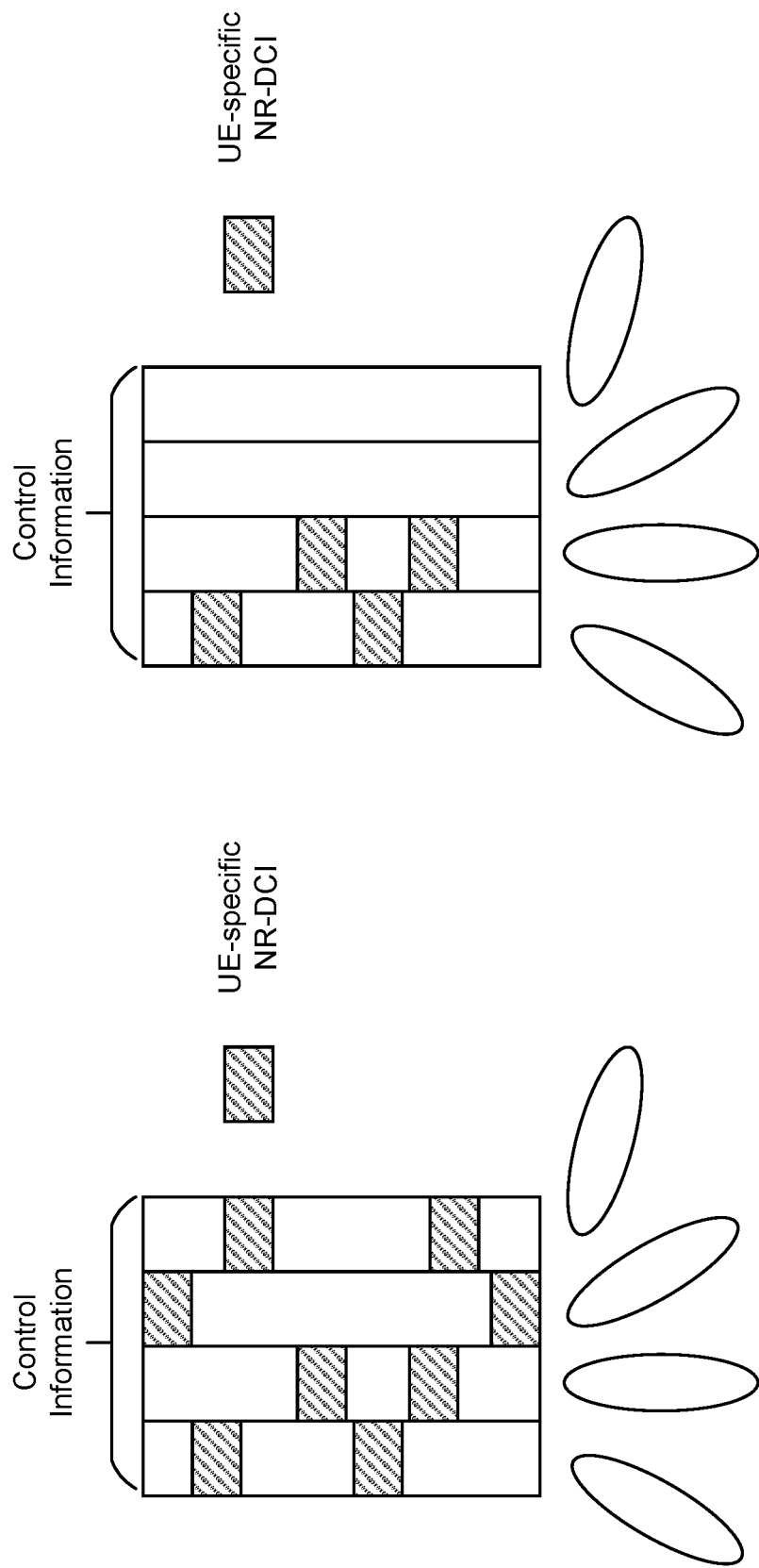
FIG. 56A and FIG. 56B are diagrams that illustrate some NR-DCI which may be repeated on the beams.

If the UE location is known a-priori, its UE-specific NR-DCI be transmitted only in a subset of the beams. But if the UE location is not known to the NR-Node, its NR-DCI may be transmitted in every beam. This concept in illustrated in FIG. 56 where the control region is swept by 4 beams covering symbol per beam. A UE-specific NR-DCI is repeated in all the beams in FIG. 56A but transmitted only in beams 1 and 2 in FIG. 56B. Note that the NR-DCI may be located in different subcarriers in different beams.

Similarly, NR-DCI for common control signaling may be carried in every beam. The common control search space uses the same subcarriers in all the beams carrying the control information—minimizes the overhead to indicate different common control signaling resources for each beam.

Figure 57:
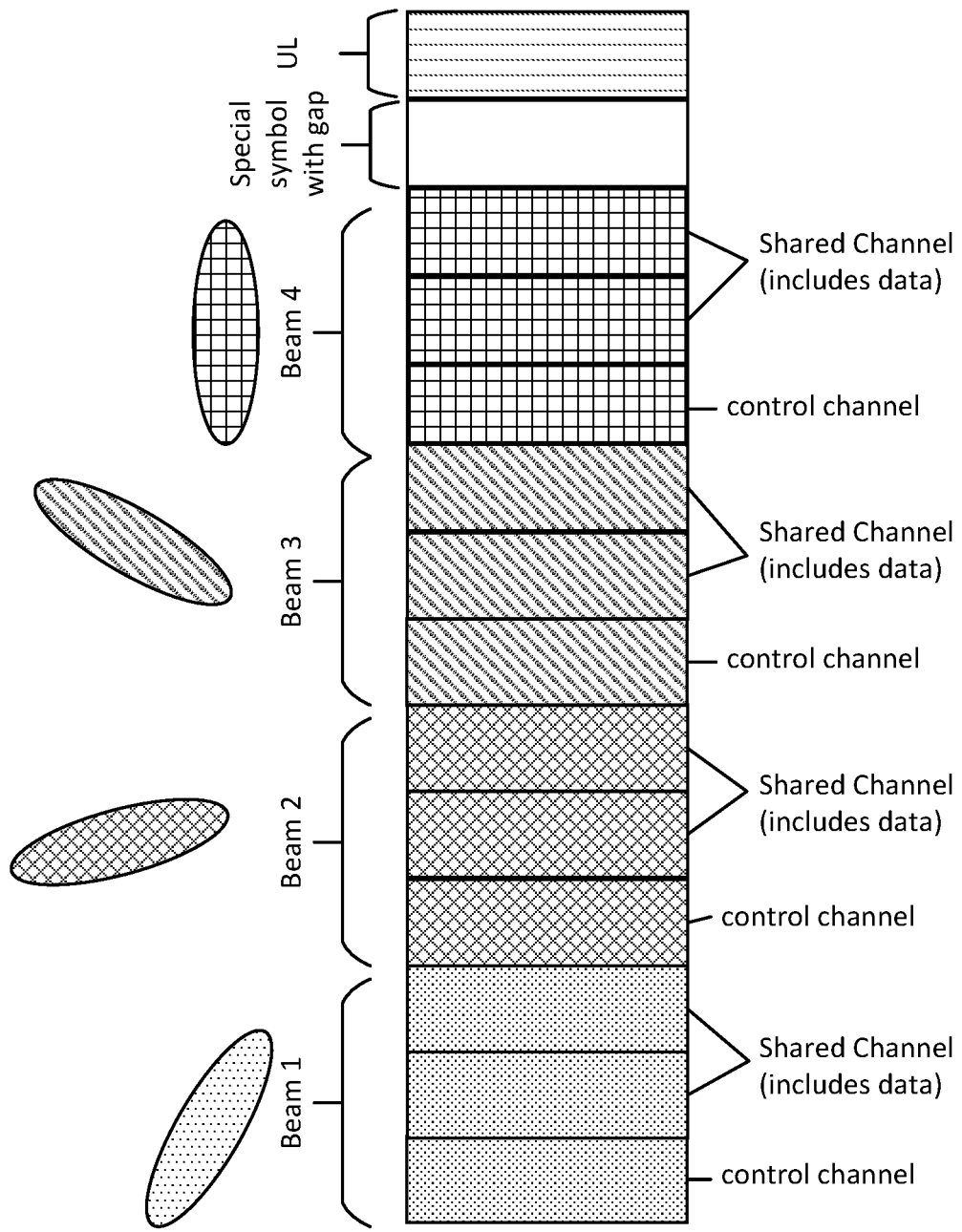
FIG. 57 is a diagram that illustrates an example scenario where each beam in the control region is followed by a shared channel transmission.

In another scheme, each beam may carry multiple symbols including control and data as shown in FIG. 57 where the NR-DCI in the beam may allocate resources for an UL and/or DL grant in the same beam. The advantage of this scheme is that the latency between the control and data is minimal.

Note that in general, for the schemes described above, control and data transmission could occur in different beams—for example, beams for control signaling may be wider than those for data signaling.

Certain types of NR-DCI such as common control signals may be transmitted for beam-wide reception. The NR-DCI can leverage the beam-RS which is intended for identifying a beam and for measurements of a beam for also estimating the channel.

If NR-DCI is transmitted through multiple ports (as in transmit diversity) a new form of "Control-RS" with appropriate density may be introduced to aid channel estimation of NR-DCI. This control-RS would be transmitted for each port that is supported for NR-DCI transmission. This control-RS may be cell/beam specific and its location and resources may depend on one or more of cell ID or beam ID, for example.

The control-RS may be transmitted to cover channel estimation for the entire frequency range of the DCI symbols or may be transmitted in a limited region where DCIs transmitted with those ports are mapped in frequency.

Figure 58:
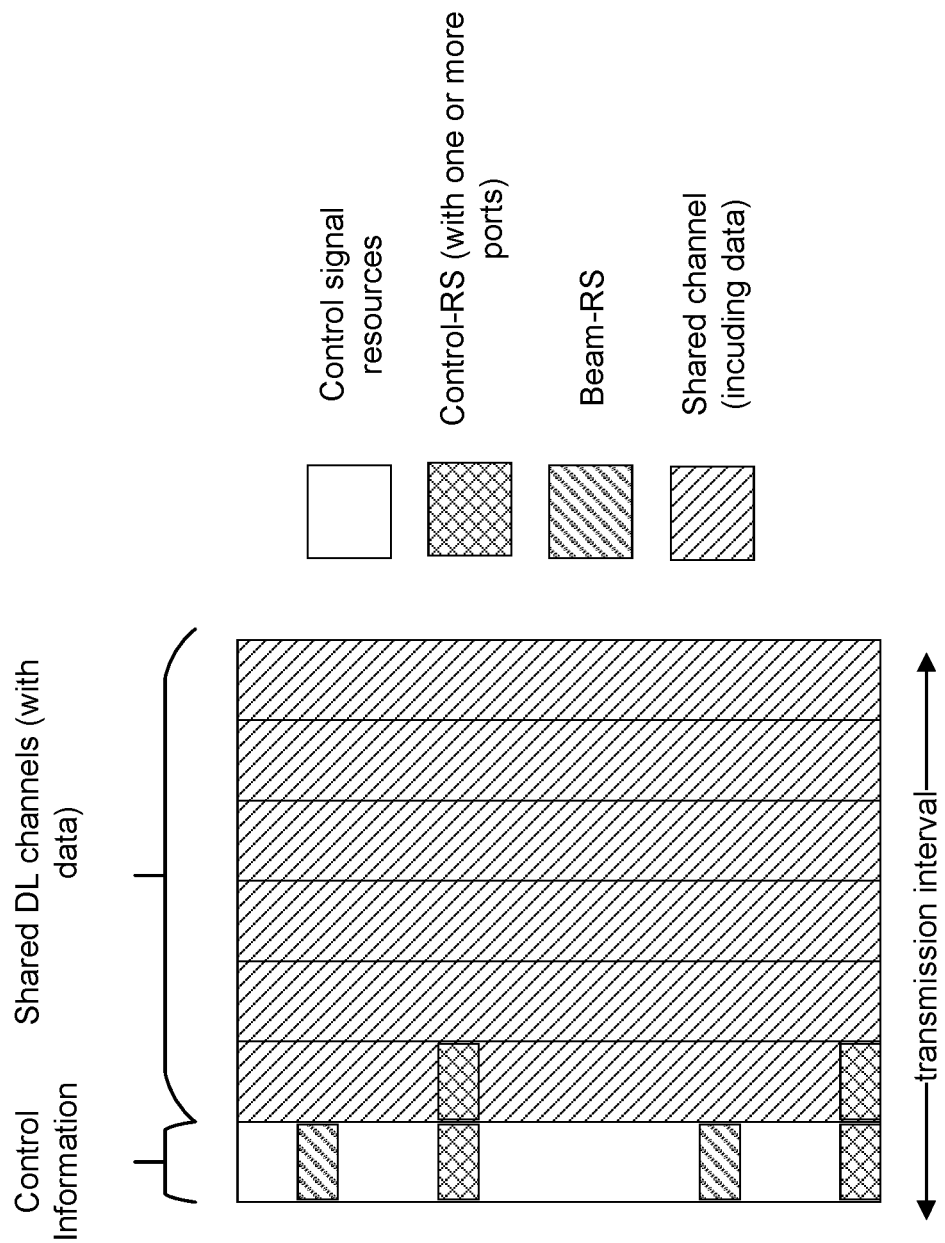
FIG. 58 is a diagram that illustrates an example scenario where a control RS or beam RS may be used to estimate the channel.

FIG. 58 illustrates the beam-RS and control-RS ports. The control-RS may be defined for more than 1 port. The resources for multiple ports may be defined with orthogonal covering codes similar to the OCCs for DMRS ports in LTE.

Certain types of NR-DCI, especially UE-specific signals may be pre-coded to improve spatial separation and coverage. For such use cases, "control-DMRS" may be introduced to aid in channel estimation.

Figure 59:
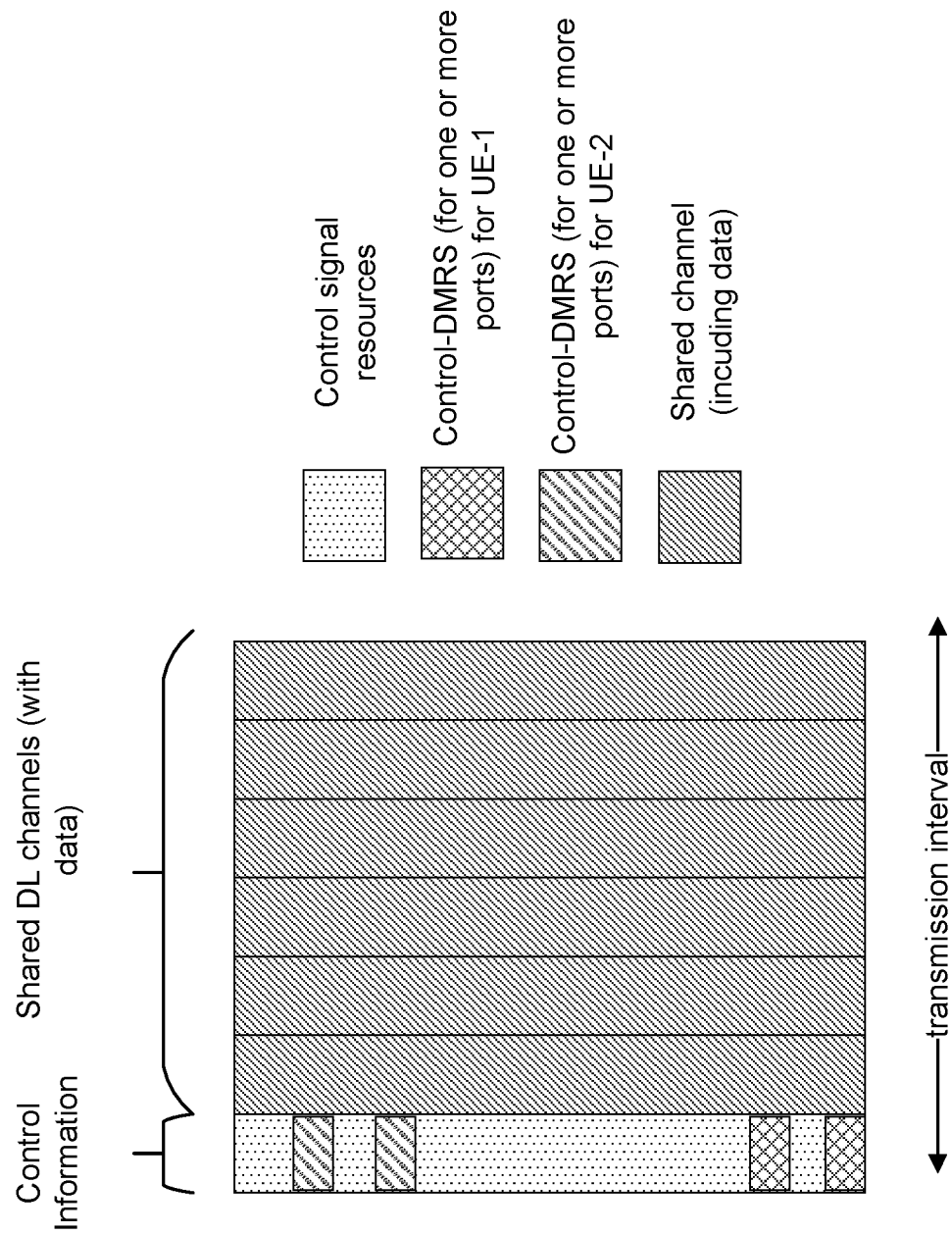
FIG. 59 is a diagram that illustrates an example scenario where a control DMRS is used in UE-specific manner to decode the NR-DCI.

FIG. 59 shows a Control DMRS used in UE-specific manner to decode the NR-DCI.

The NR-DCI may be transmitted on multiple ports (transmit diversity or beamforming) and correspondingly the control-DMRS would be pre-coded similar to the pre-coded NR-DCI and will be supported on the ports used for data transmission.

If the data and control are transmitted on the same beam, they may share the control-RS or control-DMRS resources.

Figure 60:
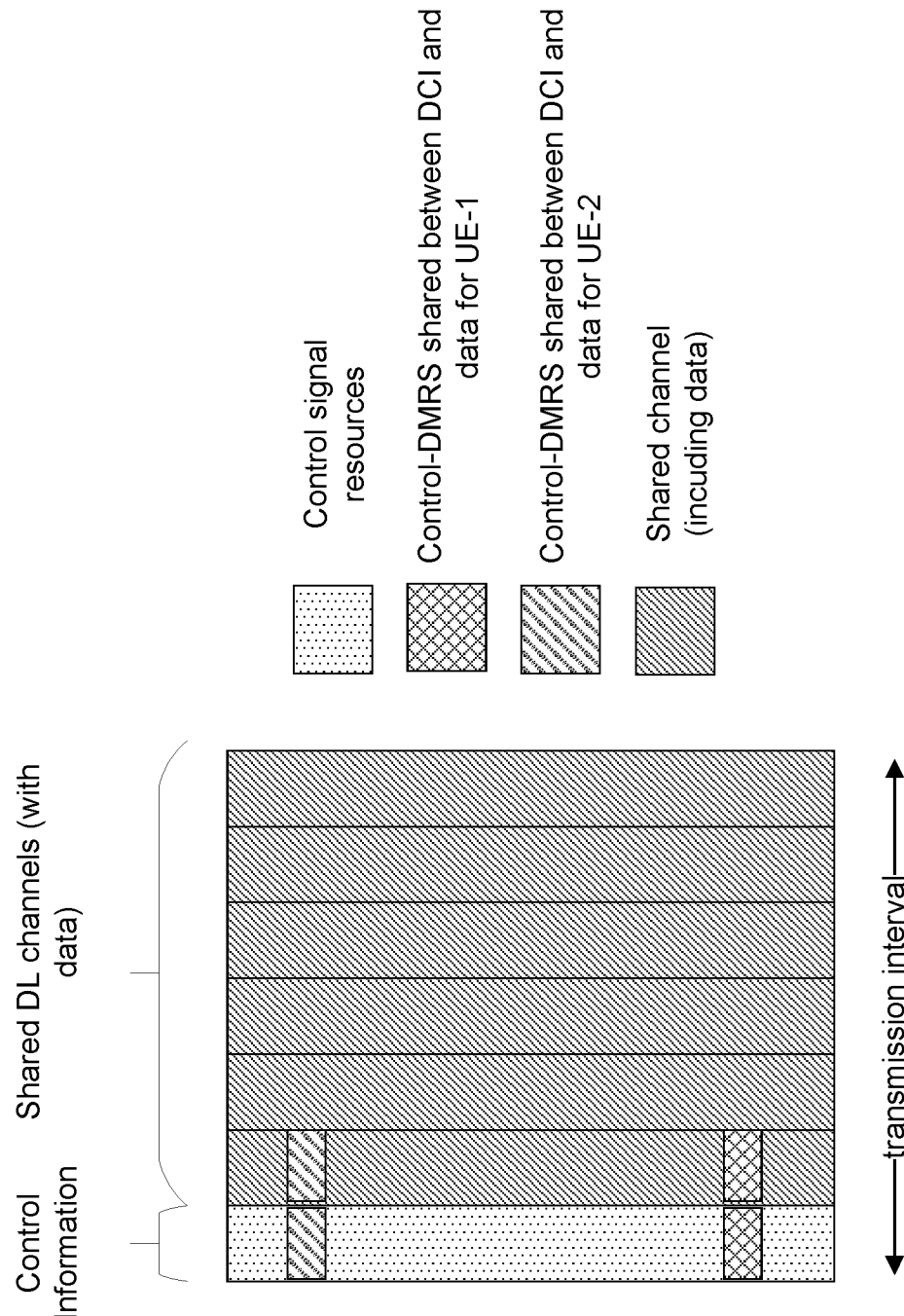
FIG. 60 is a diagram that illustrates an example scenario where a control DMRS shared between control and data region if they are pre-coded in the same way.

FIG. 60 shows control DMRS shared between control and data region if they are pre-coded in the same way.

The beam-RS, control-RS and control-DMRS can be located in close proximity to the control region to provide high control channel reliability.

The NR-DCI may use a fixed number of control signals or fixed duration for control signaling in every transmission interval (which could be a slot or mini-slot or subframe). For such a design, NR does not need to transmit a PCFICH-like channel as the control signaling resource is fixed. The control signaling resource may be indicated through critical system information such as the MIB or SIB1/SIB2 or may be set to fixed values in the standard specificatino.

Figure 61:
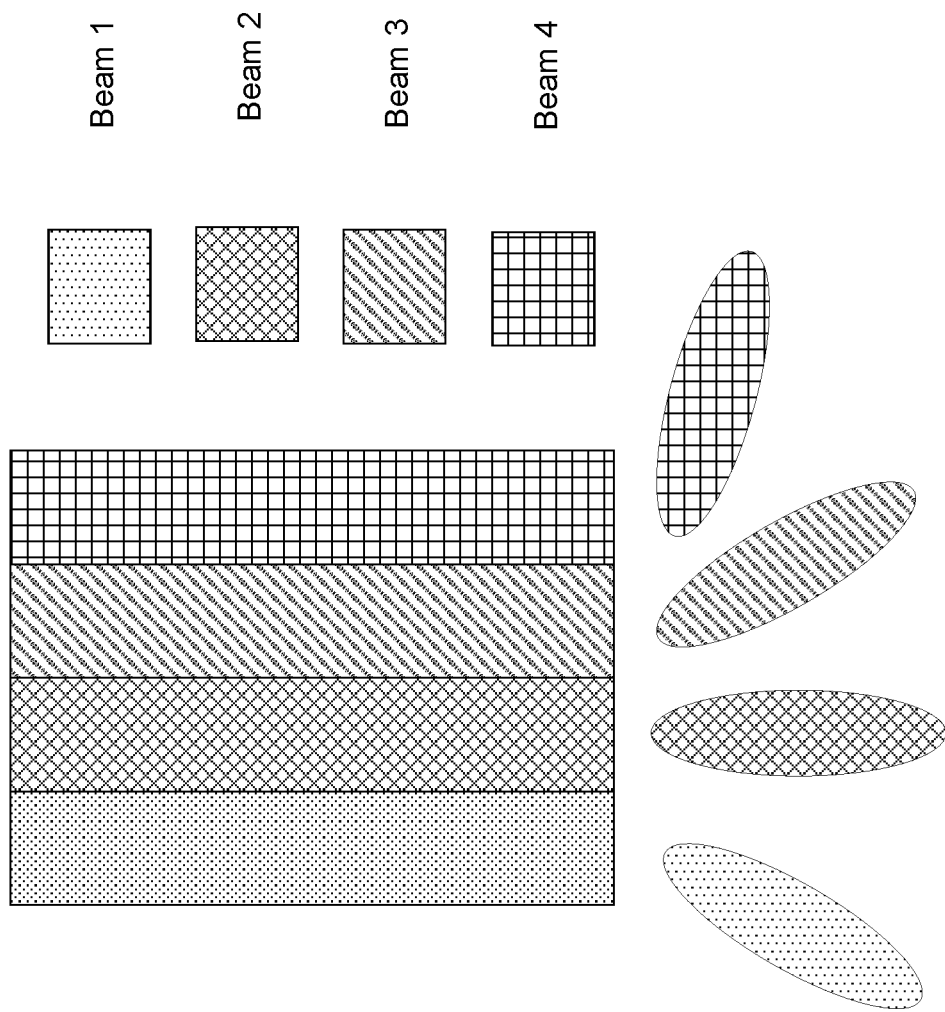
FIG. 61 is a diagram that illustrates an example scenario where a beam sweeping through control symbols of same numerology.
Figure 62:
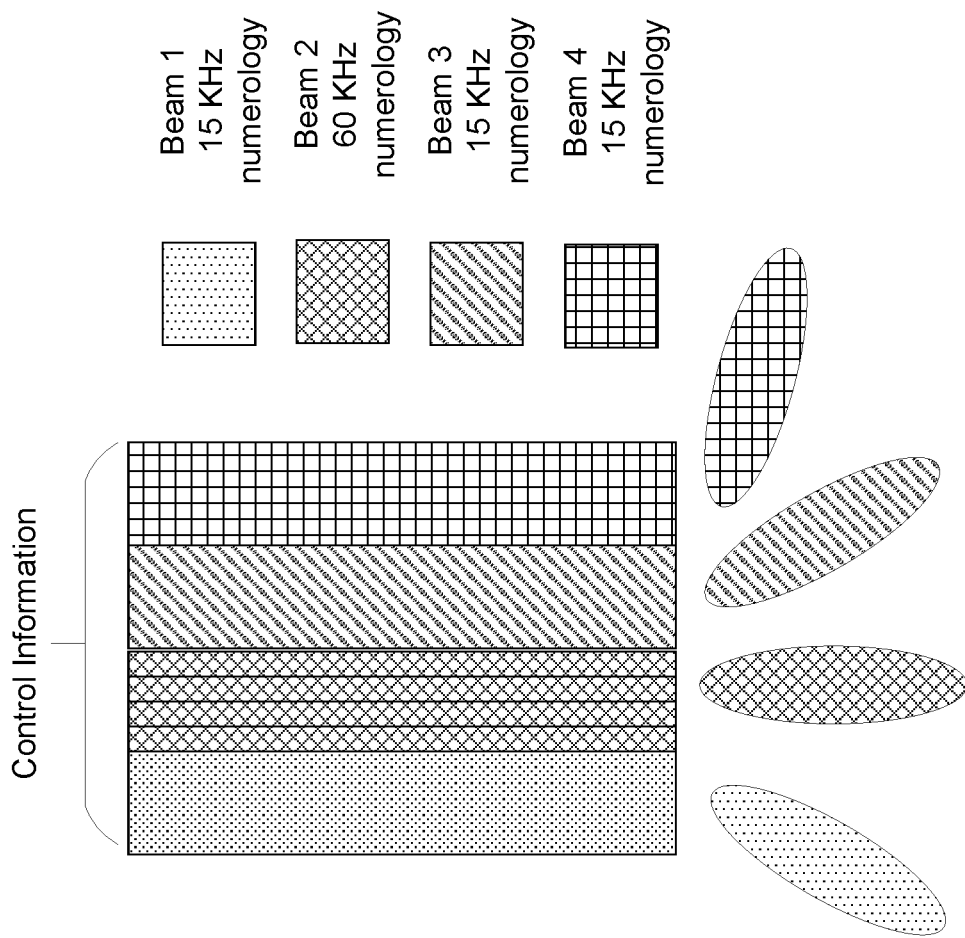
FIG. 62 is a diagram that illustrates an example scenario where a beam sweeping through control signals of different numerologies.

FIG. 61 shows an example where the number of control signals is the same in every transmission interval. FIG. 62 shows an example where the duration of the control signaling is the same for all numerologies multiplexed in FDM/TDM in the resource grid. So a transmission interval using 60 KHz subcarrier spacing uses 4 symbols for control signaling whereas a transmission interval operating at 15 KHz uses 1 symbol for control signaling within that transmission interval. This solution ensures that the beams sweeps in every direction for the same period of time.

Alternatively the specification may specify the number of symbols for each numerology. The number of symbols may depend on one or more of: center frequency; bandwidth; and number of beams supported.

NR has support for large bandwidths exceeding 80 MHz. If a UE is required to blindly decode the NR-DCI across the entire bandwidth it will experience significant latency and battery drain. So NR must allow transmission of the NR-DCI to a UE in specific sub-bands—the UE must be configured to have knowledge of the resources of these sub-bands.

Figure 63:
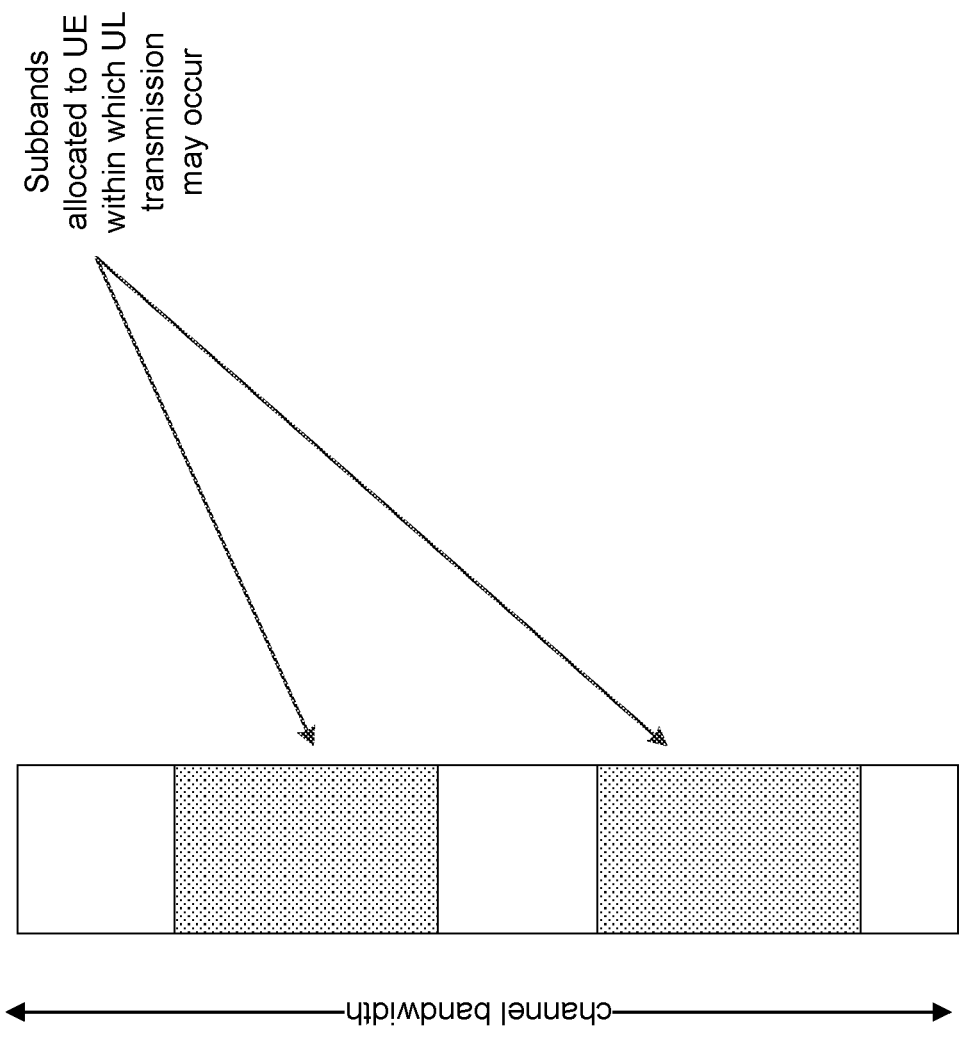
FIG. 63 is a diagram that illustrates an example scenario where a sub-band allocation to a UE to limit the search space for control signaling.

The UE-specific NR-DCI may be indicated within a limited number of resources (sub-bands) which are known a priori at the UE. The sub-bands may be configured semi-statically through RRC and MAC CE updates. FIG. 63 shows an example where the NR-DCI is carried in UE-specific sub-bands. The sub-bands may be allocated based on UE capabilities, i.e. the UE may inform the network about the maximum bandwidth that it can process at a time. Note that the sub-bands allocated to a UE need not be contiguous in frequency.

The search space for common control signaling may carry NR-DCI such as those for paging, RACH response, etc., and may be limited to specific sub-bands so that UEs do not have to blindly decode all the resources in the common control signaling search space.

Figure 64:
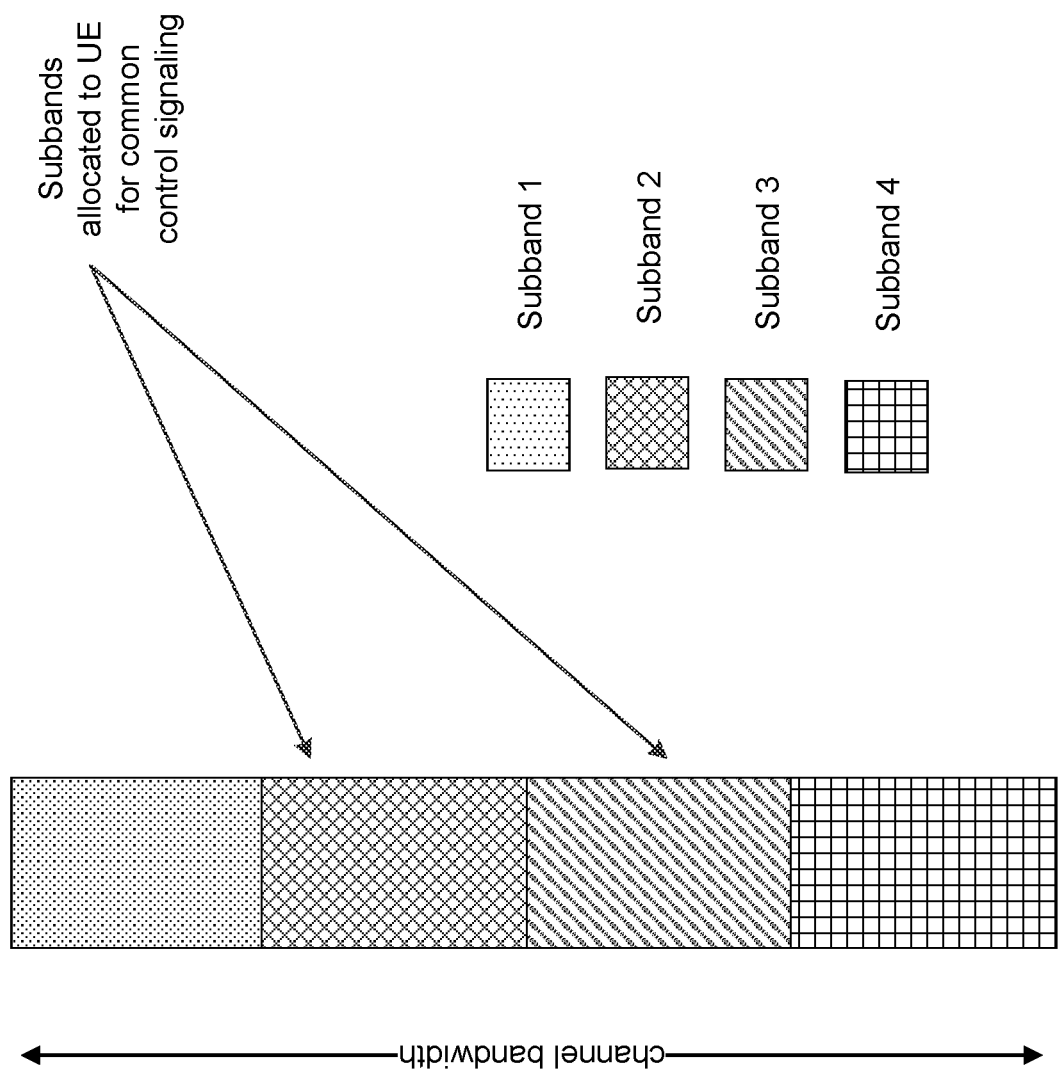
FIG. 64 is a diagram that illustrates an example scenario where sub-band allocation to common control signaling.

The common control signaling search space may be partitioned into multiple search spaces and UE may be assigned to search for the common NR-DCI only within a subset of those search spaces. FIG. 64 shows an example where the common signaling search space is partitioned into 4 search spaces and a UE is configured to search for its common NR-DCI only within 2 of those spaces.

Figure 65:
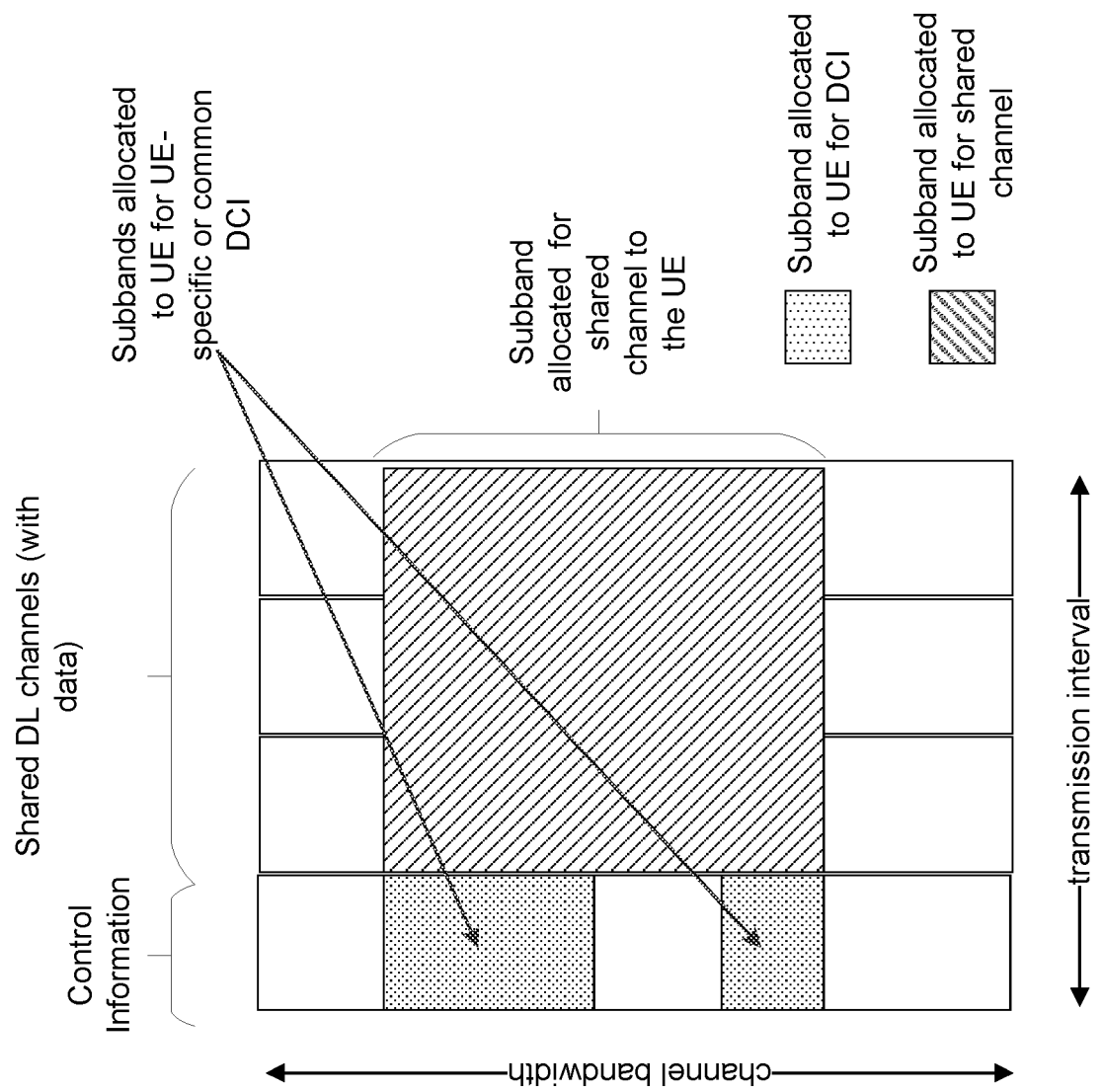
FIG. 65 is a diagram that illustrates an example scenario where a sub-band operation for shared channel.

Similar to the solution described above for sub-band operation for UE-specific and common NR-DCI, Physical DL shared channel (NR-PDSCH) carrying the data may also be restricted to sub-bands. This limits the number of times the UE's front end has to be re-tuned to a new frequency for reception. The sub-bands for NR-PDSCH may be semi-statically configured through RRC and MAC CE updates. FIG. 65 shows an example where the NR-PDSCH for a UE is transmitted over preconfigured sub-bands; so the UE is tuned to perform reception of data only over the range of frequencies covering the sub-bands.

The 3rd Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), and LTE-Advanced standards. 3GPP has begun working on the standardization of next generation cellular technology, called New Radio (NR), which is also referred to as "5G". 3GPP NR standards development is expected to include the definition of next generation radio access technology (new RAT), which is expected to include the provision of new flexible radio access below 6 GHz, and the provision of new ultra-mobile broadband radio access above 6 GHz. The flexible radio access is expected to consist of a new, non-backwards compatible radio access in new spectrum below 6 GHz, and it is expected to include different operating modes that can be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 6 GHz, with cmWave and mmWave specific design optimizations.

3GPP has identified a variety of use cases that NR is expected to support, resulting in a wide variety of user experience requirements for data rate, latency, and mobility.

The use cases include the following general categories: enhanced mobile broadband (e.g., broadband access in dense areas, indoor ultra-high broadband access, broadband access in a crowd, 50+ Mbps everywhere, ultra-low cost broadband access, mobile broadband in vehicles), critical communications, massive machine type communications, network operation (e.g., network slicing, routing, migration and interworking, energy savings), and enhanced vehicle-to-everything (eV2X) communications. Specific service and applications in these categories include, e.g., monitoring and sensor networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile internet, and virtual reality to name a few. All of these use cases and others are contemplated herein.

Figure 66:
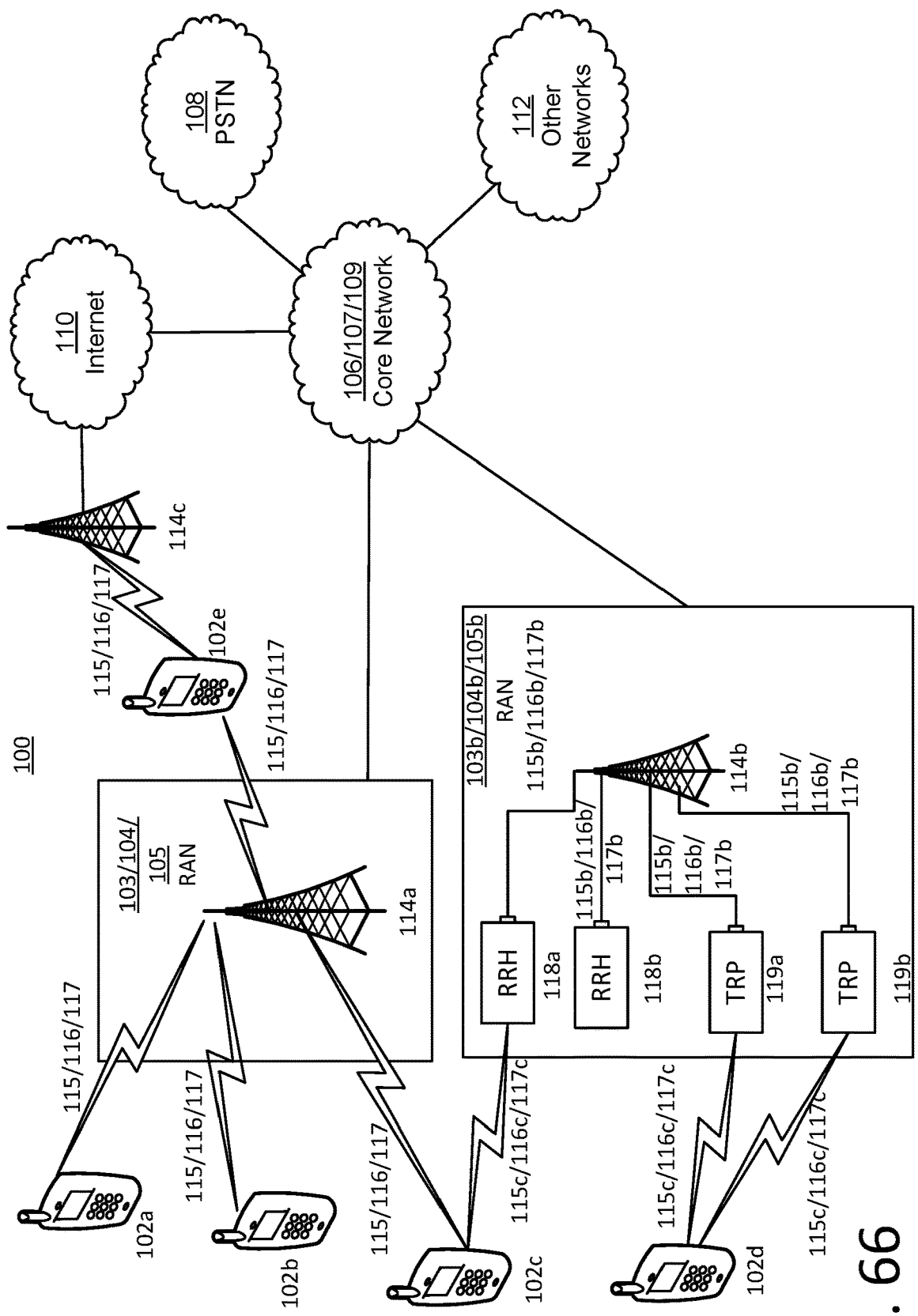
FIG. 66 illustrates an example communications system.

FIG. 66 illustrates one embodiment of an example communications system 100 in which the methods and apparatuses described and claimed herein may be embodied. As shown, the example communications system 100 may include wireless transmit/receive units (WTRUs) 102a, 102b, 102c, and/or 102d (which generally or collectively may be referred to as WTRU 102), a radio access network (RAN) 103/104/105/103b/104b/105b, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d, 102e may be any type of apparatus or device configured to operate and/or communicate in a wireless environment. Although each WTRU 102a, 102b, 102c, 102d, 102e is depicted in FIGS. 66-70 as a hand-held wireless communications apparatus, it is understood that with the wide variety of use cases contemplated for 5G wireless communications, each WTRU may comprise or be embodied in any type of apparatus or device configured to transmit and/or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, truck, train, or airplane, and the like.

The communications system 100 may also include a base station 114a and a base station 114b. Base stations 114a may be any type of device configured to wirelessly interface with at least one of the WTRUs 102a, 102b, 102c to facilitate access to one or more communication networks, such as the core network 106/107/109, the Internet 110, and/or the other networks 112. Base stations 114b may be any type of device configured to wiredly and/or wirelessly interface with at least one of the RRHs (Remote Radio Heads) 118a, 118b and/or TRPs (Transmission and Reception Points) 119a, 119b to facilitate access to one or more communication networks, such as the core network 106/107/109, the Internet 110, and/or the other networks 112. RRHs 118a, 118b may be any type of device configured to wirelessly interface with at least one of the WTRU 102c, to facilitate access to one or more communication networks, such as the core network 106/107/109, the Internet 110, and/or the other networks 112. TRPs 119a, 119b may be any type of device configured to wirelessly interface with at least one of the WTRU 102d, to facilitate access to one or more communication networks, such as the core network 106/107/109, the Internet 110, and/or the other networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114b may be part of the RAN 103b/104b/105b, which may also include other base stations and/or network elements (not shown), such as a base station controller (BSC), a radio network controller (RNC), relay nodes, etc. The base station 114a may be configured to transmit and/or receive wireless signals within a particular geographic region, which may be referred to as a cell (not shown). The base station 114b may be configured to transmit and/or receive wired and/or wireless signals within a particular geographic region, which may be referred to as a cell (not shown). The cell may further be divided into cell sectors. For example, the cell associated with the base station 114a may be divided into three sectors. Thus, in an embodiment, the base station 114a may include three transceivers, e.g., one for each sector of the cell. In an embodiment, the base station 114a may employ multiple-input multiple output (MIMO) technology and, therefore, may utilize multiple transceivers for each sector of the cell.

The base stations 114a may communicate with one or more of the WTRUs 102a, 102b, 102c over an air interface 115/116/117, which may be any suitable wireless communication link (e.g., radio frequency (RF), microwave, infrared (IR), ultraviolet (UV), visible light, cmWave, mmWave, etc.). The air interface 115/116/117 may be established using any suitable radio access technology (RAT).

The base stations 114b may communicate with one or more of the RRHs 118a, 118b and/or TRPs 119a, 119b over a wired or air interface 115b/116b/117b, which may be any suitable wired (e.g., cable, optical fiber, etc.) or wireless communication link (e.g., radio frequency (RF), microwave, infrared (IR), ultraviolet (UV), visible light, cmWave, mmWave, etc.). The air interface 115b/116b/117b may be established using any suitable radio access technology (RAT).

The RRHs 118a, 118b and/or TRPs 119a, 119b may communicate with one or more of the WTRUs 102c, 102d over an air interface 115c/116c/117c, which may be any suitable wireless communication link (e.g., radio frequency (RF), microwave, infrared (IR), ultraviolet (UV), visible light, cmWave, mmWave, etc.). The air interface 115c/116c/117c may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c, or RRHs 118a, 118b and TRPs 119a, 119b in the RAN 103b/104b/105b and the WTRUs 102c, 102d, may implement a radio technology such as Universal Mobile Telecommunications System (UMTS) Terrestrial Radio Access (UTRA), which may establish the air interface 115/116/117 or 115c/116c/117c respectively using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114a and the WTRUs 102a, 102b, 102c, or RRHs 118a, 118b and TRPs 119a, 119b in the RAN 103b/104b/105b and the WTRUs 102c, 102d, may implement a radio technology such as Evolved UMTS Terrestrial Radio Access (E-UTRA), which may establish the air interface 115/116/117 or 115c/116c/117c respectively using Long Term Evolution (LTE) and/or LTE-Advanced (LTE-A). In the future, the air interface 115/116/117 may implement 3GPP NR technology.

In an embodiment, the base station 114a in the RAN 103/104/105 and the WTRUs 102a, 102b, 102c, or RRHs 118a, 118b and TRPs 119a, 119b in the RAN 103b/104b/105b and the WTRUs 102c, 102d, may implement radio technologies such as IEEE 802.16 (e.g., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114c in FIG. 66 may be a wireless router, Home Node B, Home eNode B, or access point, for example, and may utilize any suitable RAT for facilitating wireless connectivity in a localized area, such as a place of business, a home, a vehicle, a campus, and the like. In an embodiment, the base station 114c and the WTRUs 102e, may implement a radio technology such as IEEE 802.11 to establish a wireless local area network (WLAN). In an embodiment, the base station 114c and the WTRUs 102d, may implement a radio technology such as IEEE 802.15 to establish a wireless personal area network (WPAN). In yet another embodiment, the base station 114c and the WTRUs 102e, may utilize a cellular-based RAT (e.g., WCDMA, CDMA2000, GSM, LTE, LTE-A, etc.) to establish a picocell or femtocell. As shown in FIG. 66, the base station 114b may have a direct connection to the Internet 110. Thus, the base station 114c may not be required to access the Internet 110 via the core network 106/107/109.

The RAN 103/104/105 and/or RAN 103b/104b/105b may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication.

Although not shown in FIG. 66, it will be appreciated that the RAN 103/104/105 and/or RAN 103b/104b/105b and/or the core network 106/107/109 may be in direct or indirect communication with other RANs that employ the same RAT as the RAN 103/104/105 and/or RAN 103b/104b/105b or a different RAT. For example, in addition to being connected to the RAN 103/104/105 and/or RAN 103b/104b/105b, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d, 102e to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 and/or RAN 103b/104b/105b or a different RAT.

Some or all of the WTRUs 102a, 102b, 102c, 102d in the communications system 100 may include multi-mode capabilities, e.g., the WTRUs 102a, 102b, 102c, 102d, and 102e may include multiple transceivers for communicating with different wireless networks over different wireless links. For example, the WTRU 102e shown in FIG. 66 may be configured to communicate with the base station 114a, which may employ a cellular-based radio technology, and with the base station 114c, which may employ an IEEE 802 radio technology.

Figure 67:
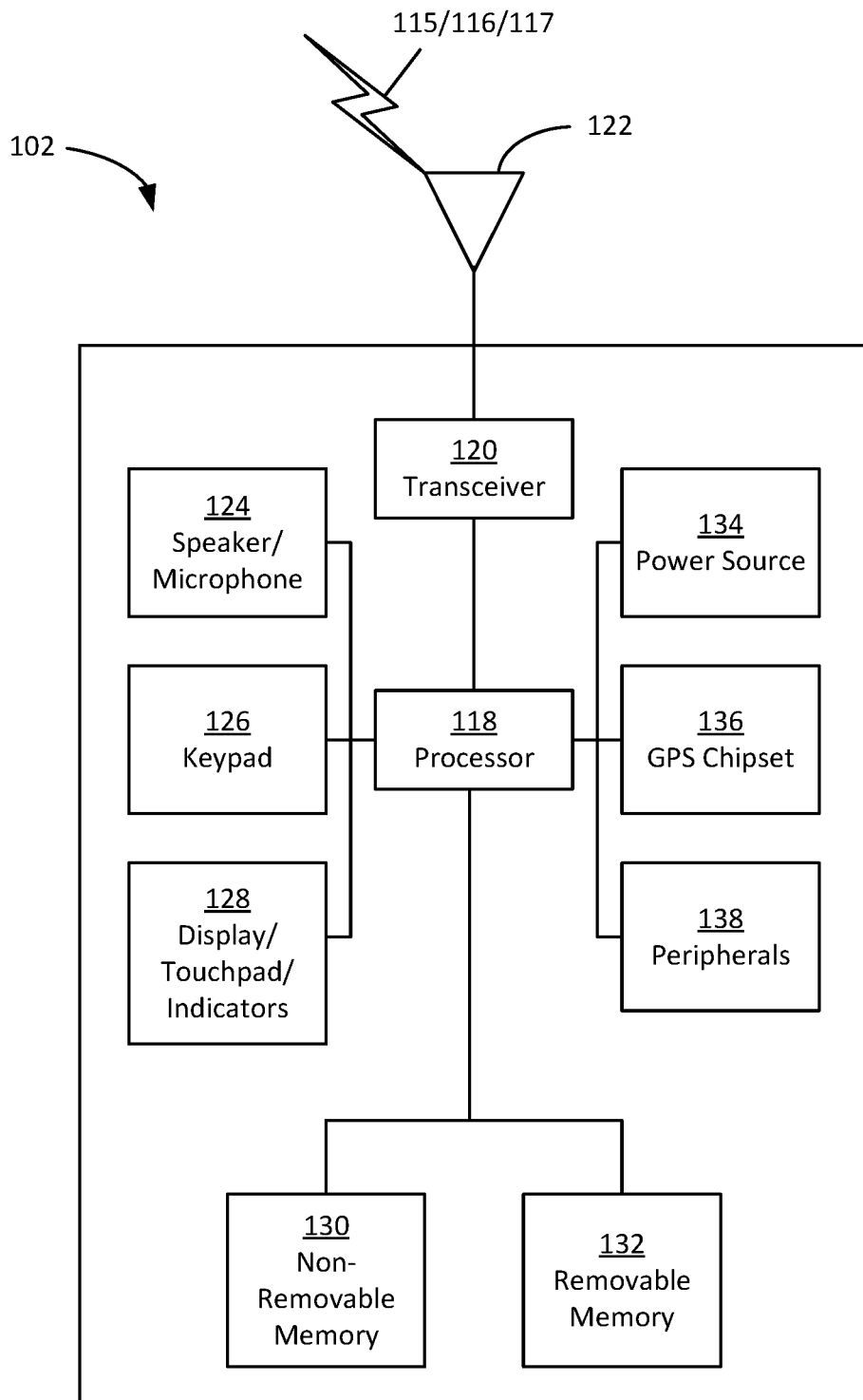
FIG. 67 is a block diagram of an example apparatus or device configured for wireless communications such as, for example, a wireless transmit/receive unit (WTRU).

FIG. 67 is a block diagram of an example apparatus or device configured for wireless communications in accordance with the embodiments illustrated herein, such as for example, a WTRU 102. As shown in FIG. 67, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to, transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 67 and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 67 depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in an embodiment, the transmit/receive element 122 may be an antenna configured to transmit and/or receive RF signals. Although not shown in FIG. 66, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities, e.g., the WTRUs 102a, 102b, 102c, and 102d may include multiple transceivers for communicating with different wireless networks over different wireless links. For example, the WTRU 102c shown in FIG. 66 may be configured to communicate with the base station 114a, which may employ a cellular-based radio technology, and with the base station 114b, which may employ an IEEE 802 radio technology.

FIG. 67 is a block diagram of an example apparatus or device configured for wireless communications in accordance with the embodiments illustrated herein, such as for example, a WTRU 102. As shown in FIG. 67, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 67 and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 67 depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in an embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet an embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 67 as a single element, the WTRU 102 may include any number of transmit/receive elements 122. More specifically, the WTRU 102 may employ MIMO technology. Thus, in an embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad/indicators 128 (e.g., a liquid crystal display (LCD) display unit or organic light-emitting diode (OLED) display unit). The processor 118 may also output user data to the speaker/microphone 124, the keypad 126, and/or the display/touchpad/indicators 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In an embodiment, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The WTRU 102 may connect to other components, modules, or systems of such apparatuses or devices via one or more interconnect interfaces, such as an interconnect interface that may comprise one of the peripherals 138.

Figure 68:
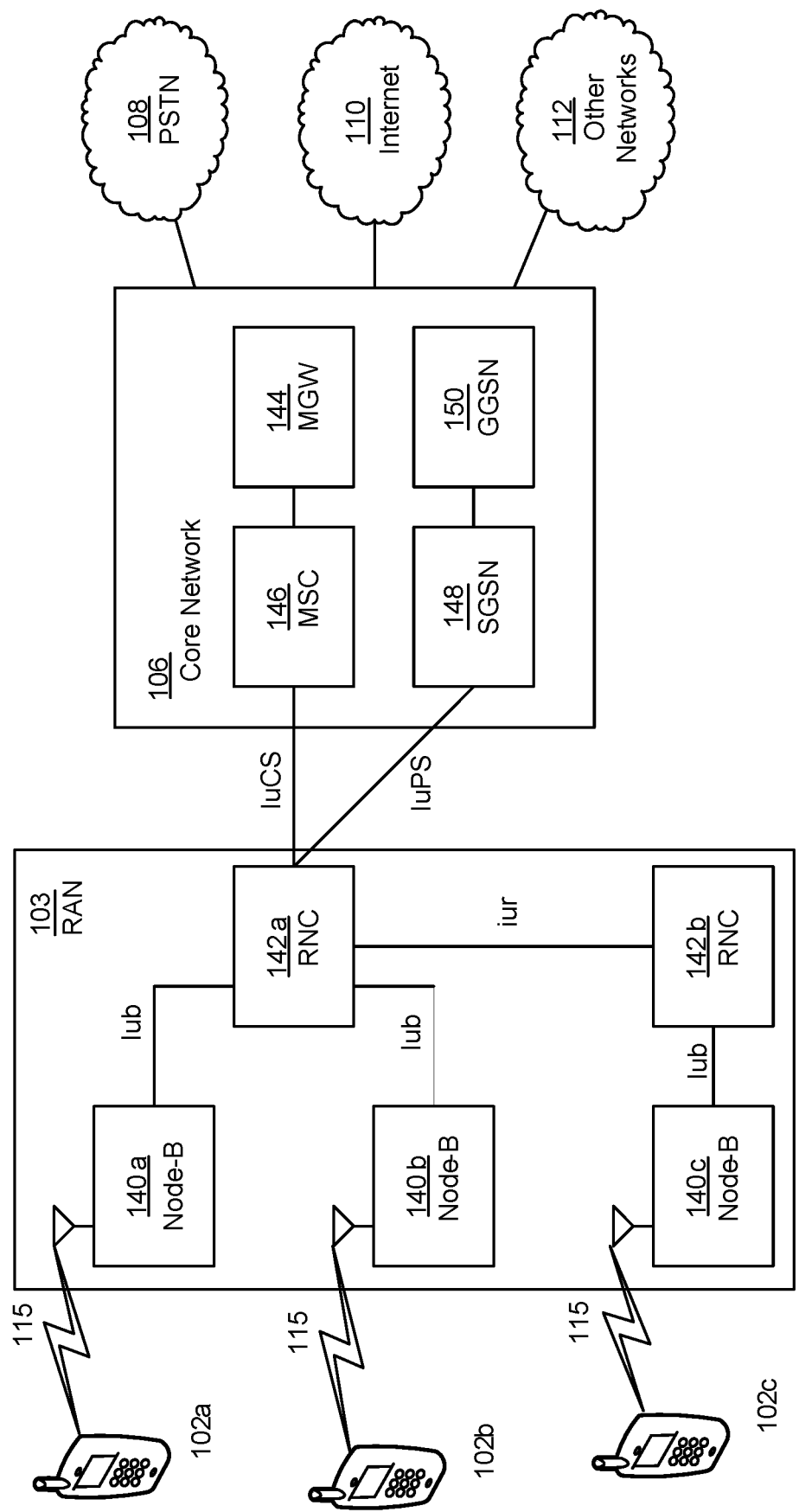
FIG. 68 is a system diagram of a first example radio access network (RAN) and core network.

FIG. 68 is a system diagram of the RAN 103 and the core network 106 according to an embodiment. As noted above, the RAN 103 may employ a UTRA radio technology to communicate with the WTRUs 102a, 102b, and 102c over the air interface 115. The RAN 103 may also be in communication with the core network 106. As shown in FIG. 68, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 68, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macro-diversity, security functions, data encryption, and the like.

The core network 106 shown in FIG. 68 may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 69:
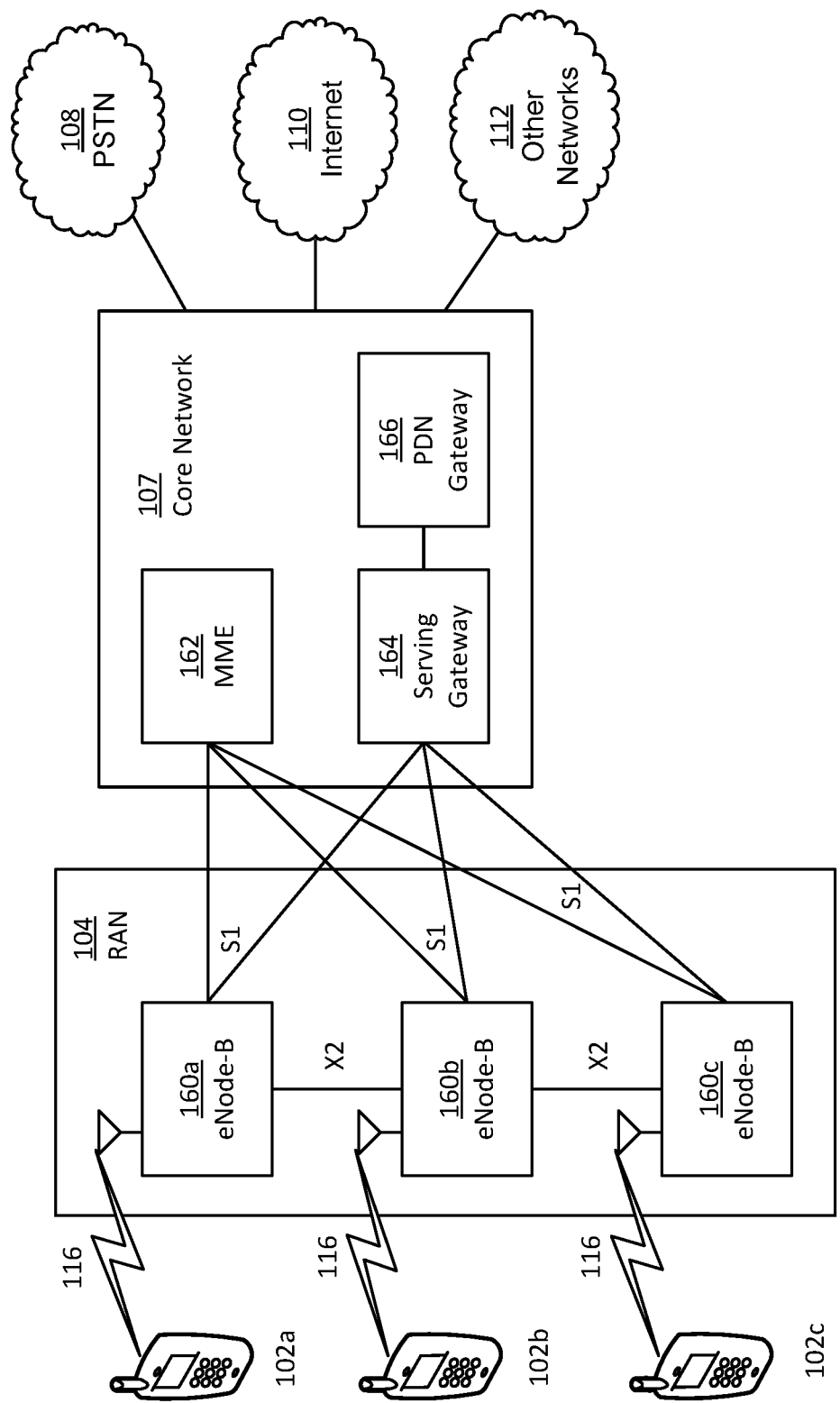
FIG. 69 is a system diagram of a second example radio access network (RAN) and core network.

FIG. 69 is a system diagram of the RAN 104 and the core network 107 according to an embodiment. As noted above, the RAN 104 may employ an E-UTRA radio technology to communicate with the WTRUs 102a, 102b, and 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In an embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink and/or downlink, and the like. As shown in FIG. 69, the eNode-Bs 160a, 160b, 160c may communicate with one another over an X2 interface.

The core network 107 shown in FIG. 69 may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 70:
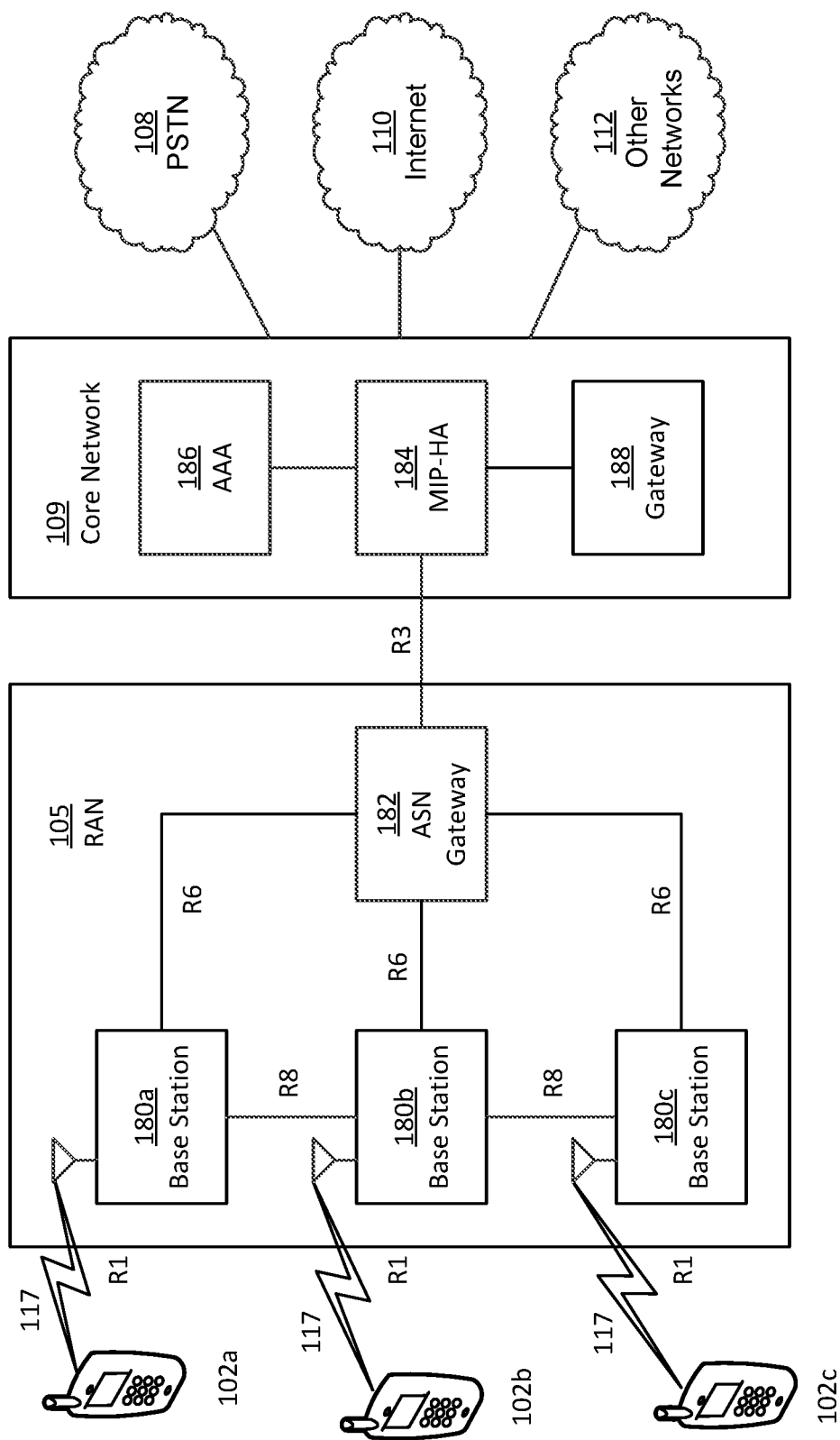
FIG. 70 is a system diagram of a third example radio access network (RAN) and core network.

FIG. 70 is a system diagram of the RAN 105 and the core network 109 according to an embodiment. The RAN 105 may be an access service network (ASN) that employs IEEE 802.16 radio technology to communicate with the WTRUs 102a, 102b, and 102c over the air interface 117. As will be further discussed below, the communication links between the different functional entities of the WTRUs 102a, 102b, 102c, the RAN 105, and the core network 109 may be defined as reference points.

As shown in FIG. 70, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell in the RAN 105 and may include one or more transceivers for communicating with the WTRUs 102a, 102b, 102c over the air interface 117. In an embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, and 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, and 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 70, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, and 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 70, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

The core network entities described herein and illustrated in FIGS. 66-70 are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIGS. 66-70 are provided by way of example only, and it is understood that the subject matter disclosed and claimed herein may be embodied or implemented in any similar communication system, whether presently defined or defined in the future.

Figure 71:
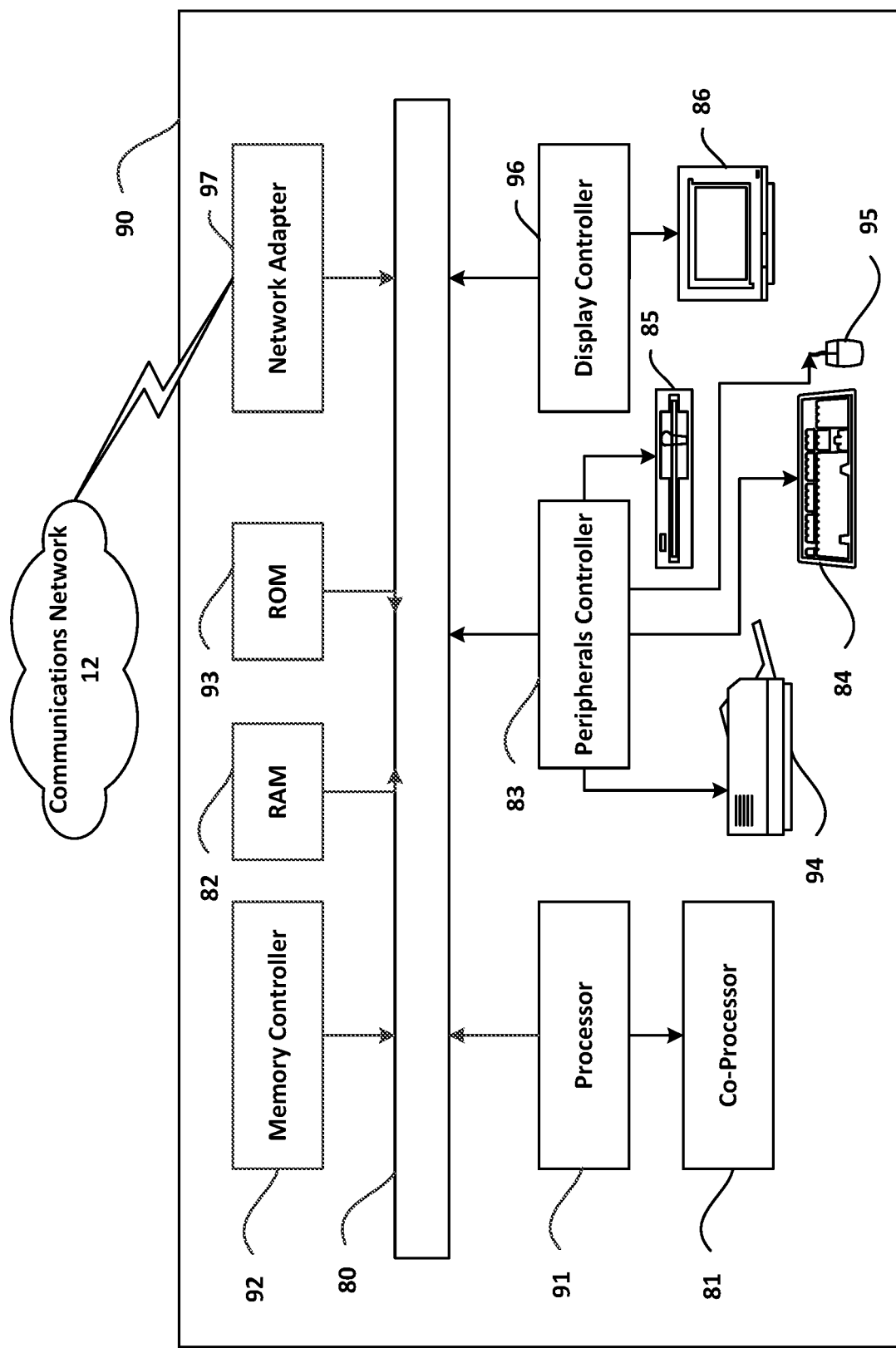
FIG. 71 is a block diagram of an exemplary computing system in which one or more apparatuses of communications networks may be embodied, such as certain nodes or functional entities in the RAN, core network, public switched telephone network (PSTN), Internet, or other networks.

FIG. 71 is a block diagram of an exemplary computing system 90 in which one or more apparatuses of the communications networks illustrated in FIGS. 66-70 may be embodied, such as certain nodes or functional entities in the RAN 103/104/105, Core Network 106/107/109, PSTN 108, Internet 110, or Other Networks 112. Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, and/or any other functionality that enables the computing system 90 to operate in a communications network. Coprocessor 81 is an optional processor, distinct from main processor 91, that may perform additional functions or assist processor 91. Processor 91 and/or coprocessor 81 may receive, generate, and process data related to the methods and apparatuses disclosed herein.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by processor 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adapter 97, that may be used to connect computing system 90 to an external communications network, such as the RAN 103/104/105, Core Network 106/107/109, PSTN 108, Internet 110, or Other Networks 112 of FIGS. 66-70, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

It is understood that any or all of the apparatuses, systems, methods and processes described herein may be embodied in the form of computer executable instructions (e.g., program code) stored on a computer-readable storage medium which instructions, when executed by a processor, such as processors 118 or 91, cause the processor to perform and/or implement the systems, methods and processes described herein. Specifically, any of the steps, operations or functions described herein may be implemented in the form of such computer executable instructions, executing on the processor of an apparatus or computing system configured for wireless and/or wired network communications. Computer readable storage media include volatile and nonvolatile, removable and non-removable media implemented in any non-transitory (e.g., tangible or physical) method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which can be used to store the desired information and which can be accessed by a computing system.

What is claimed:

1. An apparatus comprising a processor, a memory, and communication circuitry, the apparatus being connected to a network via its communication circuitry, the apparatus further comprising computer-executable instructions stored in the memory of the apparatus which, when executed by the processor of the apparatus, cause the apparatus to perform operations comprising:
    decoding a physical slot format indicator channel to obtain structure information of a current slot, and decoding a physical control format indicator channel to obtain a size of a downlink control region, the structure information of the current slot comprising at least one of length of the current slot, number of symbols for a downlink transmission region, and number of symbols for an uplink transmission region;
    determining, according to the slot structure and the size of the downlink control region, a first tier search space;
    blindly decoding multiple physical downlink control channel candidates within the first tier search space;
    checking each of the physical downlink control channel candidates within the first tier search space for a first match with an identifier associated with the apparatus; and
    determining, from a matching physical downlink control channel candidate of the first tier search space, a second tier search space.

2. The apparatus of claim 1, wherein the operations further comprise:
    blindly decoding multiple physical downlink control channel candidates within the second tier search space;

checking each of the physical downlink control channel candidates within the second tier search space for a second match with the identifier associated with the apparatus; and determining, from a matching physical downlink control channel candidate of the second tier search space, a set of physical downlink control information.

3. The apparatus of claim 2, wherein the matching physical downlink control channel candidate of the first tier search comprises an indicator of an open-loop transmission mode, and the set of physical downlink control information comprises pre-coding matrix information.

4. The apparatus of claim 2, wherein the matching physical downlink control channel candidate of the first tier search comprises an indicator of a spatial multiplexing transmission mode, and the set of physical downlink control information comprises a number of layers and antenna port indexes.

5. The apparatus of claim 2, wherein the matching physical downlink control channel candidate of the first tier search comprises an indicator of a beamforming transmission mode, and the set of physical downlink control information comprises an antenna port index.

6. The apparatus of claim 1, wherein the physical downlink control channel candidates of the second tier search comprise information including one or more of a carrier indicator, a resource allocation, a scheme for modulation and coding, a new data indicator, a redundancy indicator, a hybrid automatic repeat request process number, a downlink assignment index, and a transmission power control parameter.

7. The apparatus of claim 1, wherein the physical downlink control channel candidates of the first tier search space comprise an indicator of a transmission mode.

8. The apparatus of claim 7, wherein the transmission mode is selected from the list consisting of transmit diversity, open-loop transmission, spatial multiplexing, and beamforming.

9. The apparatus of claim 1, wherein the first tier search space is common to a group of apparatuses and the identifier associated with the apparatus is a group identifier.

10. The apparatus of claim 1, wherein the apparatus is a user equipment and the identifier of the apparatus is a user equipment ID.

11. The apparatus of claim 1, wherein checking each of the physical downlink control channel candidates within the first and second tier search spaces comprises computing a cyclic redundancy code.

12. The apparatus of claim 1, wherein the instructions further cause the apparatus to:

obtain a potential position or a search space of a reference signal;

obtain download numerology allocation information through master information block data, system information block data, one or more radio resource control signals, or a physical downlink numerology indication channel;

obtain one or more resource element positions in an antenna port reference signal in a resource block that belongs to a particular band slice according to a reference signal allocation scheme for a band slice numerology;

detect a specific reference signal; and decode a physical download control based upon one or more resource elements of the reference signal; and connect an enhanced mobile broadband, massive machine type communication, or ultra-reliable/low-latency application to a communications network thereby, wherein the physical download control channel and the reference signal use the same precoding or beamforming.

13. An apparatus comprising a processor, a memory, and communication circuitry, the apparatus being connected to a network via its communication circuitry, the apparatus further comprising computer-executable instructions stored in the memory of the apparatus which, when executed by the processor of the apparatus, cause the apparatus to perform operations comprising:

defining a Physical Slot Format Indicator Channel (PSFICH), the PSFICH providing information associated with a current slot;

encoding the PSFICH at a coding rate; and transmitting the PSFICH in transmit diversity mode, wherein the information comprises at least one of a length of the slot, a number of symbols for a downlink transmission region, and a number of symbols for an uplink transmission region.

14. The apparatus of claim 13, wherein the instructions further cause the apparatus to:

transmit, in a beam-sweeping manner in a number of beams, a physical downlink control channel in adjacent symbols;

transmit, for each beam, a physical downlink shared data channel, wherein the physical downlink shared data channel occurs after the physical downlink control channel is swept.

15. The apparatus of claim 14, wherein the instructions further cause the apparatus to:

transmit, before sweeping a second physical downlink control channel, a first physical downlink control channel and a first physical downlink shared data channel, where the first physical downlink control channel and the first physical downlink shared data channel are transmitted in one beam.

16. The apparatus of claim 14, wherein the instructions further cause the apparatus to transmit, in each beam of a set of beams, a set of downlink control information.

17. The apparatus of claim 16, wherein the set of downlink control information comprises paging information.

18. The apparatus of claim 16, wherein the number of symbols in the set of downlink control information is fixed.

* * * * *